(12) United States Patent
Kimura et al.

(10) Patent No.: US 11,940,057 B2
(45) Date of Patent: Mar. 26, 2024

(54) VALVE DEVICE AND FLUID CIRCULATION CIRCUIT

(71) Applicant: DENSO CORPORATION, Kariya (JP)

(72) Inventors: Syota Kimura, Kariya (JP); Hiroki Shimada, Kariya (JP); Akira Higuchi, Kariya (JP); Takehito Mizunuma, Kariya (JP); Takuya Hamada, Kariya (JP); Ryou Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 16 days.

(21) Appl. No.: 17/683,449

(22) Filed: Mar. 1, 2022

(65) Prior Publication Data

US 2022/0186840 A1   Jun. 16, 2022

Related U.S. Application Data

(63) Continuation of application No. PCT/JP2020/030381, filed on Aug. 7, 2020.

(30) Foreign Application Priority Data

Sep. 10, 2019   (JP) ................................. 2019-164851

(51) Int. Cl.
   *F16K 3/10*   (2006.01)
   *F16K 3/08*   (2006.01)
   *F16K 3/314*  (2006.01)

(52) U.S. Cl.
   CPC ................. *F16K 3/10* (2013.01); *F16K 3/08* (2013.01); *F16K 3/314* (2013.01); *F16K 2200/101* (2021.08)

(58) Field of Classification Search
   CPC ... F16K 3/10; F16K 3/08; F16K 3/314; F16K 3/04; F16K 2200/101; F16K 11/074; F16K 31/04; B60H 1/00485
   (Continued)

(56) References Cited

U.S. PATENT DOCUMENTS 2,516,795 A * 7/1950 Norton ....................... F01L 1/32
                                                          74/21
3,414,007 A * 12/1968 Robert ....................... B66F 9/22
                                                          137/493

(Continued)

FOREIGN PATENT DOCUMENTS

JP   S47-017835   6/1972
JP   6475778      2/2019
(Continued)

*Primary Examiner* — David Colon-Morales
*Assistant Examiner* — Andrew J Rost
(74) *Attorney, Agent, or Firm* — Nixon & Vanderhye P.C.

(57) ABSTRACT

A valve device includes a flow path formation member provided with at least one flow path hole through which a fluid passes, and a drive part that outputs a rotational force. The valve device includes a shaft, and a rotor having a sliding surface that slides while facing an opening surface of the flow path formation member where the flow path hole is opened, and the rotor is configured to increase or decrease an opening degree of the flow path hole with rotation of the shaft. The valve device includes an energization member that energizes the rotor toward the flow path formation member. The valve device includes a coupling structure configured to tiltably couple the shaft to the rotor such that a contact state between the sliding surface and the opening surface is held regardless of a posture or a position of the shaft.

20 Claims, 27 Drawing Sheets

(58) Field of Classification Search
USPC .......................................................... 251/208
See application file for complete search history.

(56) References Cited

U.S. PATENT DOCUMENTS

| | | | | |
|---|---|---|---|---|
| 5,365,978 | A * | 11/1994 | Woods | F16K 3/08 137/454.6 |
| 5,664,761 | A * | 9/1997 | Weyand | F16K 3/10 251/283 |
| 6,032,869 | A | 3/2000 | Ito et al. | |
| 6,352,105 | B1 * | 3/2002 | Serratto | F24F 3/08 236/1 C |
| 7,108,012 | B2 * | 9/2006 | Rosko | F16K 11/0787 251/297 |
| 7,134,452 | B2 * | 11/2006 | Hiroshi | F16K 11/0787 251/117 |
| 7,143,786 | B2 * | 12/2006 | Romero | F16K 11/202 137/594 |
| 7,261,126 | B2 * | 8/2007 | Jeromson | F16K 11/0743 251/304 |
| 7,316,384 | B2 * | 1/2008 | Sekiya | F16K 11/0743 251/129.11 |
| 10,920,894 | B2 * | 2/2021 | Wu | F16K 27/045 |
| 2006/0016491 | A1 | 1/2006 | Rosko et al. | |
| 2015/0233483 | A1 | 8/2015 | Bachofer et al. | |
| 2016/0167481 | A1 | 6/2016 | Makihara et al. | |
| 2019/0301619 | A1 | 10/2019 | Wu et al. | |

FOREIGN PATENT DOCUMENTS

| | | |
|---|---|---|
| JP | 2020-178469 | 10/2020 |
| WO | 2020/213635 | 10/2020 |

* cited by examiner

DEVICE COOLING MODE

OUTSIDE-AIR COOLING MODE

OUTSIDE-AIR HEAT ABSORPTION MODE

VALVE DEVICE AND FLUID CIRCULATION CIRCUIT

CROSS REFERENCE TO RELATED APPLICATION

The present application is a continuation application of International Patent Application No. PCT/JP2020/030381 filed on Aug. 7, 2020, which designated the U.S. and claims the benefit of priority from Japanese Patent Application No. 2019-164851 filed on Sep. 10, 2019. The entire disclosures of all of the above applications are incorporated herein by reference.

TECHNICAL FIELD

The present disclosure relates to a valve device and a fluid circulation circuit including the valve device.

BACKGROUND

Conventionally, in a valve device, a relative positional relationship between a first valve plate coupled to a shaft and a second valve plate non-rotatably disposed in a housing is changed to regulate an opening degree of a flow path hole formed in the second valve plate. In the valve device, the shaft and the first valve plate are integrally formed. Thus, when the shaft is inclined for some reason, the first valve plate is inclined together with the shaft, and the close contact of each valve plate may be impaired.

SUMMARY

According to an aspect of the present disclosure, a valve device includes: a flow path formation member provided with at least one flow path hole through which a fluid passes; a drive part configured to output a rotational force; a shaft configured to be rotatable about a predetermined axis by the rotational force output from the drive part; a rotor having a sliding surface that slides while facing an opening surface of the flow path formation member where the flow path hole is opened; an energization member; and a coupling structure. The rotor is configured to increase or decrease an opening degree of the flow path hole with rotation of the shaft, and the energization member is configured to energize the rotor toward the flow path formation member. The coupling structure is configured to tiltably couple the shaft to the rotor, and to hold a contact state between the sliding surface and the opening surface regardless of a posture or a position of the shaft.

The valve device may be suitably used for a fluid circulation circuit including a plurality of devices through which the fluid passes.

BRIEF DESCRIPTION OF THE DRAWINGS

The above and other objects, features and advantages of the present disclosure will become more apparent from the following detailed description made with reference to the accompanying drawings.

DESCRIPTION OF EMBODIMENTS

Figure 1:
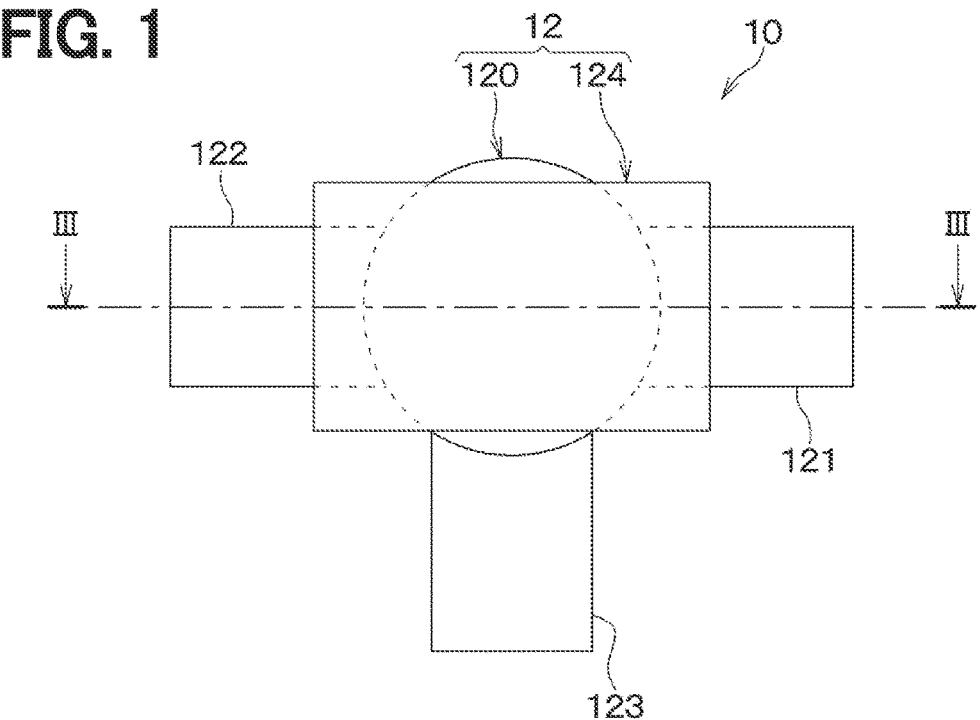
FIG. 1 is a schematic plan view of a valve device according to a first embodiment.

In a valve device, a relative positional relationship between a first valve plate coupled to a shaft and a second valve plate non-rotatably disposed in a housing can be changed to regulate an opening degree of a flow path hole formed in the second valve plate. In a case where the shaft and the first valve plate are integrally formed, when the shaft is inclined for some reason, the first valve plate is inclined together with the shaft, and the close contact of each valve plate may be impaired. According to studies by the inventors of the present application, a change in the posture or the position of the shaft may cause unintended fluid leakage in the valve device.

An object of the present disclosure is to provide a valve device and a fluid circulation circuit capable of preventing fluid leakage due to a change in the posture or position of a shaft.

According to an exemplar embodiment of the present disclosure, a valve device includes a flow path formation member, a drive part, a shaft, a rotor, an energization member, and a coupling member (i.e., coupling structure). The flow path formation member is provided with at least one flow path hole through which a fluid passes. The drive part is configured to output a rotational force, the shaft is configured to be rotatable about a predetermined axis by the rotational force output from the drive part, and the rotor has a sliding surface that slides while facing an opening surface of the flow path formation member where the flow path hole is opened. The rotor is configured to increase or decrease an opening degree of the flow path hole with rotation of the shaft, and the energization member is configured to energize the rotor toward the flow path formation member. The coupling structure is configured to tiltably couple (e.g., tiltingly couple) the shaft to the rotor, and to hold a contact state between the sliding surface and the opening surface regardless of a posture or a position of the shaft.

According to another exemplar embodiment of the present disclosure, a fluid circulation circuit includes a plurality of devices through which a fluid passes, and the valve device configured to regulate a flow rate of the fluid passing through the plurality of devices.

As described above, in a case where the coupling structure configured to tiltably couple the shaft to the rotor is provided, even when the shaft is tilted for some reason, the close contact between the rotor and the flow path formation member can be easily ensured. In addition, when the rotor is pressed toward the flow path formation member by the energization member, the rotor can be held at a position in contact with the flow path formation member. Therefore, the valve device and the fluid circulation circuit of the present disclosure can prevent a fluid leakage due to a change in the posture and position of the shaft.

Hereinafter, embodiments of the present disclosure will be described with reference to the drawings. In the following embodiment, the same or equivalent portions as those described in the preceding embodiment are denoted by the same reference numerals, and the description thereof may be omitted. When only some of the constituent elements are described in the embodiment, the constituent elements described in the preceding embodiment can be applied to the other constituent elements. In the following embodiments, the embodiments can be partially combined with each other so long as the combination is not particularly hindered, even when not particularly specified.

First Embodiment

The present embodiment will be described with reference to FIGS. 1 to 9. In the present embodiment, an example will be described where a valve device 10 of the present disclosure is applied to a control valve for a vehicle mounted on a vehicle. Although not illustrated, the valve device 10 illustrated in FIG. 1 is applied to a fluid circulation circuit that circulates a fluid (in the present example, cooling water) to a traveling power source, a radiator, and the like, and the fluid circulating in the fluid circulation circuit flows.

The valve device 10 can increase or decrease the flow rate of the fluid in the flow path via the valve device 10 in the fluid circulation circuit and can also block the flow of the fluid in the flow path. As the fluid, for example, LLC containing ethylene glycol is used. LLC is an abbreviation for long life coolant.

Figure 2:
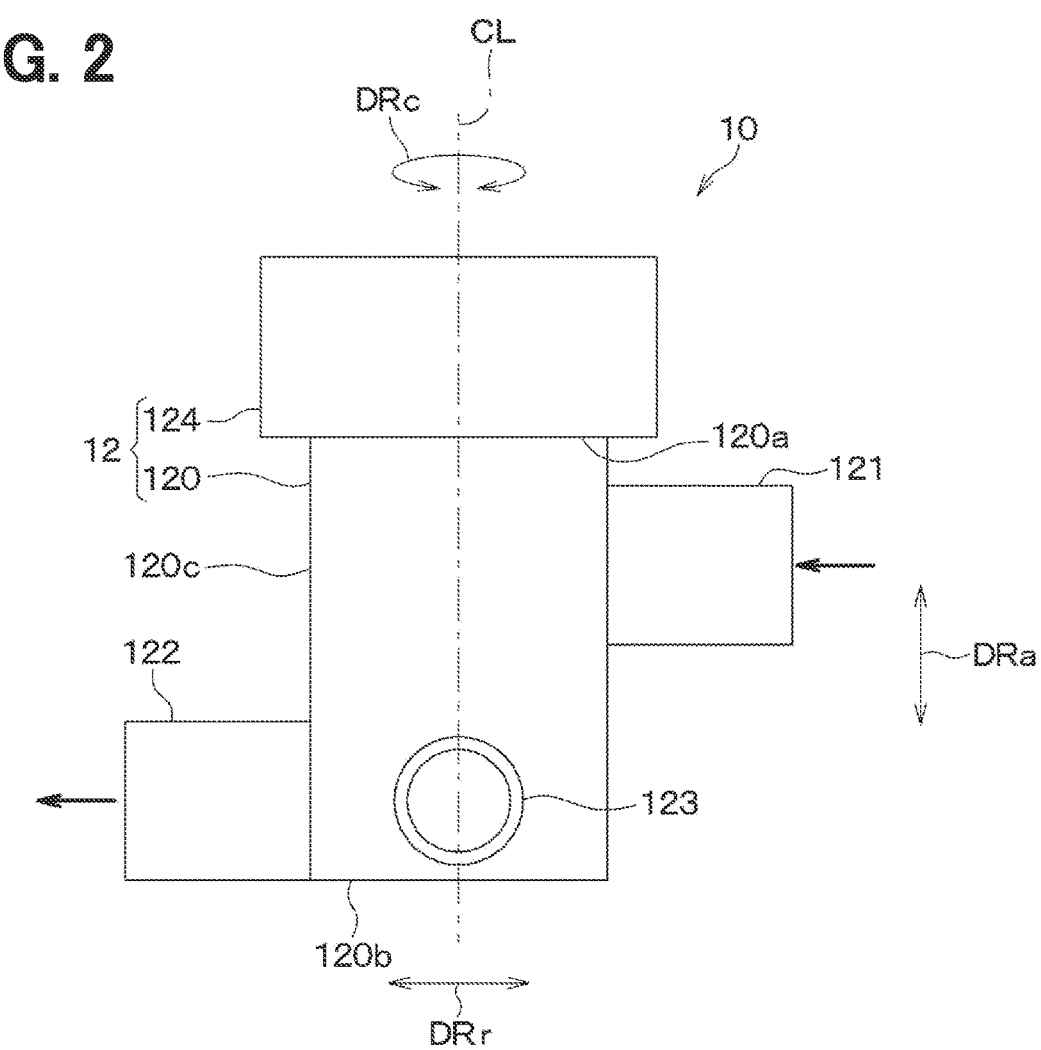
FIG. 2 is a schematic front view of the valve device according to the first embodiment.

As illustrated in FIGS. 1 and 2, the valve device 10 has a housing 12 forming an outer shell. The valve device 10 is formed of a three-way valve where an inlet 121 into which a fluid flows, a first outlet 122 from which the fluid flows out, and a second outlet 123 from which the fluid flows out are provided in the housing 12. The valve device 10 not only functions as a flow path switching valve but also functions as a flow rate regulating valve that regulates a flow rate ratio between the fluid flowing from the inlet 121 to the first outlet 122 and the fluid flowing from the inlet 121 to the second outlet 123.

The valve device 10 is configured as a disc valve that performs a valve switching operation by a disc-shaped valve body rotating around an axis CL of a shaft 20 to be described later. In the present embodiment, various configurations and the like will be described with a direction along the axis CL of the shaft 20 to be described later as an axial direction DRa and with a direction orthogonal to the axial direction DRa and radially extending from the axial direction DRa as a radial direction DRr. In the present embodiment, various configurations and the like will be described with a direction around the axis CL as a circumferential direction DRc.

Figure 3:
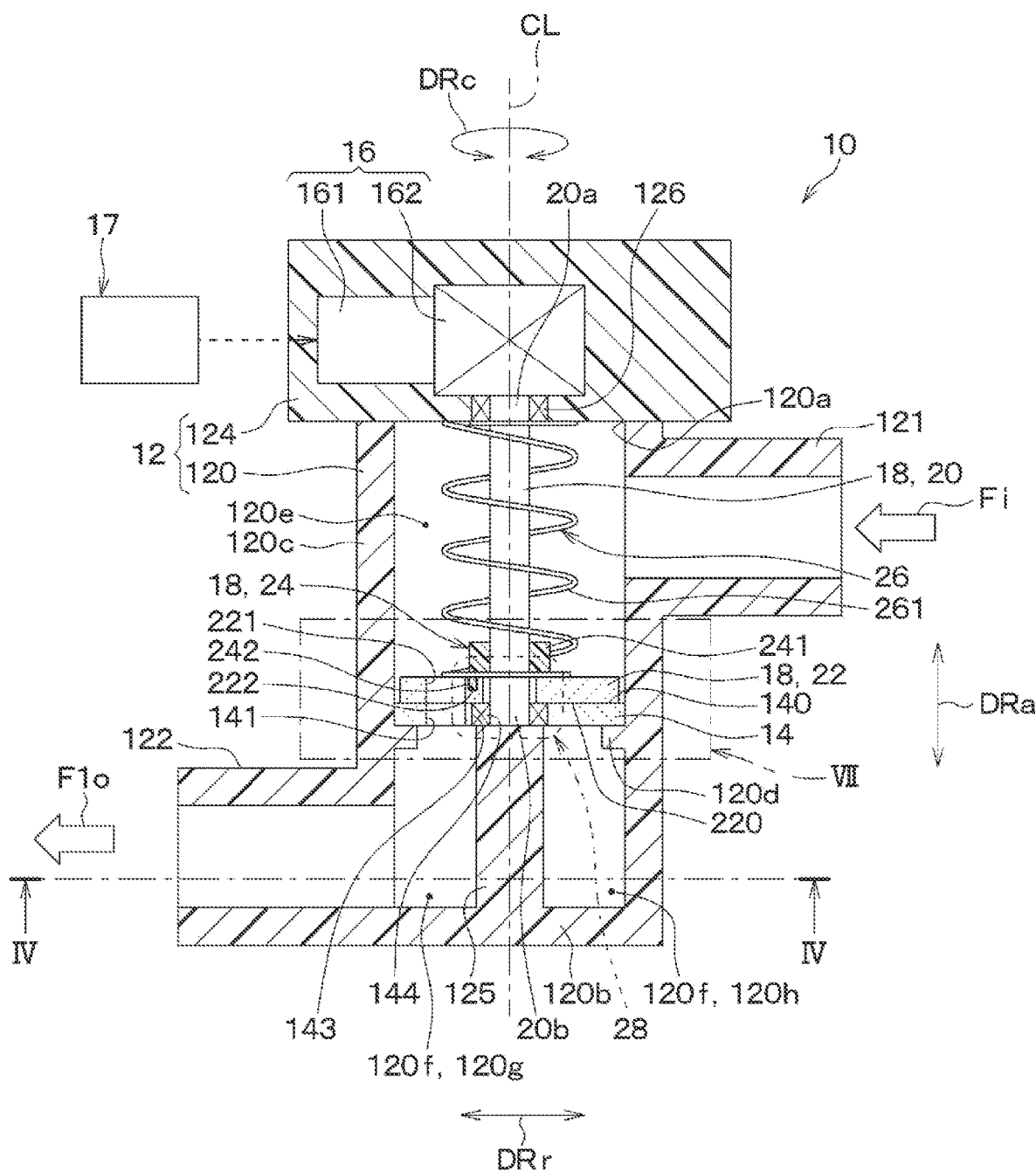
FIG. 3 is a schematic view illustrating a cross section taken along the line III-III in FIG. 1.

As illustrated in FIG. 3, in the valve device 10, a stator 14, a drive part 16, a rotation part 18, an energization member 26, and the like are housed inside the housing 12.

The housing 12 is a non-rotating member that does not rotate. The housing 12 is formed of, for example, a resin material or the like. The housing 12 includes a bottomed cylindrical body 120 extending along the axial direction DRa and a body cover 124 that closes an opening 120a of the body 120.

The body 120 has a bottom wall 120b forming a bottom surface and a side wall 120c surrounding the axis CL. In the side wall 120c, an inlet 121 is formed at a position closer to the opening 120a than the bottom wall 120b, and a first outlet 122 and a second outlet 123 are formed at positions closer to the bottom wall 120b than the opening 120a.

An annular protrusion 120d protruding so as to approach the axis CL is formed inside the side wall 120c. The protrusion 120d is provided to dispose the stator 14 inside the body 120. Although not illustrated, the protrusion 120d is provided with a detent pin, and the pin restricts the movement of the stator 14 in the circumferential direction DRc. The detent of the stator 14 may be achieved by means except for the detent pin.

The inside of the body 120 is partitioned into an inlet space 120e and an outlet space 120f by the stator 14. The inlet space 120e is a space communicating with the inlet 121 inside the housing 12. The outlet space 120f is a space communicating with the first outlet 122 and the second outlet 123 inside the housing 12.

A plate-shaped partition 125 that partitions the outlet space 120f into a first outlet space 120g and a second outlet space 120h is set inside the body 120. The partition 125 is provided so as to cross the outlet space 120f along the radial direction DRr.

The stator 14 is formed of a disc-shaped member a thickness direction of which is the axial direction DRa. The stator 14 has an opening surface 140 as a surface on which a rotor 22 to be described later slides. The opening surface 140 is a sealing surface corresponding to a sliding surface 220 of the rotor 22 to be described later.

The stator 14 is desirably formed of a material having a small linear expansion coefficient and excellent wear resistance as compared to the constituent material of the housing 12. The stator 14 is made of a high hardness material having higher hardness than the housing 12. Specifically, the stator 14 is made of ceramic. In the stator 14, only a portion forming the opening surface 140 may be formed of a material such as ceramic, having a small linear expansion coefficient and excellent wear resistance as compared to the constituent material of the housing 12.

Figure 4:
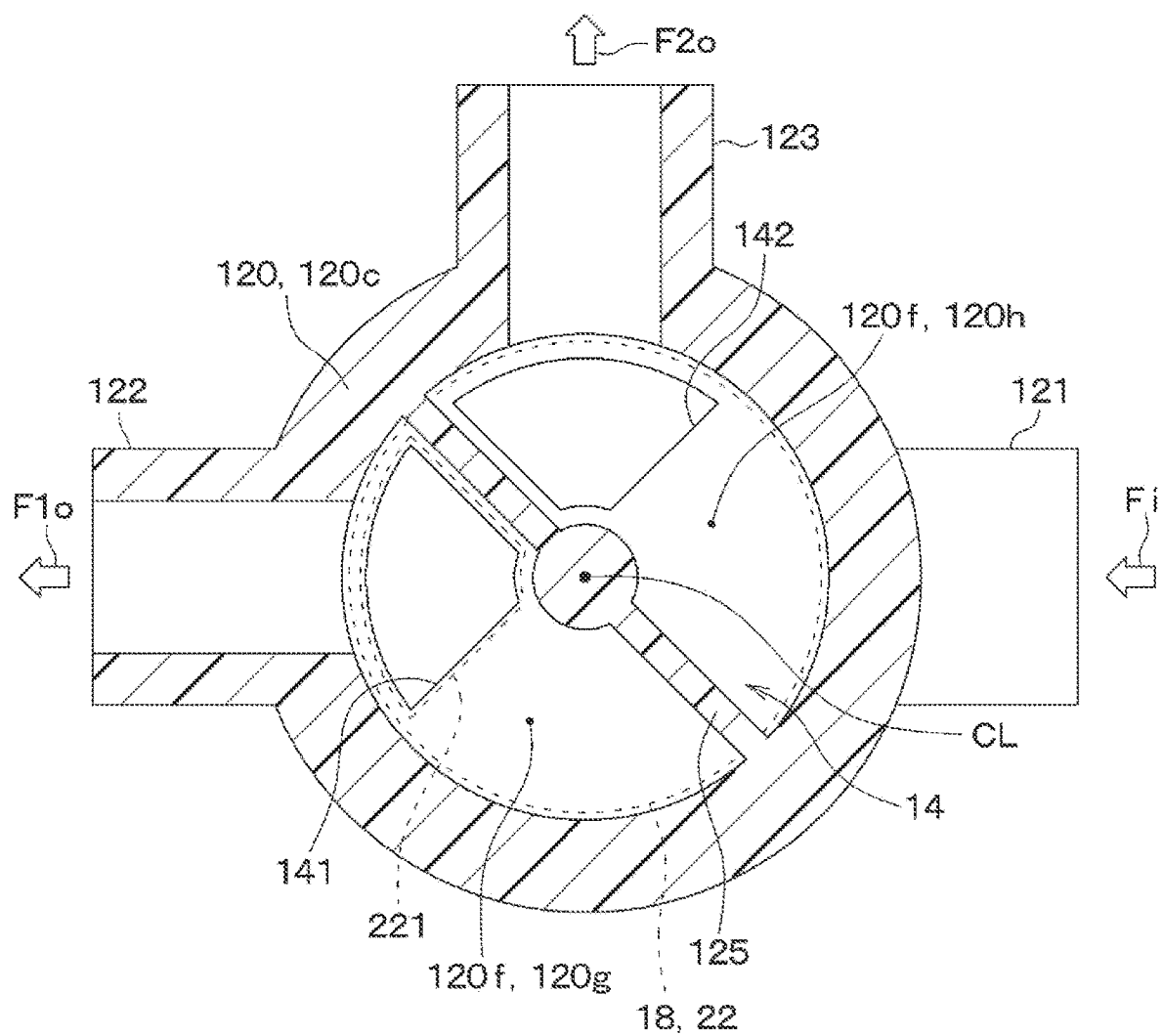
FIG. 4 is a schematic view illustrating a cross section taken along the line IV-IV in FIG. 3.

The stator 14 constitutes a flow path formation member provided with a flow path hole through which a fluid passes. As illustrated in FIG. 4, in the stator 14, a first flow path hole 141 and a second flow path hole 142 through which the fluid passes are formed.

The first flow path hole 141 and the second flow path hole 142 are formed in the stator 14 at positions away from the axis CL of the shaft 20 so as not to overlap the axis CL of the shaft 20. The first flow path hole 141 and the second flow path hole 142 are sector-shaped (i.e., fan-shaped) through holes, and the first flow path hole 141 and the second flow path hole 142 function as communication paths for communicating the inlet space 120e and the outlet space 120f. The first flow path hole 141 and the second flow path hole 142 are not limited to the sector shape but may have another shape such as a circular shape or an elliptical shape.

Specifically, the first flow path hole 141 is provided in a portion of the stator 14 corresponding to the first outlet space 120g so as to communicate with the first outlet space 120g. The second flow path hole 142 is provided in a portion of the stator 14 corresponding to the second outlet space 120h so as to communicate with the second outlet space 120h.

Returning to FIG. 3, a holding hole 143 for holding an other end portion 20b of the shaft 20 to be described later is formed in a substantially central portion of the stator 14. The other end portion 20b of the shaft 20 is a portion of the shaft 20 opposite to a one end portion 20a to which a rotational force is transmitted from the drive part 16 in the axial direction DRa.

The holding hole 143 is provided with an other end bearing part 144 that rotatably supports the other end portion 20b of the shaft 20. The other end bearing part 144 is formed of a plain bearing that receives the other end portion 20b by a plain surface. The other end bearing part 144 may be formed of another bearing such as a ball bearing instead of the plain bearing. In the valve device 10 of the present embodiment, the holding hole 143 and the other end bearing part 144 constitute a holding part.

The drive part 16 is a device for outputting rotational force. The drive part 16 includes a motor 161 as a drive source and a gear part 162 as a power transmission member that transmits the output of the motor 161 to the shaft 20.

The motor 161 is a drive source that rotates by receiving a power supply. As the motor 161, for example, a servo motor or a brushless motor is employed. The motor 161 rotates in accordance with a control signal from a valve controller 17 electrically coupled to the motor 161.

The valve controller 17 is a computer having a memory that is a non-transitory tangible storage medium, a processor, and the like. The valve controller 17 executes a computer program stored in the memory and executes various control processing in accordance with the computer program.

The gear part 162 has a plurality of gears. The gear part 162 transmits the rotational operation of the motor 161 to the rotation part 18 by the meshing of the plurality of gears to rotate the rotation part 18. Specifically, the gear part 162 transmits the rotational operation of the motor 161 to the shaft 20 of the rotation part 18 to rotate the shaft 20 and the rotor 22 constituting the rotation part 18. The gear part 162 of the present embodiment is formed of a gear mechanism including a helical gear or a spur gear as a gear. The gear part 162 is not limited to the gear mechanism described above but may be constituted by, for example, a worm gear having a worm and a worm wheel as gears.

In the valve device 10, the rotation part 18 rotates about the axis CL of the shaft 20 by the output of the drive part 16. The rotation part 18 includes the shaft 20, the rotor 22 as a valve body, and an intermediate element 24 that couples the rotor 22 to the shaft 20.

The shaft 20 is a rotation shaft that rotates about a predetermined axis CL by the rotational force output from the drive part 16. The shaft 20 extends along the axial direction DRa. The shaft 20 has the one end portion 20a to which the rotational force is transmitted from the drive part 16 to one side in the axial direction DRa and the other end portion 20b opposite to the one end portion 20a in the axial direction DRa. The one end portion 20a is coupled to the gear part 162. In the shaft 20, a portion between the one end portion 20a and the other end portion 20b is coupled to the rotor 22 in a relatively non-rotatable manner via the intermediate element 24.

In the shaft 20, a one end portion 20a is rotatably supported by a one end bearing part 126 provided in the body cover 124, and the other end portion 20b is rotatably supported by the other end bearing part 144. The one end bearing part 126 is formed of a plain bearing that receives the one end portion 20a by a plain surface. The one end bearing part 126 may be formed of another bearing such as a ball bearing instead of the plain bearing.

The shaft 20 is tiltably coupled to the rotor 22 such that a contact state between the opening surface 140 of the stator 14 and the sliding surface 220 of the rotor 22 is held regardless of the posture of the shaft 20. Details of the coupling structure between the shaft 20 and the rotor 22 will be described later. "Tilting" means moving in an inclined manner in one direction.

The rotor 22 is a valve body that increases or decreases the opening degree of the first flow path hole 141 and the opening degree of the second flow path hole 142 with the rotation of the shaft 20. The opening degree of the first flow path hole 141 is a degree to which the first flow path hole 141 is opened, and the full opening and the full closing of the first flow path hole 141 are expressed as 100% and 0%, respectively. The full opening of the first flow path hole 141 is, for example, a state where the first flow path hole 141 is not closed by the rotor 22 at all. The fully closing of the first flow path hole 141 is, for example, a state where the entire first flow path hole 141 is closed by the rotor 22. The opening degree of the second flow path hole 142 is similar to the opening degree of the first flow path hole 141.

The rotor 22 is formed of a disc-shaped member a thickness direction of which is the axial direction DRa. The rotor 22 is disposed in the inlet space 120e so as to face the stator 14 in the axial direction DRa. The rotor 22 has the sliding surface 220 that slides while facing the opening surface 140 of the stator 14. The sliding surface 220 is a sealing surface that seals the opening surface 140 of the stator 14.

The rotor 22 is desirably formed of a material having a small linear expansion coefficient and excellent wear resistance as compared to the constituent material of the housing 12. The rotor 22 is made of a high hardness material having higher hardness than the housing 12. Specifically, the rotor 22 is made of ceramic. In the rotor 22, only a portion forming the sliding surface 220 may be formed of a material, such as ceramic, having a small linear expansion coefficient and excellent wear resistance as compared to the constituent material of the housing 12.

A rotor hole 221 is formed in the rotor 22 at a position eccentric to axis CL of shaft 20. The rotor hole 221 is a through hole penetrating in the axial direction DRa. The rotor hole 221 is formed in a portion of the rotor 22 overlapping the first flow path hole 141 and the second flow path hole 142 in the axial direction DRa at the time of rotation around the axis CL of the shaft 20 in the rotor 22.

In the valve device 10, when the rotor 22 is rotated such that the rotor hole 221 overlaps the first flow path hole 141 in the axial direction DRa, the first flow path hole 141 is opened. In the valve device 10, when the rotor 22 is rotated such that the rotor hole 221 overlaps the second flow path hole 142 in the axial direction DRa, the second flow path hole 142 is opened.

The rotor 22 is configured to be able to regulate a flow rate ratio of the fluid passing through the first flow path hole 141 and the fluid passing through the second flow path hole 142. That is, the rotor 22 is configured such that the opening degree of the second flow path hole 142 decreases as the opening degree of the first flow path hole 141 increases.

The intermediate element 24 constitutes a part of a coupling structure that couples the rotor 22 to the shaft 20. The intermediate element 24 also functions as a rotation-prevention mechanism that prevents the rotation of the rotor 22. The intermediate element 24 couples the rotor 22 to the shaft 20 such that a gap is formed between the other end portion 20b and the rotor 22. The intermediate element 24 is provided at a position closer to the one end portion 20a in the axial direction DRa than the rotor 22.

The intermediate element 24 includes an intermediate cylindrical part 241 covering the outer periphery of the shaft 20 and an intermediate pin 242 protruding from the intermediate cylindrical part 241 toward the rotor 22 along the axial direction DRa. The intermediate cylindrical part 241 is coupled to the shaft 20 by coupling means such as press-fitting, fitting, or bonding so as to be rotatable integrally with the shaft 20. The intermediate pin 242 is a member that transmits the rotation of the shaft 20 to the rotor 22. The intermediate pin 242 can be fitted into a pin reception part 222 formed on the surface of the rotor 22 opposite to the sliding surface 220.

The intermediate element 24 configured as described above is configured to prevent the rotation of the rotor 22 by fitting the intermediate pin 242 into the pin reception part 222. The rotation-prevention mechanism of the rotor 22 is not limited to the above-described one but may be achieved by another means.

Figure 5:
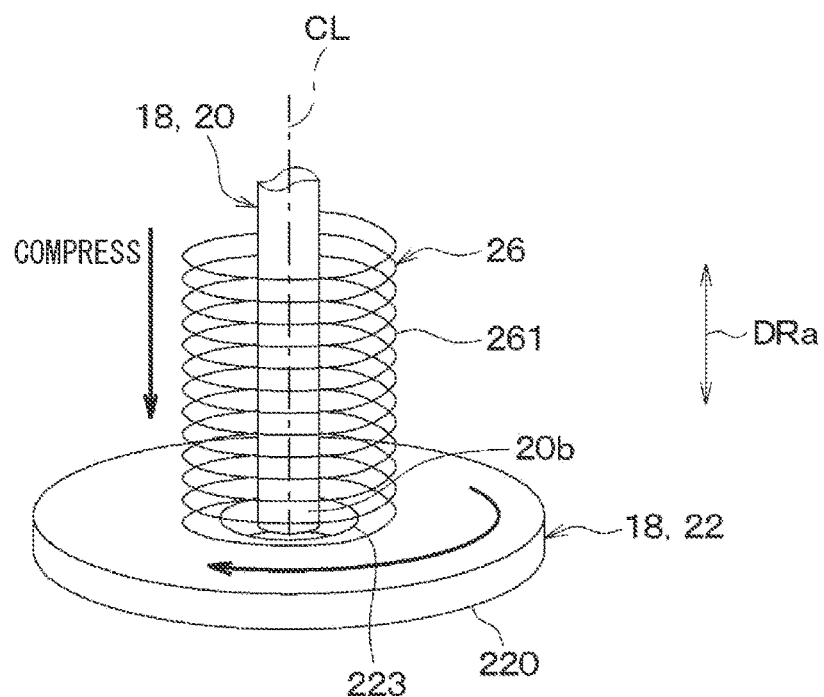
FIG. 5 is an explanatory view for explaining an energization member of the valve device according to the first embodiment.

The energization member 26 is a member that energizes and biases the rotor 22 toward the stator 14 corresponding to the flow path formation member. As illustrated in FIG. 5, the energization member 26 is formed of a coil-shaped compression spring 261 that applies a compressive load to the rotor 22. A compression spring 261 is an elastic member that elastically deforms in the axial direction DRa of the shaft 20.

The compression spring 261 is formed by being wound around the axis CL of shaft 20. That is, the shaft 20 is disposed inside the compression spring 261. The compression spring 261 is disposed in a compressed state between drive part 16 and rotor 22.

Specifically, the compression spring 261 is disposed inside the housing 12 such that the one end in the axial direction DRa is in contact with the body cover 124 and the other end in the axial direction DRa is in contact with the rotor 22. The compression spring 261 is not fixed to at least one of the rotor 22 and the body cover 124 so as not to function as a torsion spring.

As the compression spring 261, a spring having close ends at both ends is employed so as to be hardly inclined with respect to the axis CL of the shaft 20. In the closed-ended spring, the winding angle of only a winding at the spring end is changed, and the end of a spring wire is attached to the adjacent winding so as to improve the installation of the spring. As the compression spring 261, a spring having open ends at both ends may be employed.

The compression spring 261 presses the rotor 22 against the stator 14, whereby a contact state between the opening surface 140 of the stator 14 and the sliding surface 220 of the rotor 22 is held. This contact state is a state where the opening surface 140 of the stator 14 and the sliding surface 220 of the rotor 22 are in surface contact.

Here, the surface contact is a state where the opening surface 140 and the sliding surface 220 are in contact with each other at three points separated from each other by 90° or more in the circumferential direction DRc with the axis CL of the shaft 20 as the center. For example, as illustrated in FIG. 6, the rotor 22 is pressed against the stator 14 by the compression spring 261 such that the opening surface 140 and the sliding surface 220 are in contact with each other at a first contact P1, a second contact P2, and a third contact P3.

Figure 6:
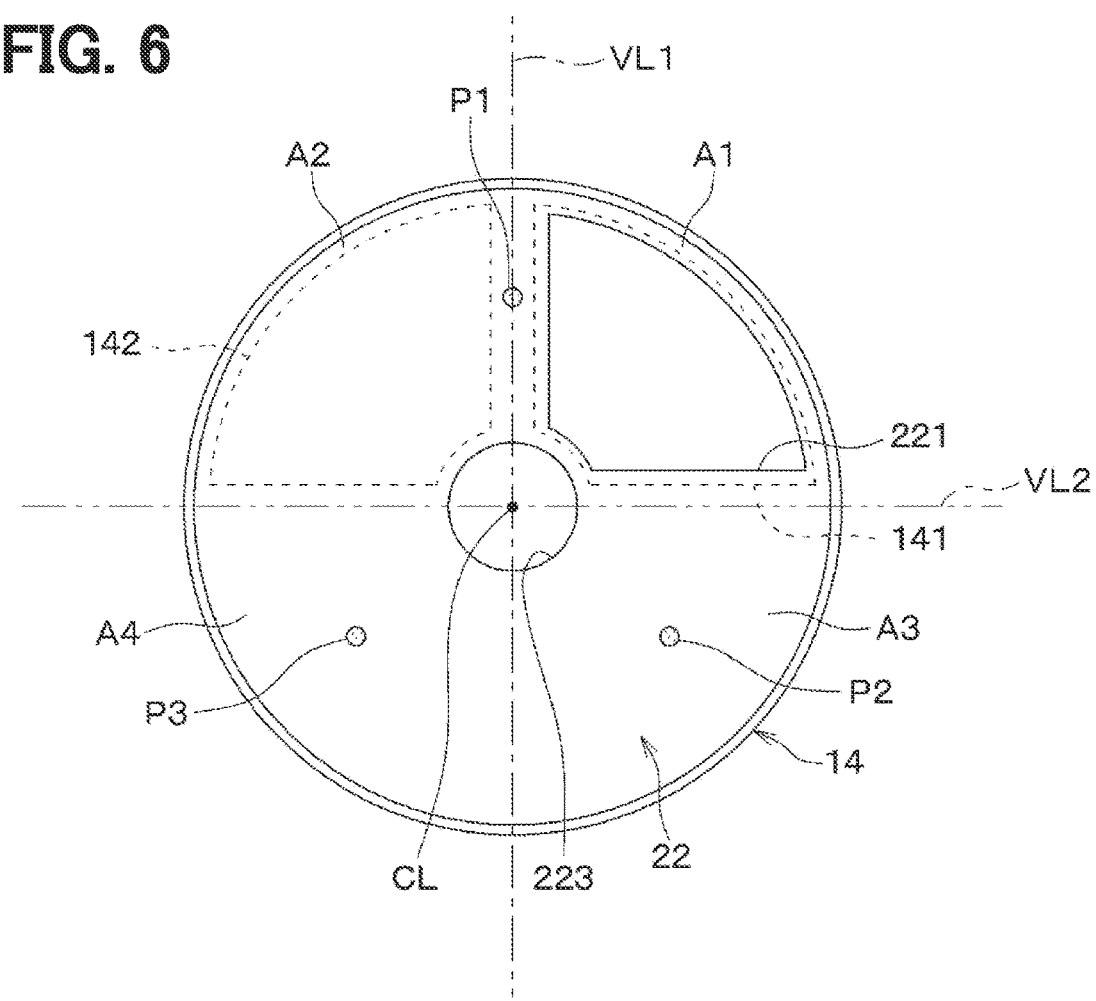
FIG. 6 is an explanatory view for explaining a contact state between a rotor and a stator.

In FIG. 6, a contact point at which the stator 14 and the rotor 22 are in contact with each other between the first flow path hole 141 and the second flow path hole 142 is defined as a first contact P1.

In FIG. 6, a first virtual line VL1 passing through the first contact P1 and the axis CL of the shaft 20 and a second virtual line VL2 orthogonal to the first virtual line VL1 and passing through the axis CL of the shaft 20 make a division into four regions A1, A2, A3, and A4. In FIG. 6, a contact point at which the stator 14 and the rotor 22 are in contact with each other in a third region A3, except for the first region A1 and the second region A2 adjacent to each other with the first contact P1 interposed therebetween, is defined as the second contact P2, and a contact point at which the stator 14 and the rotor 22 are in contact with each other in a fourth region A4 is defined as the third contact P3. The first contact P1, the second contact P2, and the third contact P3 with which the stator 14 and the rotor 22 are in contact are not limited to those illustrated in FIG. 6. The first contact P1, the second contact P2, and the third contact P3 may be defined based on, for example, a load acting on the stator 14 from the rotor 22 by the energization member 26.

Figure 7:
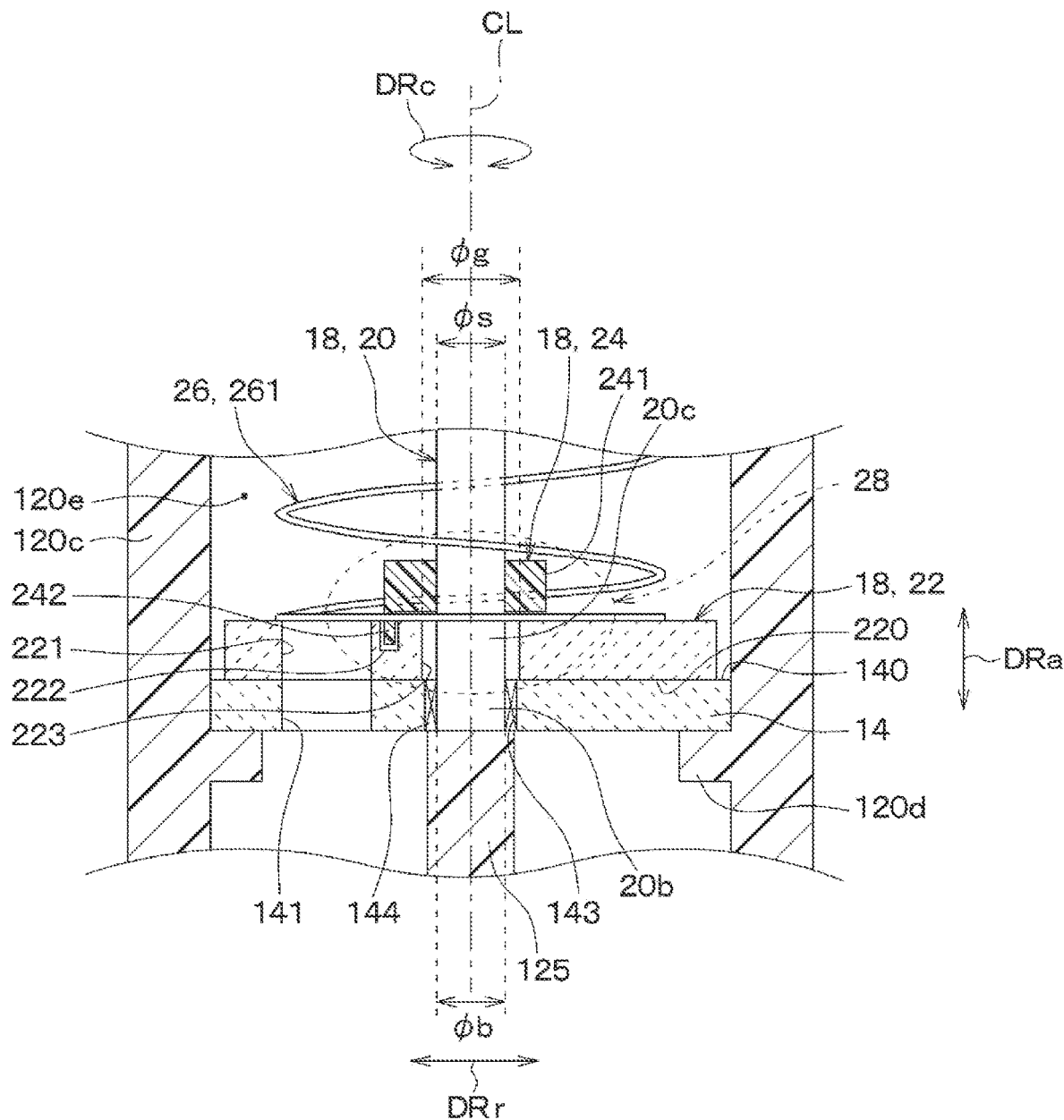
FIG. 7 is a schematic cross-sectional view illustrating a part of the valve device according to the first embodiment.

Subsequently, a coupling structure (coupling structure) between the shaft 20 and the rotor 22 of the present embodiment will be described with reference to FIG. 7. FIG. 7 is a partially enlarged view in which a portion VII in FIG. 3 is enlarged.

As illustrated in FIG. 7, the coupling structure between the shaft 20 and the rotor 22 includes a fitting structure 28 in which a part of the shaft 20 is fitted into a fitting hole 223 provided in the rotor 22. The fitting structure 28 is a fitting structure in which a part of the shaft 20 is fitted in the fitting hole 223 of the rotor 22 with a gap.

In the shaft 20 of the present embodiment, a part of the other end portion 20b constitutes a fitting part 20c to be fitted into a fitting hole 223 provided in the rotor 22. The fitting part 20c is a portion of the other end portion 20b overlapping the rotor 22 in the radial direction DRr.

The fitting hole 223 has a size in which a gap is formed between the fitting hole and the shaft 20 such that the shaft 20 is tiltable in a state where a part of the shaft 20 is fitted. That is, a diameter ϕg of the fitting hole 223 is larger than a diameter ϕs of the fitting part 20c of the shaft 20 (i.e., ϕg>ϕs).

The gap between the fitting hole 223 and the fitting part 20c is larger than the gap between the other end bearing part 144 constituting the holding part of the shaft 20 and the fitting part 20c. Specifically, a fitting dimensional difference Δϕa, which is a difference between the diameter ϕg of the fitting hole 223 and the diameter ϕs of the fitting part 20c, is larger than an axial dimensional difference Δϕb, which is a difference between an inner diameter ϕb of the other end bearing part 144 and the diameter ϕg of the fitting part 20c (i.e., Δϕa>Δϕb).

Here, for example, in a case where the fitting hole 223 is not circular, the diameter ϕg described above cannot be defined. Therefore, for example, in a case where the fitting hole 223 is not circular, the diameter ϕg of the fitting hole 223 may be set to a diameter of a circle having a cross-sectional area equal to that of the fitting hole 223 (i.e., an equivalent diameter), and the magnitude relationship described above may be set. This also applies to the fitting part 20c and the other end bearing part 144.

Figure 8:
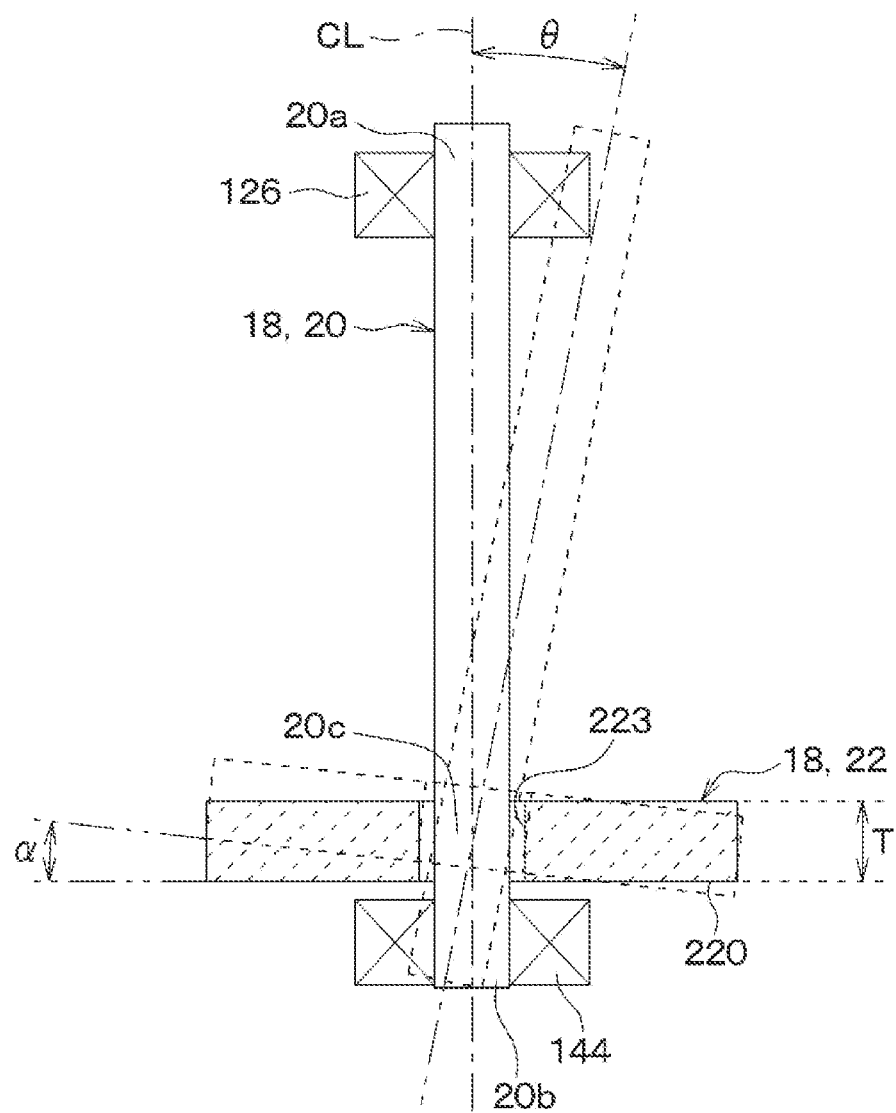
FIG. 8 is an explanatory view for explaining inclination of a shaft in the valve device.
Figure 9:
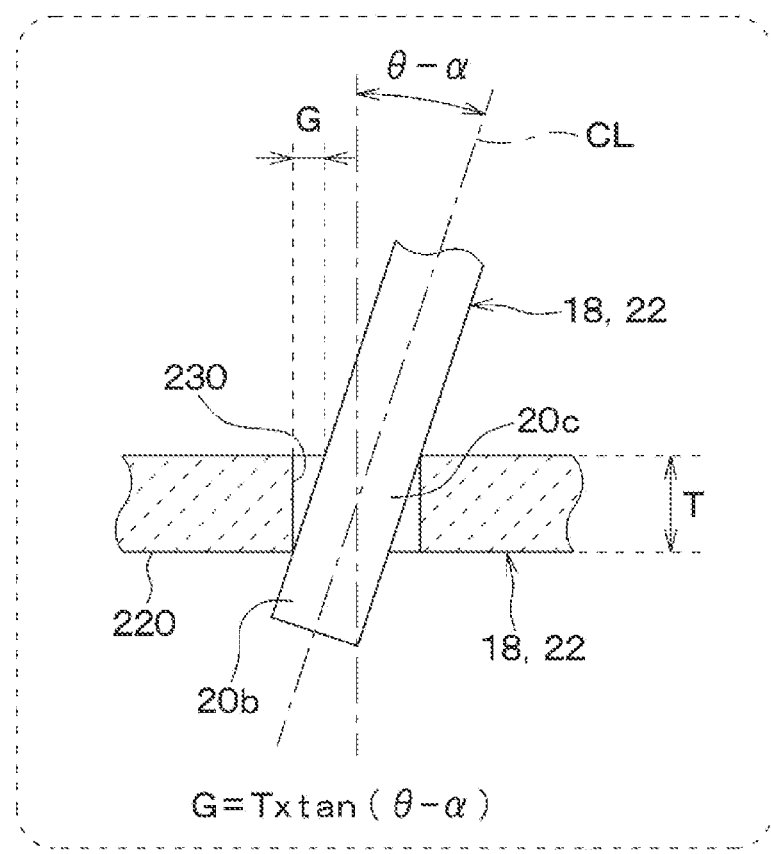
FIG. 9 is an explanatory view for explaining a relationship between the inclination of the shaft and a gap generated in a fitting portion in the valve device.

As illustrated in FIG. 8, the shaft 20 and the rotor 22 may, for some reason, be inclined by a broken line from a design target posture indicated by a solid line. Examples of factors that cause the shaft 20 and the rotor 22 to be inclined include dimensional variations in the axial direction DRa of the shaft 20, and a structure in which both ends of the shaft 20 are held by separate members. In such a structure, when the assembly accuracy between the body cover 124 and the body 120 is not sufficient, the relative position between the one end bearing part 126 and the other end bearing part 144 is shifted in the radial direction DRr, and the shaft 20 is inclined.

In order to deal with this, it is conceivable to ensure the close contact between the rotor 22 and the stator 14 by increasing a pressing load by the energization member 26, but in this case, a load torque increases as the sliding resistance between the rotor 22 and the stator 14 increases.

Therefore, in the valve device 10 of the present embodiment, a part of the shaft 20 is fitted in the fitting hole 223 of the rotor 22 with the fitting structure in which a part of the shaft 20 is fitted with a gap. This eliminates the need to increase the pressing load by the energization member 26 and also enables the prevention of an increase in load torque.

Here, when a maximum angle allowed in design as an inclination angle of the shaft 20 is defined as a shaft inclination angle θ, and a maximum angle allowed in design as an inclination angle of the rotor 22 is defined as a rotor inclination angle α, a gap G between the fitting hole 223 and the fitting part 20c desirably satisfies the following Formula F1. In a case where the gap G between the fitting hole 223 and the fitting part 20c satisfies the following Formula F1, even when the shaft 20 or the rotor 22 is inclined within the design range, the opening surface 140 of the stator 14 and the sliding surface 220 of the rotor 22 can be brought into surface contact with each other.

$$G \geq T \times \tan(\theta - \alpha) \tag{F1}$$

Further, the gap G between the fitting hole 223 and the fitting part 20c may be set to be larger than an allowable deviation amount allowed as a deviation amount in the radial direction DRr between the rotation center of the one end portion 20a and the rotation center of the other end portion 20b of the shaft 20. This also makes it possible to ensure the close contact between the rotor 22 and the stator 14 within the design range.

Next, the operation of the valve device 10 of the present embodiment will be described. In the valve device 10, as illustrated in FIGS. 3 and 4, the fluid flows from the inlet 121 into the inlet space 120e as indicated by an arrow Fi. When the first flow path hole 141 is open, the fluid flows from the inlet space 120e to the first outlet space 120g via the first flow path hole 141. The fluid flowing into the first outlet space 120g flows out of the first outlet space 120g to the outside of the valve device 10 via the first outlet 122 as indicated by an arrow F1o. In this case, the flow rate of the fluid passing through first flow path hole 141 is determined in accordance with the opening degree of the first flow path hole 141. That is, the flow rate of the fluid flowing from inlet 121 to first outlet 122 via first flow path hole 141 increases as the opening degree of the first flow path hole 141 increases.

On the other hand, when the second flow path hole 142 is open, the fluid flows from the inlet space 120e into the second outlet space 120h via the second flow path hole 142. The fluid flowing into the second outlet space 120h flows out of the second outlet space 120h to the outside of the valve device 10 via the second outlet 123 as indicated by an arrow F2o. In this case, the flow rate of the fluid passing through the second flow path hole 142 is determined in accordance with the opening degree of the second flow path hole 142. That is, the flow rate of the fluid flowing from the inlet 121 to the second outlet 123 via the second flow path hole 142 increases as the opening degree of the second flow path hole 142 increases.

The valve device 10 of the present embodiment described above has a coupling structure that tiltably couples the shaft 20 to the rotor 22. Thus, even when the shaft 20 is inclined for some reason, it is possible to ensure the close contact between the rotor 22 and the stator 14 constituting the flow path formation member.

Here, in a case where the shaft 20 is simply coupled to the rotor 22 tiltably, the posture of the rotor 22 is defined by the pressure of the fluid. In this case, for example, when the pressure of the fluid changes, the posture of the rotor 22 is not fixed, and it becomes insufficient to ensure the close contact between the rotor 22 and the stator 14 constituting the flow path formation member.

In contrast, in the valve device 10 of the present embodiment, since the rotor 22 is pressed against the stator 14 by the energization member 26, the rotor 22 can be held in a posture in contact with the stator 14.

As described above, the valve device 10 of the present embodiment has a unique effect that fluid leakage due to a change in the posture of the shaft 20 can be prevented by the organic coupling between the coupling structure and the energization member 26.

The coupling structure between the shaft 20 and the rotor 22 includes the fitting structure 28 in which the fitting part 20c of the shaft 20 is fitted into a fitting hole 223 provided into the rotor 22. The fitting hole 223 has a size in which a gap is formed between the fitting hole 223 and the shaft 20 such that the shaft 20 is tiltable in a state where the fitting part 20c is fitted. With the fitting structure 28 in which the gap is formed between the fitting hole 223 and the fitting part 20c, contact between the fitting hole 223 and the fitting part 20c is prevented, so that sliding loss in the coupling structure can be reduced, and wear resistance can be ensured. That is, the fitting structure 28 can reduce a sliding loss and ensure wear resistance as compared to a coupling structure in which members slide like a joint.

Further, the gap between the fitting hole 223 and the fitting part 20c is larger than the gap between the other end bearing part 144 constituting the holding part of the shaft 20 and the fitting part 20c. As a result, the shaft 20 can be tiltably coupled to the rotor 22 by the coupling member while the shaft 20 is appropriately held by the holding part of the shaft 20.

Here, the energization member 26 is formed of the compression spring 261 that is an elastic member elastically deformed in the axial direction DRa of the shaft 20. Thus, a load for pressing the sliding surface 220 of the rotor 22 against the opening surface 140 of the stator 14 can be sufficiently ensured, thereby facilitating the contact state between the sliding surface 220 and the opening surface 140 to be held.

Specifically, the shaft 20 is disposed inside the compression spring 261. Hence the load of the compression spring 261 on the rotor 22 is prevented from being biased in the circumferential direction DRc of the shaft 20, thereby facilitating the contact state between the sliding surface 220 and the opening surface 140 to be held.

Modification of First Embodiment

Figure 10:
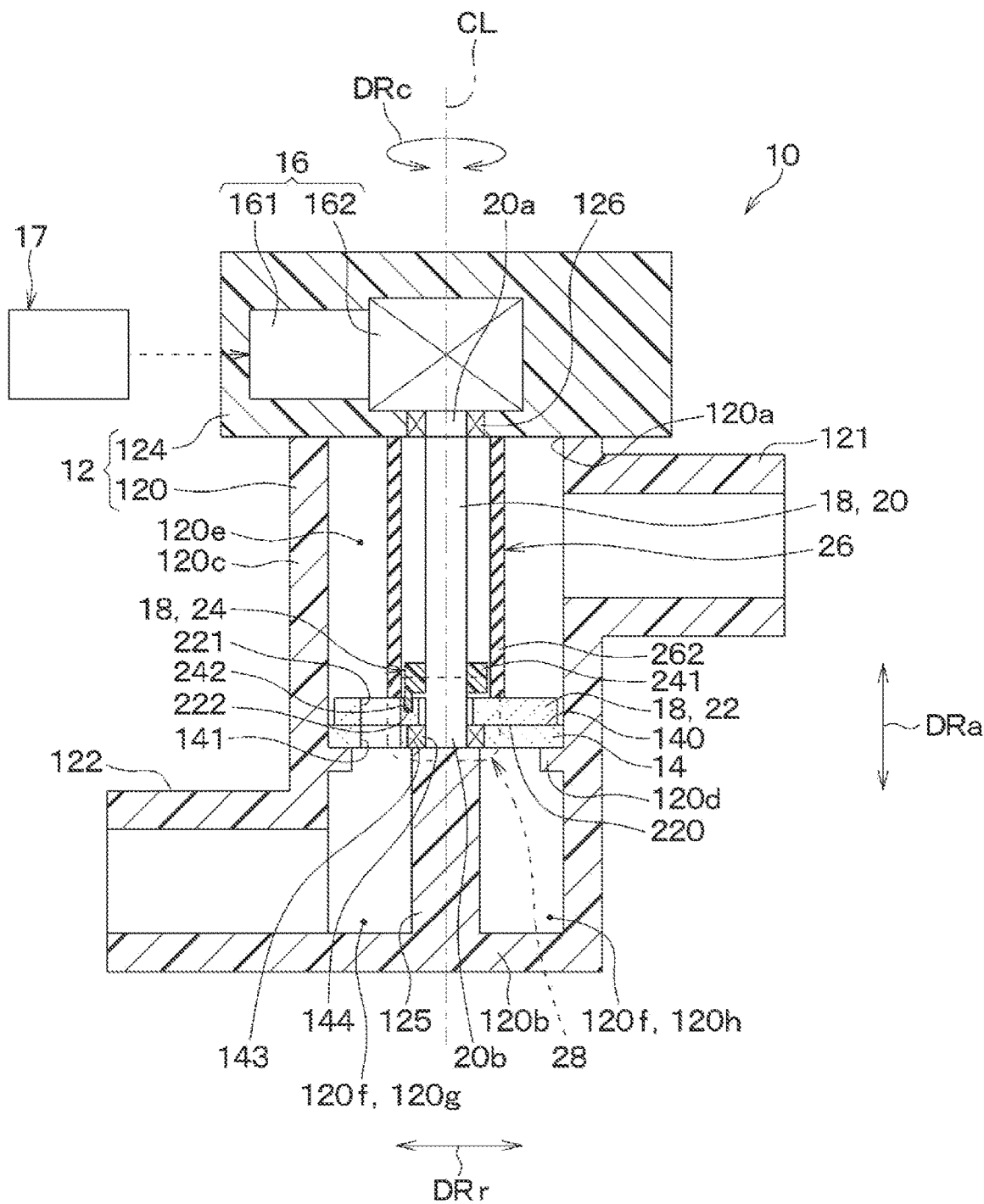
FIG. 10 is a schematic cross-sectional view illustrating a valve device according to a modification of the first embodiment.

In the embodiment described above, the example has been illustrated where the coil-shaped compression spring 261 is employed as the energization member 26, but the energization member 26 is not limited to the compression spring 261. For example, as illustrated in FIG. 10, the energization member 26 may be formed of, for example, a cylindrical elastic body 262 that elastically deforms in the axial direction DRa of the shaft 20. The elastic body 262 is made of, for example, a stretchable rubber material.

Second Embodiment

Next, a second embodiment will be described with reference to FIGS. 11 and 12. In the present embodiment, a portion different from the first embodiment will be mainly described.

Figure 11:
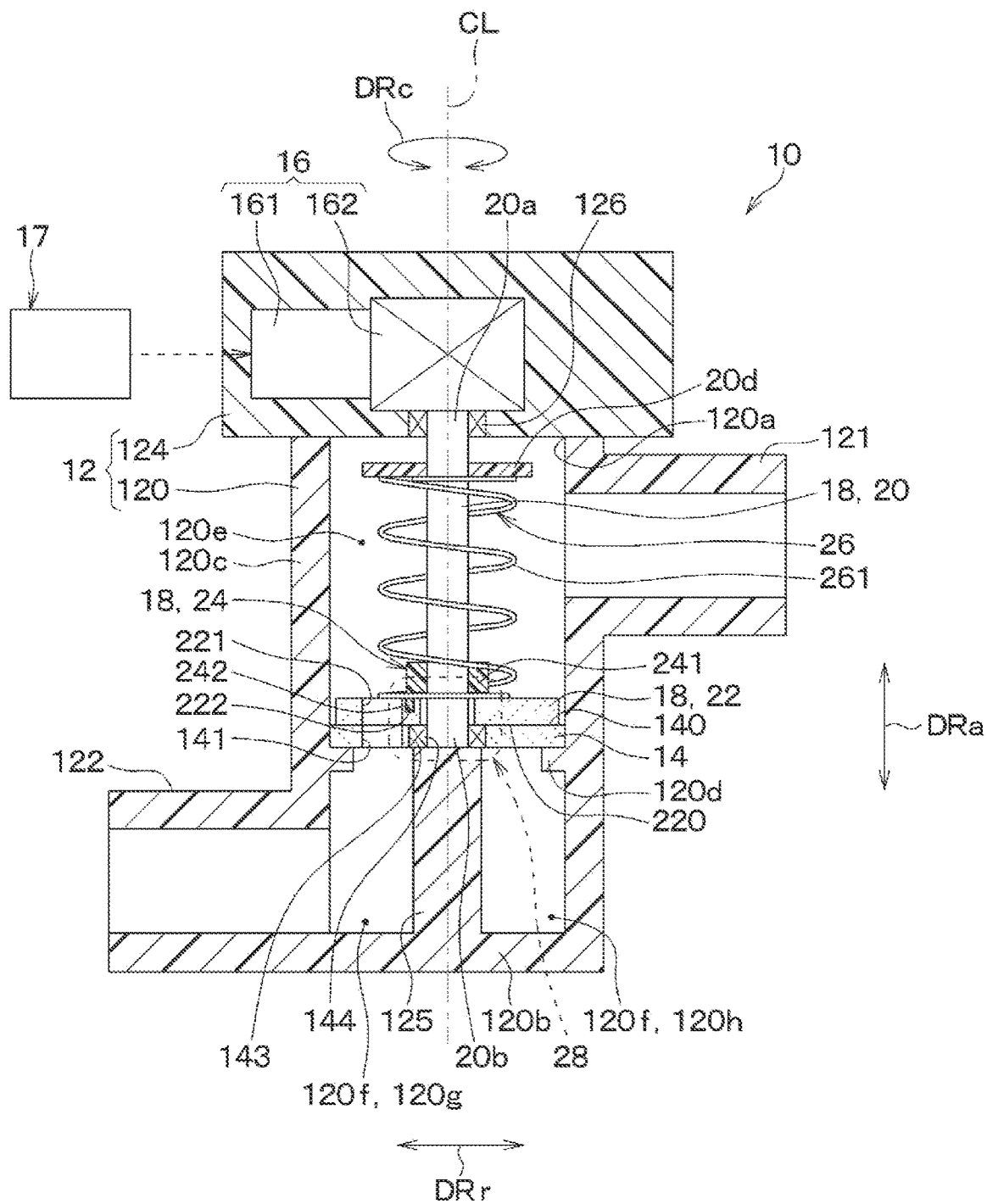
FIG. 11 is a schematic cross-sectional view illustrating a valve device according to a second embodiment.
Figure 12:
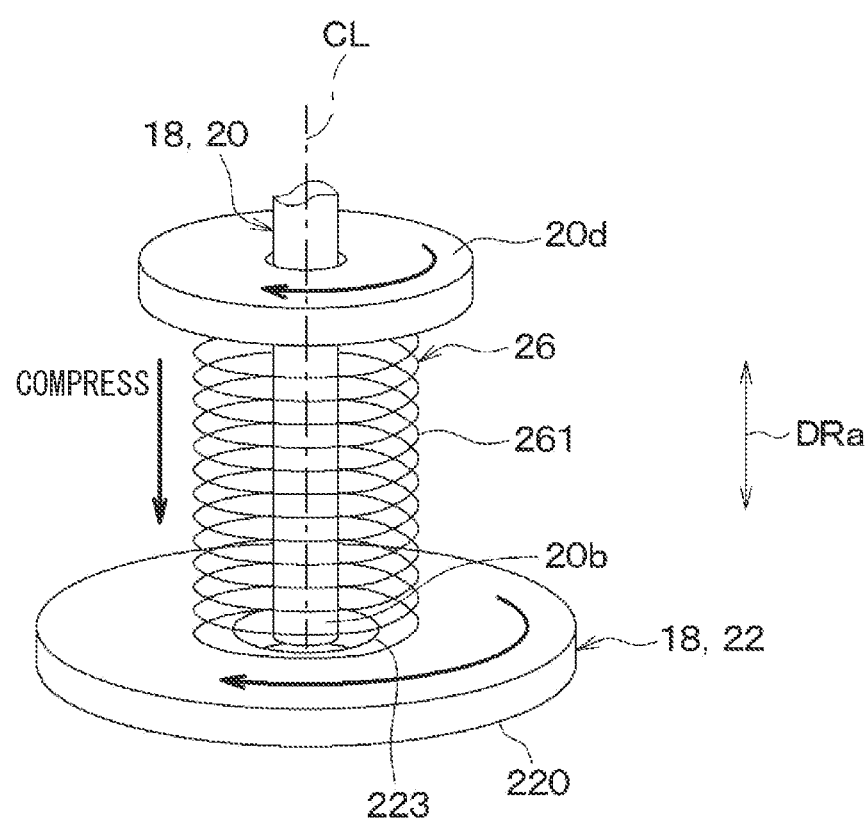
FIG. 12 is a schematic view illustrating an energization member of the valve device according to the second embodiment.

As illustrated in FIGS. 11 and 12, the shaft 20 is provided with a flange part 20d protruding in the radial direction DRr of the shaft 20 at a position closer to the one end portion 20a than the rotor 22. The flange part 20d is formed in a disc shape and is provided with respect to the shaft 20 so as to rotate integrally with the shaft 20. The outer diameter dimension of the flange part 20d is larger than the outer diameter dimension of the compression spring 261.

The compression spring 261 is disposed in a compressed state between the rotor 22 and the flange part 20d so as to rotate together with rotor 22. Specifically, the compression spring 261 is disposed inside the housing 12 such that the one end in the axial direction DRa is in contact with the flange part 20d and the other end in the axial direction DRa is in contact with the rotor 22. The compression spring 261 is not fixed to at least one of the rotor 22 and the body cover 124 so as not to function as a torsion spring.

The other configurations are similar to those of the first embodiment. As in the first embodiment, the valve device 10 of the present embodiment can obtain effects exhibited by a configuration similar or equal to those of the first embodiment.

The valve device 10 of the present embodiment is disposed in a state where the compression spring 261 is compressed between the rotor 22 and the flange part 20d. Accordingly, the compression spring 261 rotates integrally with the rotor 22 and the shaft 20, so that a sliding loss caused by the sliding of the compression spring 261 can be reduced or wear resistance can be ensured. In addition, since the compression spring 261 does not function as a torsion spring, it is possible to prevent an unnecessary force from acting on the rotor 22 in the circumferential direction around the axis CL of the shaft 20.

Modification of Second Embodiment

In the embodiment described above, the example has been illustrated where the flange part 20d is configured in a disc shape, but the flange part 20d is not limited to a disc shape. The flange part 20d may have, for example, a polygonal shape so long as the flange part 20d can hold one end of the compression spring 261. The flange part 20d may be provided integrally with the intermediate element 24 instead of the shaft 20.

Third Embodiment

Next, a third embodiment will be described with reference to FIGS. 13 and 14. In the present embodiment, a portion different from the first embodiment will be mainly described.

Figure 13:
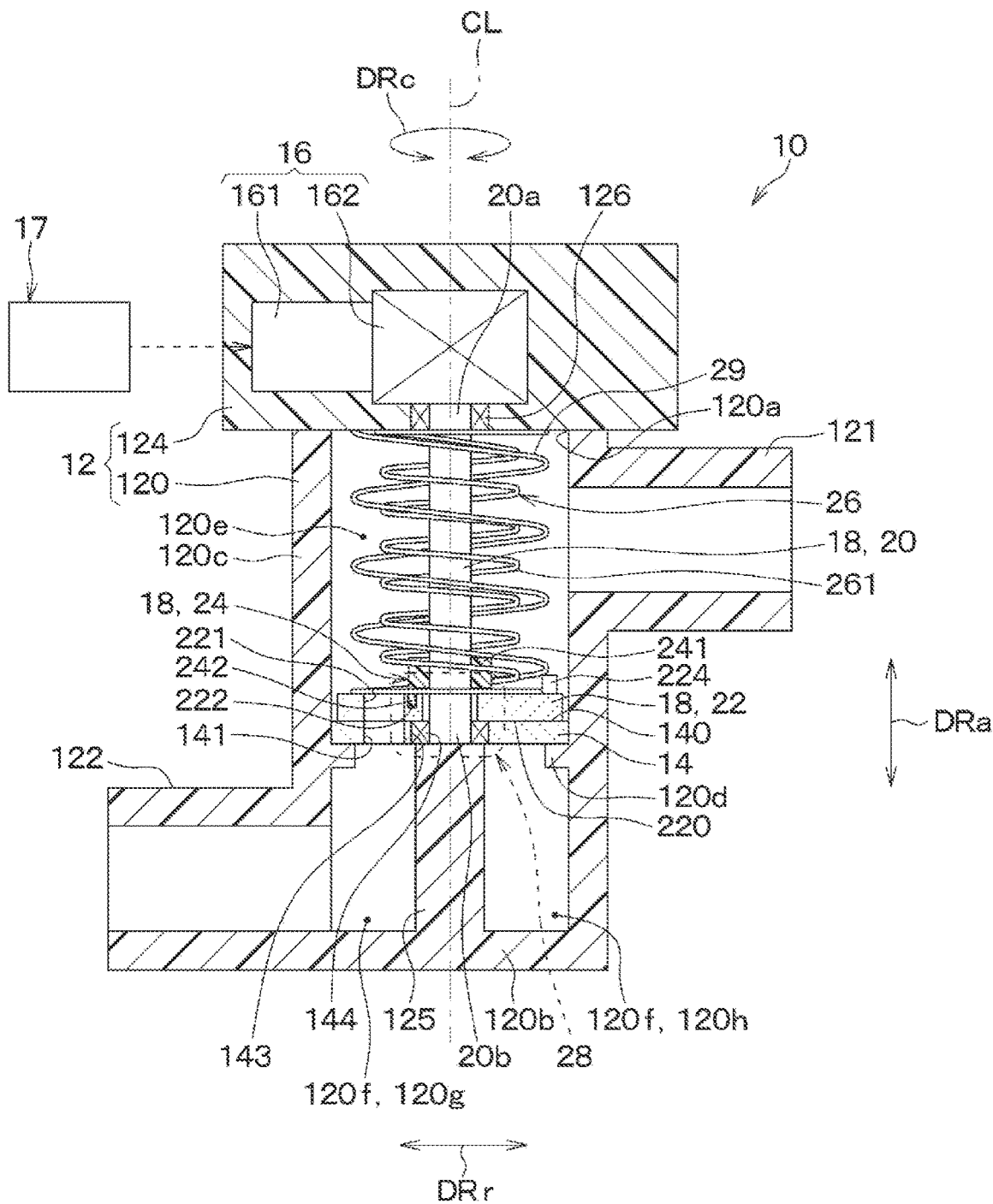
FIG. 13 is a schematic cross-sectional view illustrating a valve device according to a third embodiment.
Figure 14:
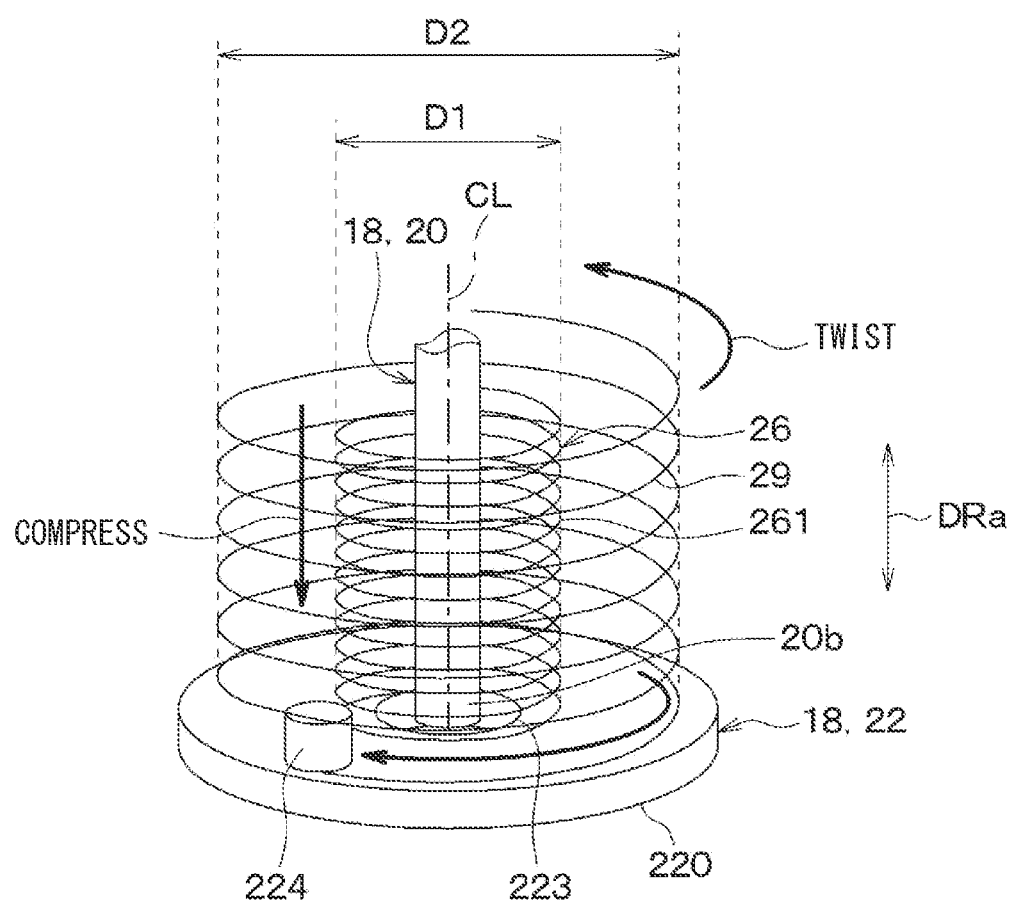
FIG. 14 is a schematic view illustrating an energization member of the valve device according to the third embodiment.

As illustrated in FIGS. 13 and 14, the valve device 10 includes a coil-shaped torsion spring 29 that energizes the rotor 22 to one side in the circumferential direction DRc around the axis CL of the shaft 20. The torsion spring 29 is disposed between the drive part 16 and the rotor 22. The torsion spring 29 is formed by being wound around the axis CL of the shaft 20. A coil diameter D2 of the torsion spring 29 is larger than a coil diameter D1 of the compression spring 261. The compression spring 261 is disposed inside the torsion spring 29.

Unlike the compression spring 261, the torsion spring 29 is fixed to each of the rotor 22 and the body cover 124. In the torsion spring 29, one end side in the axial direction DRa is coupled to the body cover 124 in a relatively non-rotatable manner, and the other end side in the axial direction DRa is coupled to the rotor 22 in a relatively non-rotatable manner. Although various methods for coupling the torsion spring 29 to the rotor 22 are conceivable, for example, the end of the torsion spring 29 is coupled to the rotor 22 by being locked to a fixing pin 224 fixed to the rotor 22.

The torsion spring 29 is used in a state of being twisted in the circumferential direction DRc to generate elastic deformation. The torsion spring 29 generates an energizing force for energizing and biasing the rotor 22 to one side in the circumferential direction DRc by its own elastic deformation. The torsion spring 29 is merely twisted in the circumferential direction DRc and is not compressed in the axial direction DRa.

Here, in the cylindrical coil spring, the relationship between the load P and the deflection amount δ is basically expressed by the following Formula F2.

$$P=\{G \times d^4 \times \delta\}/\{8 \times Na \times D^3\} \quad (F2)$$

Here, in Formula F2, an elastic coefficient of a coil wire is denoted by G, the diameter of the coil wire is denoted by d, the coil diameter is denoted by D, and the coil winding number is denoted by Na.

According to Formula F2, the spring constant of the coil spring increases as the coil diameter D decreases. When the spring constant is large, a load acting on the rotor 22 greatly fluctuates. Such load variation may cause deterioration in the close contact between the rotor 22 and the stator 14.

In contrast, a winding number Na of the compression spring 261 of the present embodiment is larger than that of the torsion spring 29 such that the load acting on the rotor 22 is stabilized. The winding number Na of the compression spring 261 is set so as to increase as the difference between the coil diameter of the compression spring 261 and the coil diameter of the torsion spring 29 increases, for example.

The other configurations are similar to those of the first embodiment. As in the first embodiment, the valve device 10 of the present embodiment can obtain effects exhibited by a configuration similar or equal to those of the first embodiment.

Here, in a case where the rotor 22 and the shaft 20 are configured separately, a relative positional deviation may occur between the rotor 22 and the shaft 20 in the circumferential direction DRc. Such positional deviation is not preferred since causing fluid leakage.

In contrast, when the rotor 22 is energized to one side in the circumferential direction DRc of the shaft 20 by the torsion spring 29, it is possible to prevent the occurrence of relative positional deviation between the rotor 22 and the shaft 20 in the circumferential direction DRc.

In addition, by increasing the winding number Na of the compression spring 261 with the coil diameter D1 smaller than the coil diameter D2 of the torsion spring 29, it is possible to prevent the spring constant of the compression spring 261 from becoming excessively large. Thereby, the load can be stabilized against the deflection of the compression spring 261.

Modification of Third Embodiment

In the third embodiment described above, the example has been illustrated where the spring constant is prevented from becoming excessively large by increasing the winding number Na of the compression spring 261, but the compression spring 261 is not limited thereto. As the compression spring 261, for example, a coil wire having a diameter smaller than that of the torsion spring 29 may be employed.

Fourth Embodiment

Next, a fourth embodiment will be described with reference to FIGS. 15 and 16. In the present embodiment, a portion different from the first embodiment will be mainly described.

Figure 15:
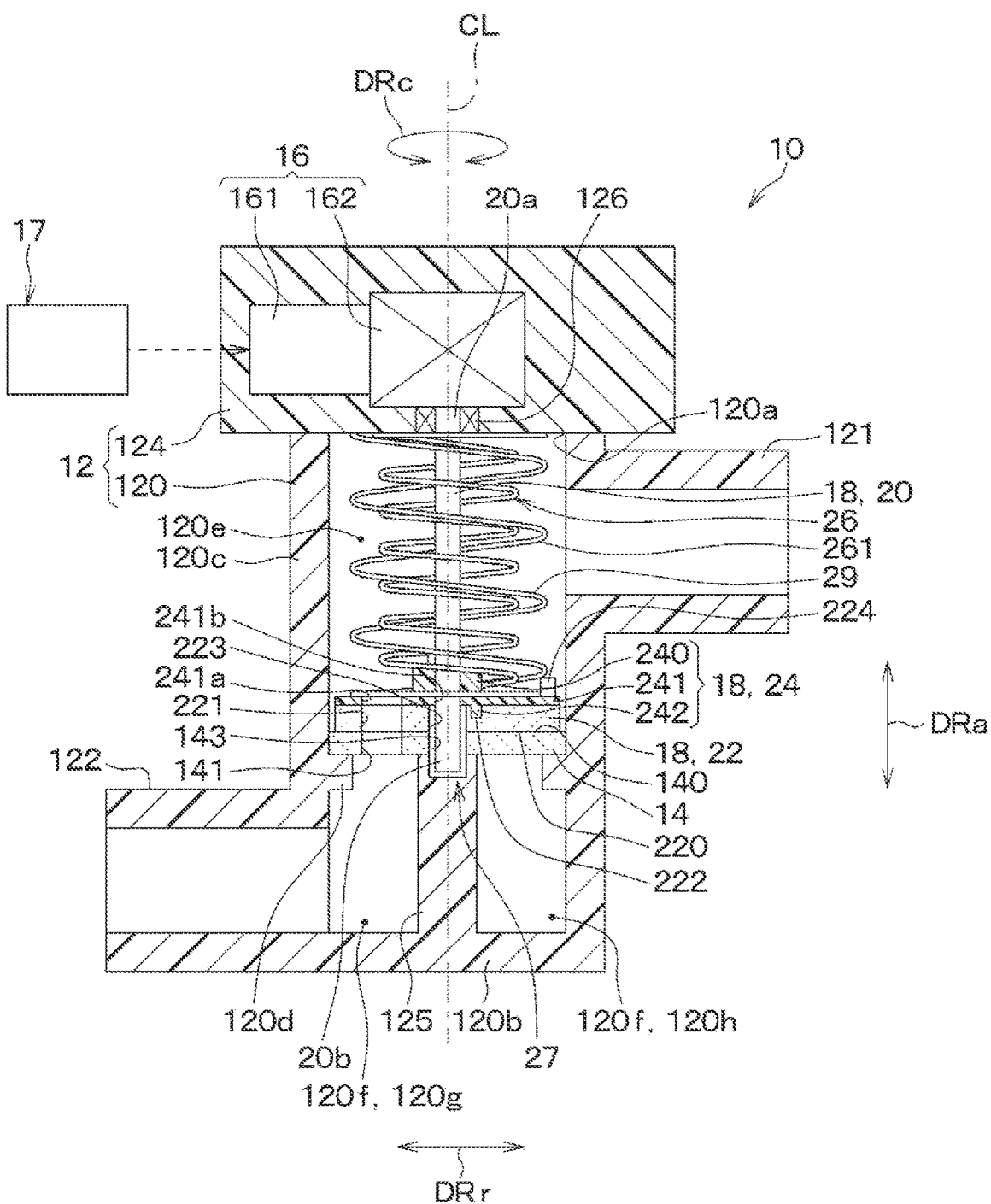
FIG. 15 is a schematic cross-sectional view illustrating a valve device according to a fourth embodiment.
Figure 16:
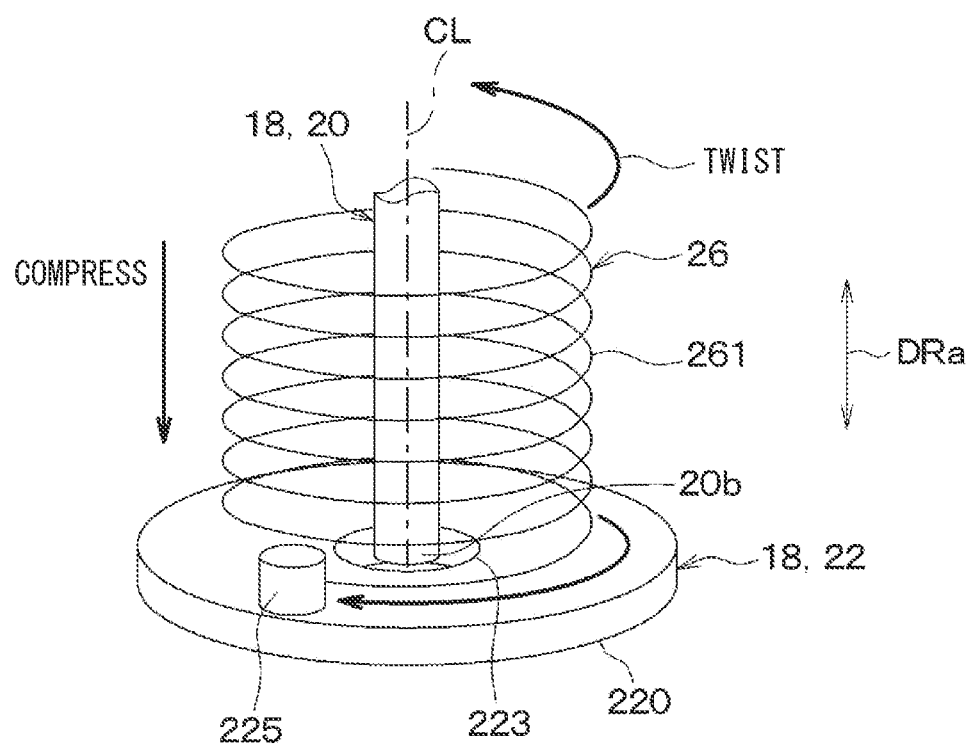
FIG. 16 is a schematic view illustrating an energization member of the valve device according to the fourth embodiment.

As illustrated in FIGS. 15 and 16, the energization member 26 is formed of an elastic member coupled to the rotor 22 so as to not only energize the rotor to the stator 14 but also energize the rotor 22 to one side in the circumferential direction DRc. Specifically, the energization member 26 includes a compression spring 261 configured to also function as a torsion spring.

The compression spring 261 of the present embodiment is fixed to each of the rotor 22 and the body cover 124. In the compression spring 261, one end side in the axial direction DRa is coupled to the body cover 124 in a relatively non-rotatable manner, and the other end side in the axial direction DRa is coupled to the rotor 22 in a relatively non-rotatable manner. Although various methods for coupling the compression spring 261 to the rotor 22 are conceivable, for example, the end of the compression spring 261 is coupled to the rotor 22 by being locked to a fixing pin 225 fixed to the rotor 22.

Unlike the first embodiment, the compression spring 261 is used in a state of being twisted in the circumferential direction DRc to cause elastic deformation. The compression spring 261 generates an energizing force for energizing the rotor 22 to one side in the circumferential direction DRc by its own elastic deformation.

The other configurations are similar to those of the first embodiment. As in the first embodiment, the valve device 10 of the present embodiment can obtain effects exhibited by a configuration similar or equal to those of the first embodiment.

In the valve device 10 of the present embodiment, the elastic member has a function as a torsion spring in addition to a function as the compression spring 261. Therefore, it is possible to prevent positional deviation between the rotor 22 and the shaft 20 in the circumferential direction DRc of the shaft 20 while holding the posture of the rotor 22 in a posture in contact with the stator 14 without increasing the number of components of the valve device 10.

Fifth Embodiment

Next, a fifth embodiment will be described with reference to FIGS. 17 and 18. In the present embodiment, a portion different from the first embodiment will be mainly described.

Figure 17:
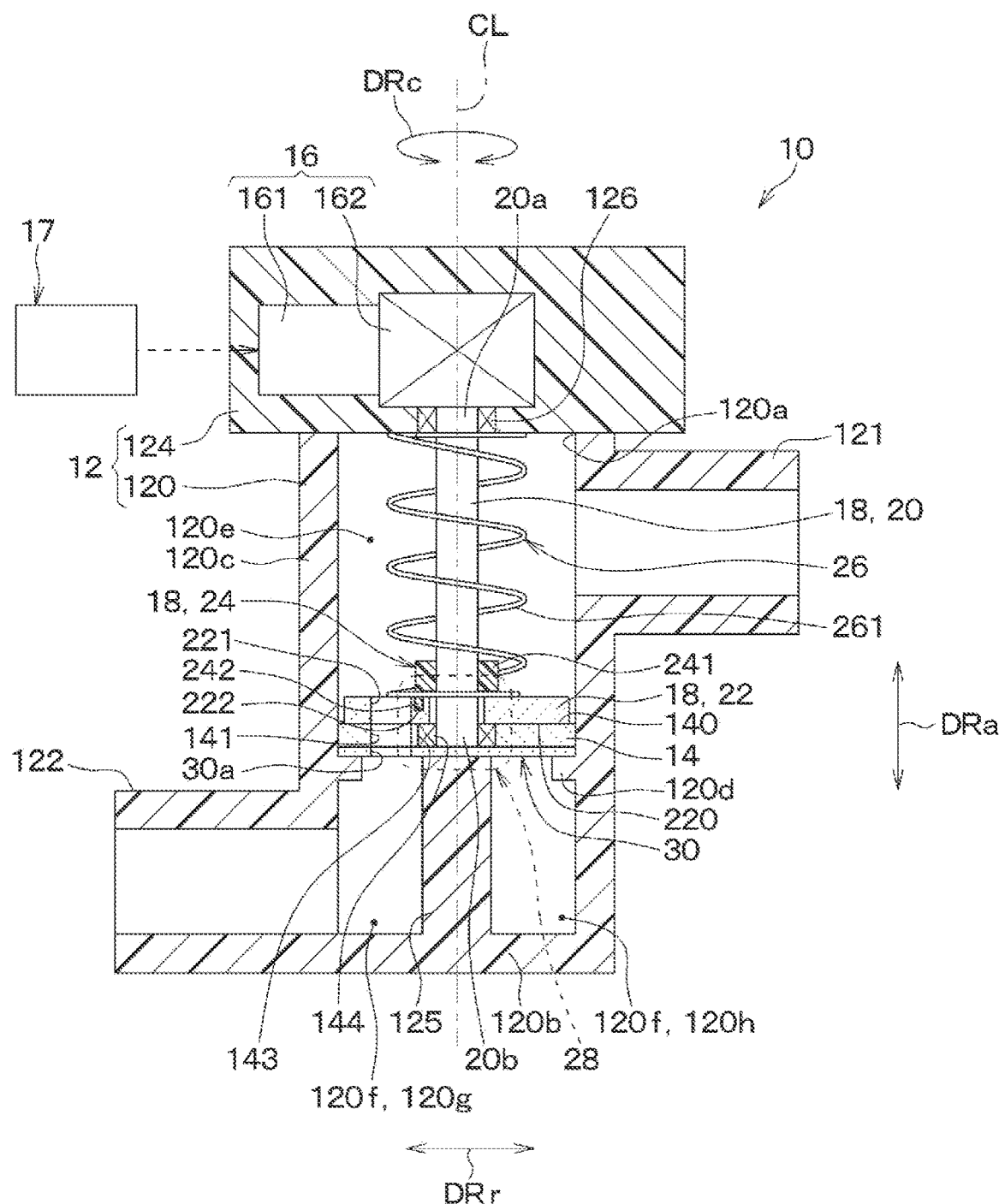
FIG. 17 is a schematic cross-sectional view illustrating a valve device according to a fifth embodiment.
Figure 18:
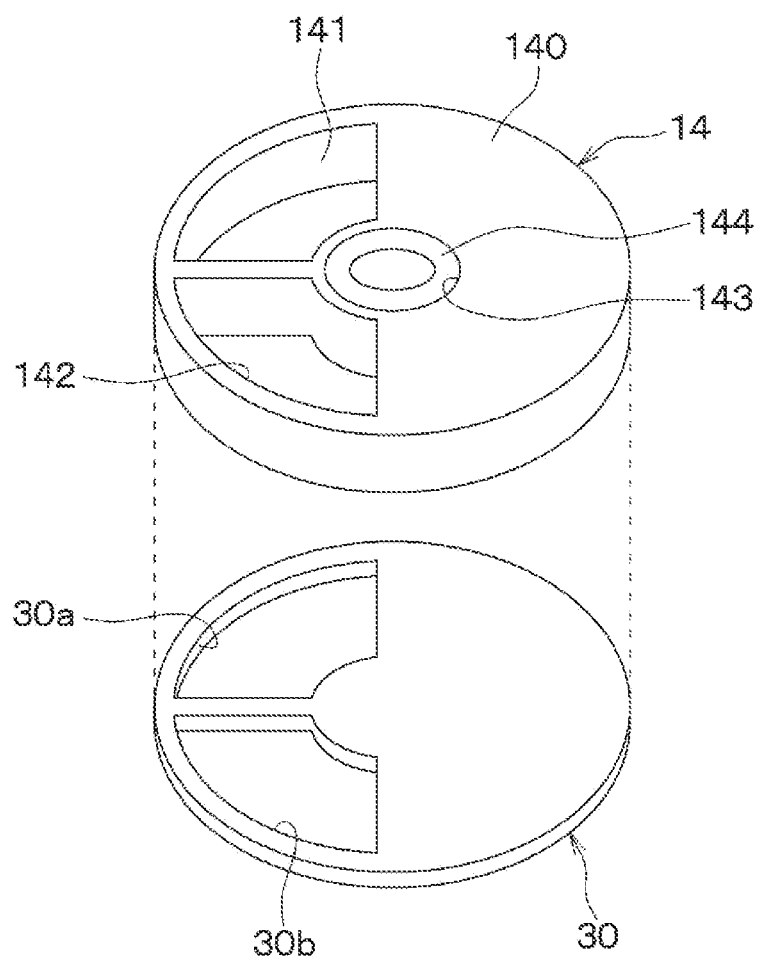
FIG. 18 is a schematic perspective view illustrating a stator and a sealing member of the valve device according to the fifth embodiment.

As illustrated in FIG. 17, in the valve device 10, a sealing member 30 is disposed between the stator 14 and the housing 12. The sealing member 30 is interposed between the stator 14 and the protrusion 120d of the housing 12. This prevents fluid leakage from the gap between the stator 14 and the protrusion 120d of the housing 12.

The sealing member 30 is configured to be elastically deformable in the axial direction DRa. As illustrated in FIG. 18, the sealing member 30 is formed of a disc-shaped member a thickness direction of which is the axial direction DRa. The sealing member 30 has an outer diameter equivalent to that of the stator 14 so as to overlap the stator 14 in the axial direction DRa. The thickness of the sealing member 30 is smaller than the thickness of the stator 14.

In the sealing member 30, a first through hole 30a through which a fluid is allowed to pass is formed in a portion facing the first flow path hole 141. Further, in the sealing member 30, a second through hole 30b through which a fluid is allowed to pass is formed in a portion facing the second flow path hole 142.

The other configurations are similar to those of the first embodiment. As in the first embodiment, the valve device 10 of the present embodiment can obtain effects exhibited by a configuration similar or equal to those of the first embodiment.

In the valve device 10 of the present embodiment, the sealing member 30 is disposed between the stator 14 and the housing 12. Accordingly, sealing performance between the stator 14 and the housing 12 can be ensured by the sealing member 30. For example, when the pressure acting on the rotor 22 varies in the circumferential direction DRc, the rotor 22 may be in an inclined posture. However, even in this case, the stator 14 can be inclined following the rotor 22 due to the deformation of the sealing member 30. As described above, with the configuration in which the sealing member 30 is interposed between the stator 14 and the housing 12, it is possible to ensure the close contact between the stator 14 and the rotor 22 and sufficiently prevent fluid leakage in the valve device 10.

Sixth Embodiment

Next, a sixth embodiment will be described with reference to FIGS. 19 and 20. In the present embodiment, a portion different from the first embodiment will be mainly described.

Figure 19:
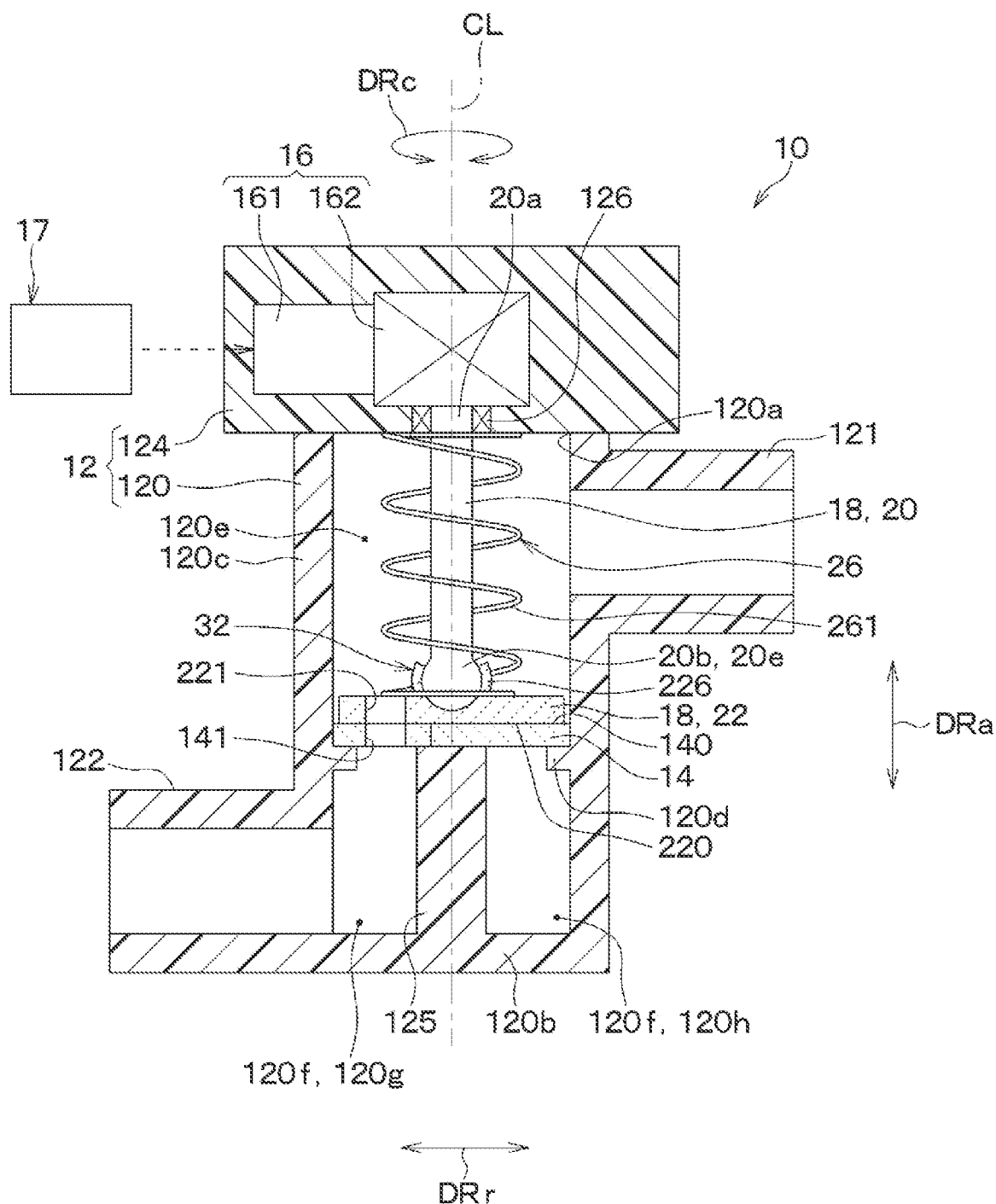
FIG. 19 is a schematic cross-sectional view illustrating a valve device according to a sixth embodiment.

As illustrated in FIG. 19, a universal joint 32 is employed as a coupling member between the shaft 20 and the rotor 22. The universal joint 32 is a joint capable of changing a joining angle. Specifically, the universal joint 32 couples the shaft 20 and the rotor 22 such that an angle formed between the sliding surface 220 of the rotor 20 and the axis CL of the shaft 22 is changeable.

Figure 20:
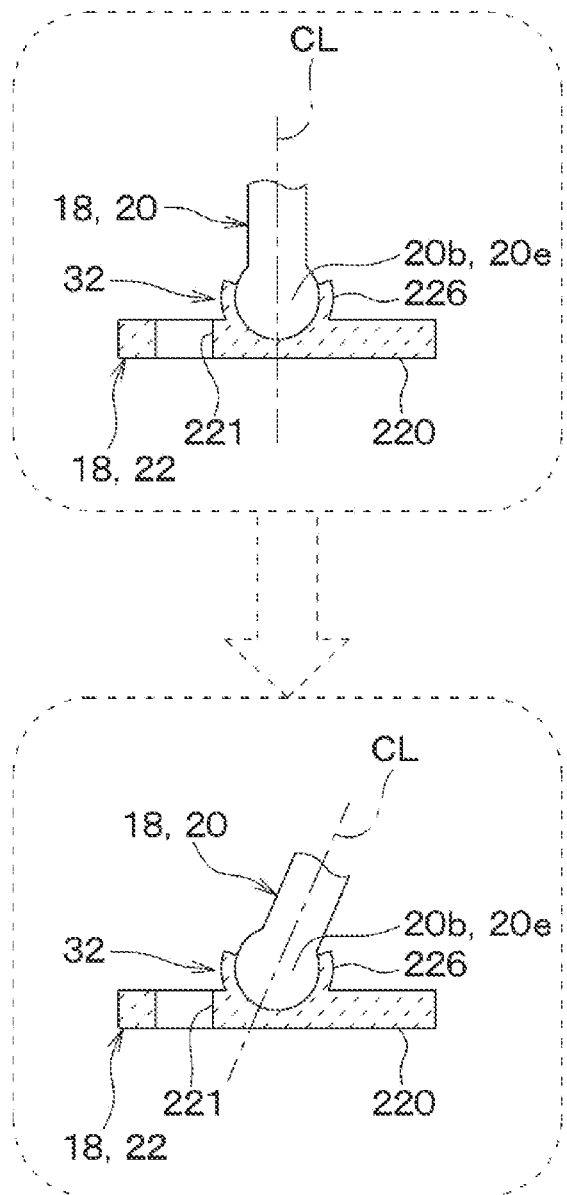
FIG. 20 is an explanatory view for explaining a coupling portion between a shaft and a rotor of a valve device according to the sixth embodiment.

As illustrated in FIG. 20, the universal joint 32 is formed of a ball joint 321. The ball joint 321 includes a ball stud 20e provided at the other end portion 20b of the shaft 20 and a socket 226 provided on the surface of the rotor 22. The ball stud 20e is formed of a sphere having a spherical surface. The socket 226 has an inner shape corresponding to the spherical surface of the ball stud 20e so as to be contactable with the spherical surface of the ball stud 20e. The rotor 22 is rotatable together with the shaft 20 by frictional force when the ball stud 20e and the socket 226 are in contact with each other.

The other configurations are similar to those of the first embodiment. As in the first embodiment, the valve device 10 of the present embodiment can obtain effects exhibited by a configuration similar or equal to those of the first embodiment.

Modification of Sixth Embodiment

In the ball joint 321 of the sixth embodiment described above, the example has been illustrated where the ball stud 20e is provided in the other end portion 20b of the shaft 20, and the socket 226 provided on the surface of the rotor 22 is provided, but the present invention is not limited thereto. The ball joint 321 may include, for example, a socket provided in the other end portion 20b of the shaft 20 and a ball stud provided in the rotor 22.

Seventh Embodiment

Next, a seventh embodiment will be described with reference to FIGS. 21 and 22. In the present embodiment, a portion different from the sixth embodiment will be mainly described.

Figure 21:
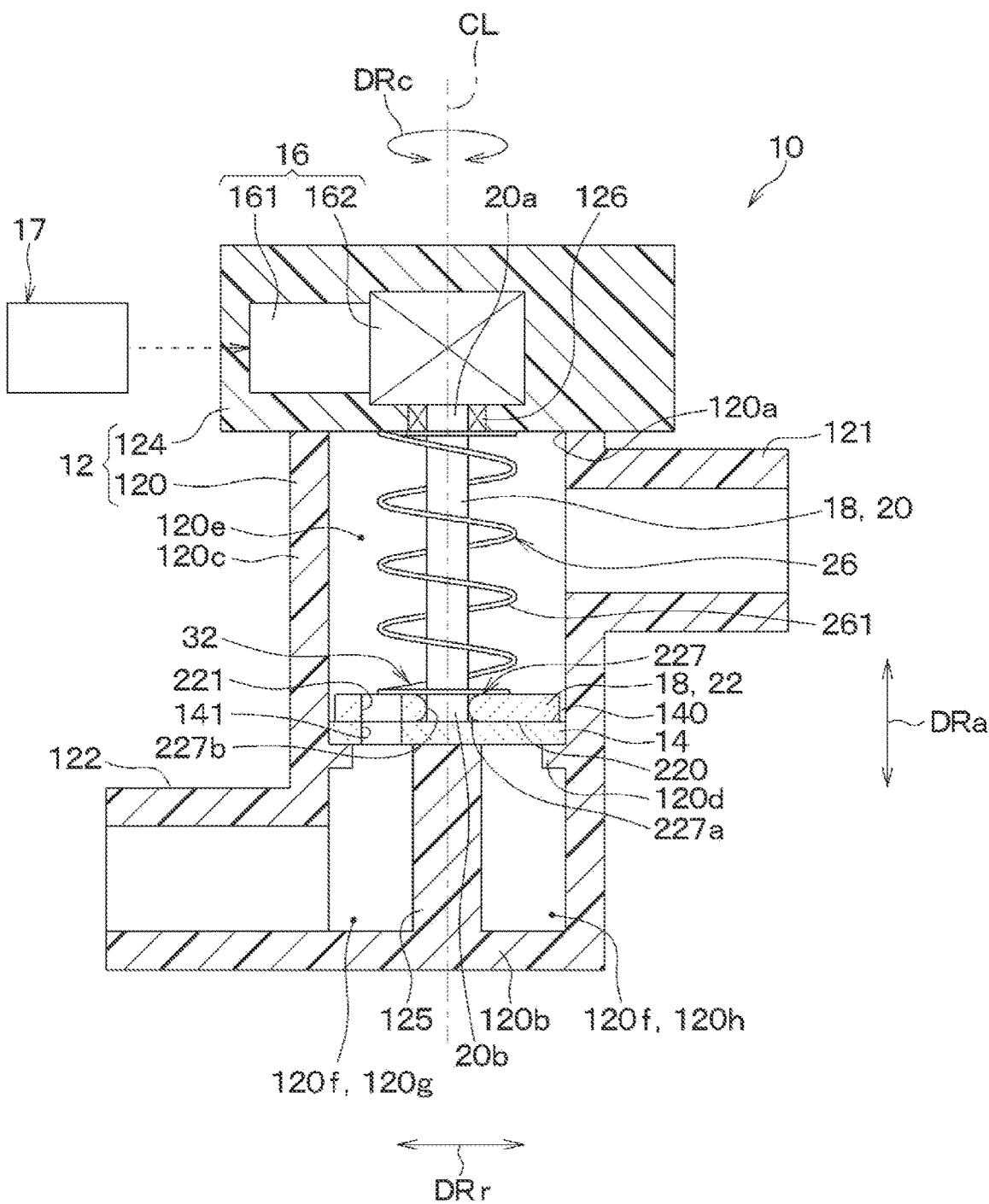
FIG. 21 is a schematic cross-sectional view illustrating a valve device according to a seventh embodiment.
Figure 22:
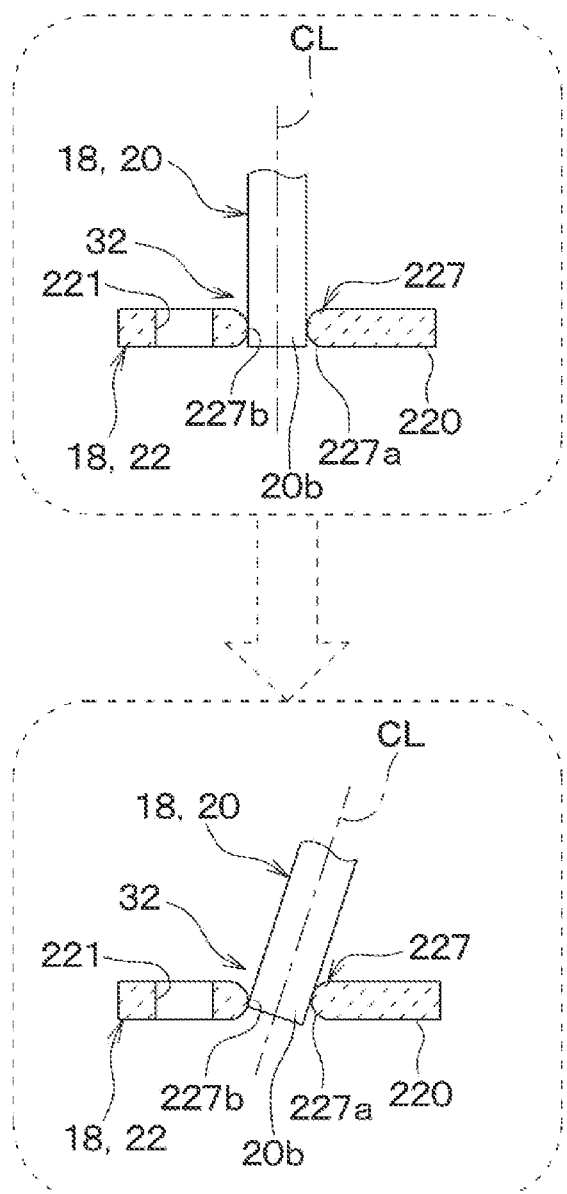
FIG. 22 is an explanatory view for explaining a coupling portion between a shaft and a rotor of the valve device according to the seventh embodiment.

As illustrated in FIGS. 21 and 22, the universal joint 32 of the present embodiment is formed of a free reception part 227 provided in the rotor 22. The free reception part 227 is a through hole penetrating the rotor 22 in the thickness direction. The free reception part 227 has an arcuate surface 227a having a substantially semicircular cross section protruding toward the axial direction DRa. The other end portion 20b of the shaft 20 is tiltably supported by the free reception part 227 by being in contact mainly in the vicinity of an apex 227b of the arcuate surface 227a. The rotor 22 is rotatable together with the shaft 20 by a frictional force at the time of contact between the free reception part 227 and the shaft 20.

The other configurations are similar to those of the first embodiment. As in the first embodiment, the valve device 10 of the present embodiment can obtain effects exhibited by a configuration similar or equal to those of the first embodiment.

With the universal joint 32 of the present embodiment, the shaft 20 can be tiltably supported by providing the free reception part 227 with respect to the rotor 22. Hence the coupling member between the shaft 20 and the rotor 22 can be achieved with a simple structure.

Eighth Embodiment

Next, an eighth embodiment will be described with reference to FIGS. 23 to 35. In the present embodiment, a portion different from the first embodiment will be mainly described. In the present embodiment, an example will be described where the valve device 10 described in the first embodiment is applied to a control valve mounted on a temperature regulating apparatus 1 illustrated in FIG. 23.

The temperature regulating apparatus 1 is mounted on an electric vehicle that obtains a driving force for traveling from an electric motor. The temperature regulating apparatus 1 is an apparatus that regulates the temperature of ventilation air into a cabin, which is a space to be air-conditioned, and regulates the temperatures of a plurality of in-vehicle devices including a battery BT in the electric vehicle. The temperature regulating apparatus 1 can be interpreted as an air conditioner with a temperature regulating function for an in-vehicle device.

Figure 23:
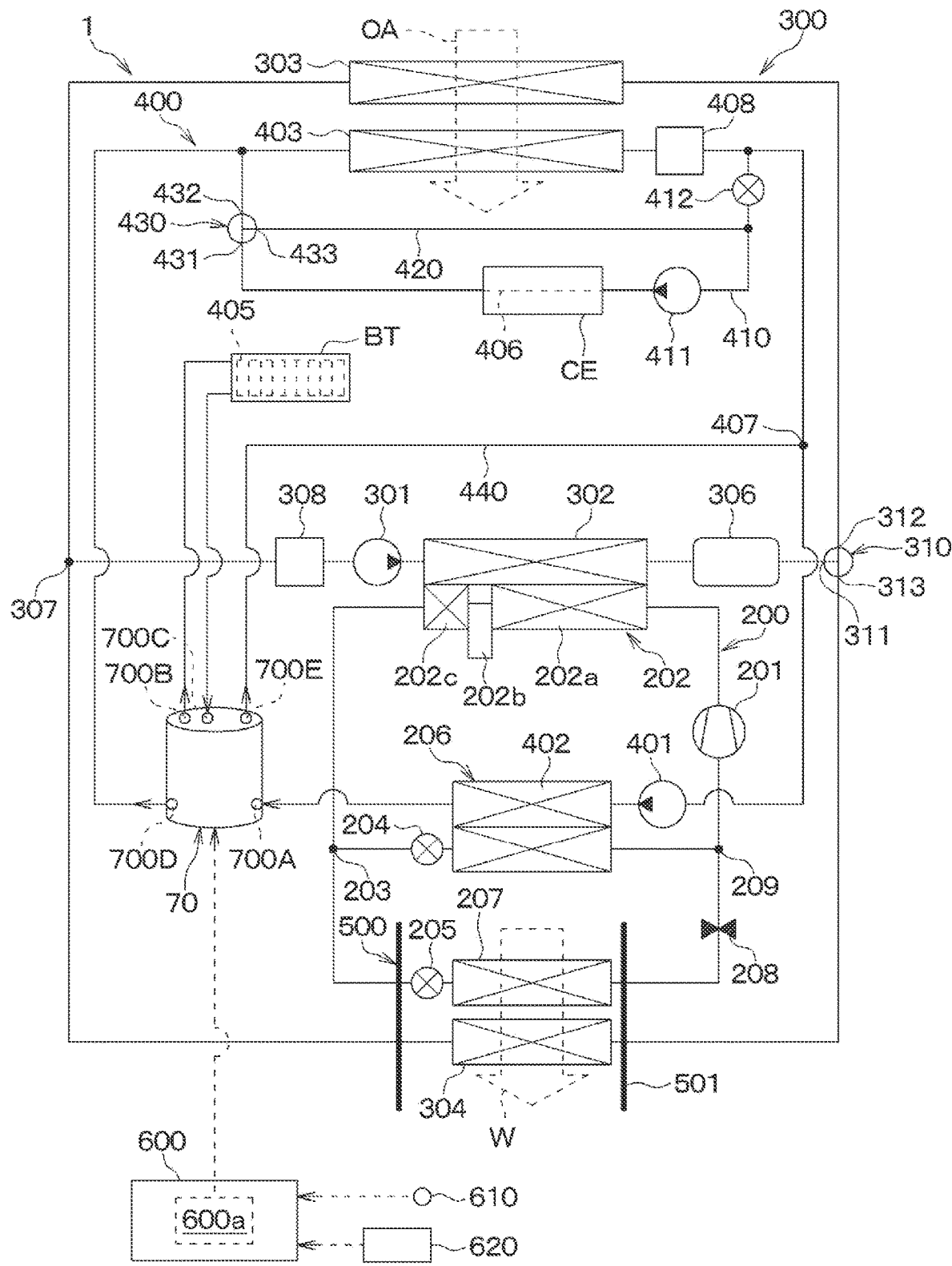
FIG. 23 is an overall configuration diagram of a temperature regulating apparatus according to an eighth embodiment.

As illustrated in FIG. 23, the temperature regulating apparatus 1 includes a refrigeration cycle device 200, a first fluid circulation circuit 300, a second fluid circulation circuit 400, an interior air conditioning unit 500, a control device 600, and the like.

The refrigeration cycle device 200 constitutes a vapor compression refrigeration cycle. The refrigeration cycle device 200 includes a compressor 201, a heat radiator 202, a first expansion valve 204, a second expansion valve 205, a chiller 206, an interior evaporator 207, an evaporating pressure regulating valve 208, and the like. The refrigeration cycle device 200 can switch a circuit configuration of a refrigerant circuit in accordance with various operation modes to be described later.

The refrigeration cycle device 200 uses a hydrofluoroolefin (HFO) refrigerant (e.g., R1234yf) as a refrigerant. The refrigeration cycle device 200 constitutes a subcritical refrigeration cycle in which the maximum value of the refrigerant pressure does not exceed the critical pressure of the refrigerant. Refrigerant oil (e.g., polyalkylene glycol (PAG) oil) for lubricating the sliding portions of the compressor 201 and the like is mixed in the refrigerant. A part of the refrigerant oil circulates in the refrigerant circuit of the refrigeration cycle device 200 together with the refrigerant.

The compressor 201 is a device that compresses and discharges the sucked refrigerant. The compressor 201 is disposed in a drive system housing chamber on the front side of the vehicle. The drive system housing chamber is a space in which an electric motor or the like serving as a drive source for traveling is disposed. The drive system housing chamber and the inside of the cabin are separated from each other by a firewall.

In the compressor 201, the refrigerant inlet side of the heat radiator 202 is connected to the refrigerant discharge side. The heat radiator 202 is a heat exchanger that exchanges heat between the refrigerant discharged from the compressor 201 and a high-temperature heat medium circulating in the first fluid circulation circuit 300 to dissipate heat from the refrigerant. The heat radiator 202 also functions as a heating heat exchanger that heats the high-temperature heating medium.

The refrigeration cycle device 200 employs a so-called subcooling heat exchanger as the heat radiator 202. That is, the heat radiator 202 is provided with a condensing part 202a, a receiver part 202b, and a subcooling part 202c.

The condensing part 202a is a condensing heat exchanging part that exchanges heat between the refrigerant discharged from the compressor 201 and the high-temperature heat medium to condense the high-pressure refrigerant. The receiver part 202b is a liquid reception part that separates the refrigerant flowing out of the condensing part 202a into gas and liquid and stores the separated liquid-phase refrigerant. The subcooling part 202c is a subcooling heat exchange part that exchanges heat between the liquid-phase refrigerant flowing out of the receiver part 202b and the high-temperature heat medium to subcool the liquid-phase refrigerant.

A refrigerant branch 203 is connected to the refrigerant outlet side of the heat radiator 202. The refrigerant branch 203 branches the flow of the refrigerant flowing out of the heat radiator 202. The refrigerant branch 203 is a three-way joint having three inflow outlets communicating with each other. One of the three inflow outlets of the refrigerant branch 203 is used as an inflow port, and the remaining two are used as outflow ports.

The refrigerant inlet side of the chiller 206 is connected to one outflow port of the refrigerant branch 203 via a first expansion valve 204. The refrigerant inlet side of the interior evaporator 207 is connected to the other outflow port of the refrigerant branch 203 via a second expansion valve 205.

The first expansion valve 204 is a decompression part that decompresses the refrigerant flowing out of one outflow port of the refrigerant branch 203. The first expansion valve 204 is an electric variable throttle mechanism including a valve body that changes a throttle opening and an electric actuator (e.g., stepping motor) that shifts the valve body. The operation of the first expansion valve 204 is controlled by a control pulse output from the control device 600.

The second expansion valve 205 is a decompression part that decompresses the refrigerant flowing out of the other outflow port of the refrigerant branch 203. The basic configuration of the second expansion valve 205 is the same as that of the first expansion valve 204.

Each of the first expansion valve 204 and the second expansion valve 205 has a full-open function of functioning as a simple refrigerant passage while hardly exerting a refrigerant decompressing action and a flow rate regulating action by fully opening the valve opening degree. Further, each of the first expansion valve 204 and the second expansion valve 205 has a full-close function of closing the refrigerant passage by fully closing the valve opening degree.

The first expansion valve 204 and the second expansion valve 205 can switch refrigerant circuits in various operation modes by the full-open function and the full-close function. Accordingly, each of the first expansion valve 204 and the second expansion valve 205 also functions as a refrigerant circuit switching part that switches the circuit configuration of the refrigeration cycle device 200.

The refrigerant inlet side of the chiller 206 is connected to the refrigerant outlet side of the first expansion valve 204. The chiller 206 is a heat exchanger that exchanges heat between a low-pressure refrigerant decompressed by the first expansion valve 204 and a low-temperature heating medium circulating in the second fluid circulation circuit 400. The chiller 206 is an evaporation part that cools the low-temperature heating medium by evaporating the low-pressure refrigerant to exert a heat absorbing action.

Thus, the chiller 206 in the second fluid circulation circuit 400 is a cooling device that cools the low-temperature heat medium. One inflow port side of a refrigerant junction 209 is connected to the refrigerant outlet side of the chiller 206.

The refrigerant inlet side of the interior evaporator 207 is connected to the refrigerant outlet side of the second expansion valve 205. The interior evaporator 207 is a heat exchanger that exchanges heat between a low-pressure refrigerant decompressed by the second expansion valve 205 and a ventilation air W blown into the cabin. The interior evaporator 207 is a cooling heat exchange unit that cools the ventilation air W by evaporating the low-pressure refrigerant to exert a heat absorbing action. The interior evaporator 207 is disposed in a casing 501 of an interior air conditioning unit 500 to be described later.

The refrigerant inlet side of the evaporating pressure regulating valve 208 is connected to the refrigerant outlet side of the interior evaporator 207. The evaporating pressure regulating valve 208 is an evaporating pressure regulating part that holds the refrigerant evaporating pressure at the interior evaporator 207 at a predetermined reference pressure or higher.

The evaporating pressure regulating valve 208 is a mechanical variable throttle mechanism that increases the valve opening degree with an increase in pressure on the refrigerant outlet side of the interior evaporator 207. The evaporating pressure regulating valve 208 holds a refrigerant evaporation temperature at the interior evaporator 207 to be equal to or higher than a frosting prevention temperature (e.g., 1° C.) at which frosting at the interior evaporator 207 can be prevented. The refrigerant outlet side of the evaporating pressure regulating valve 208 is connected to the other inflow port side of the refrigerant junction 209.

The refrigerant junction 209 joins the flow of the refrigerant flowing out of the chiller 206 and the flow of the refrigerant flowing out of the evaporating pressure regulating valve 208. The refrigerant junction 209 is a three-way joint similar to the refrigerant branch 203. Two of the three inflow outlets of the refrigerant junction 209 are used as inflow ports, and the remaining one is used as an outflow port. The refrigerant suction side of the compressor 201 is connected to the outflow port of the refrigerant junction 209.

Next, the first fluid circulation circuit 300 will be described. The first fluid circulation circuit 300 is a fluid circulation circuit in which a high-temperature heat medium, which is a fluid, circulates. In the first fluid circulation circuit 300, an ethylene glycol aqueous solution is employed as the high-temperature heat medium. In the first fluid circulation circuit 300, a high-temperature-side pump 301, the heat radiator 202, a high-temperature-side radiator 303, a heater core 304, a high-temperature-side switching valve 310, and the like are disposed.

The inlet side of a heat medium passage 302 of the heat radiator 202 is connected to a discharge port of the high-temperature-side pump 301. The high-temperature-side pump 301 pumps the high-temperature heat medium to the heat medium passage 302 of the heat radiator 202. The high-temperature-side pump 301 is an electric pump with its rotation speed (i.e., pumping capacity) controlled by a control voltage output from the control device 600.

An electric heater 306 is disposed on the outlet side of the heat medium passage 302 of the heat radiator 202. The electric heater 306 is a heating device that heats the high-temperature heat medium flowing out of the heat medium passage 302 of the heat radiator 202. In the first fluid circulation circuit 300, a positive temperature coefficient (PTC) heater having a PTC element (i.e., positive characteristic thermistor) is employed as the electric heater 306. The calorific value of the electric heater 306 is controlled by the control voltage output from the control device 600.

An inlet 311 of the high-temperature-side switching valve 310 is connected to the downstream side of the electric heater 306. The high-temperature-side switching valve 310 regulates a flow rate ratio between the high-temperature heat medium flowing into the high-temperature-side radiator 303 and the high-temperature heat medium flowing into the heater core 304. The high-temperature-side switching valve 310 constitutes the valve device of the present disclosure. The high-temperature-side switching valve 310 is configured as in the valve device 10 described in the first embodiment.

Figure 24:
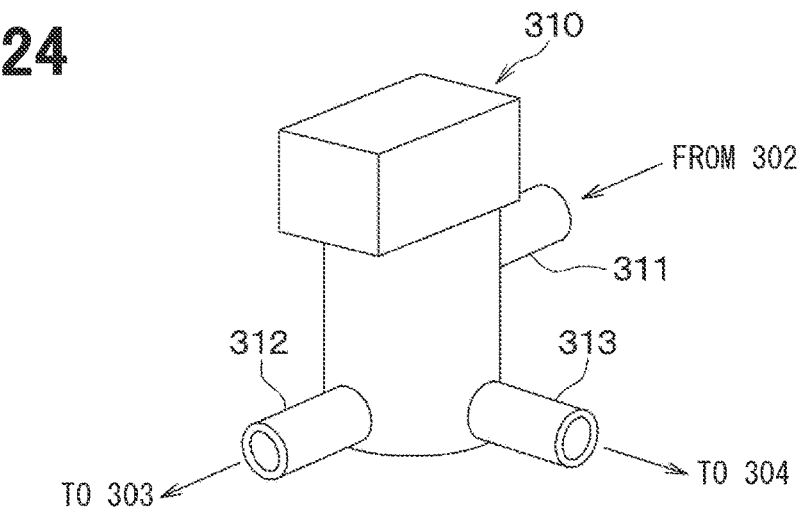
FIG. 24 is a schematic perspective view of a high-temperature-side switching valve according to the eighth embodiment.

As illustrated in FIG. 24, the high-temperature-side switching valve 310 includes an inlet 311 into which the high-temperature heat medium flows, a first outlet 312 from which the high-temperature heat medium is allowed to flow out to the high-temperature-side radiator 303, and a second outlet 313 from which the high-temperature heat medium is allowed to flow out to the heater core 304.

The first outlet 312 is connected to the fluid inlet side of the high-temperature-side radiator 303 and allows the high-temperature heat medium to flow out to the high-temperature-side radiator 303. The first outlet 312 corresponds to the first outlet 122 in the valve device 10 of the first embodiment.

The second outlet 313 is connected to the fluid inlet side of the heater core 304 and allows the high-temperature heating medium to flow out to the heater core 304. The second outlet 313 corresponds to the second outlet 123 in the valve device 10 of the first embodiment.

The inlet 311 is connected to the fluid outlet side of the high-temperature-side radiator 303 and the fluid outlet side of the heater core 304, and the high-temperature heat medium flows in from the high-temperature-side radiator 303 and the heater core 304. The inlet 311 corresponds to the inlet 121 in the valve device 10 of the first embodiment.

The high-temperature-side switching valve 310 is configured such that a flow rate ratio between the high-temperature heat medium passing through the high-temperature-side radiator 303 and the high-temperature heat medium passing through the heater core 304 is regulated by rotationally shifting the rotor 22. Specifically, in the high-temperature-side switching valve 310, by increasing or decreasing the opening degree of the first flow path hole 141 and the opening degree of the second flow path hole 142 by the rotor 22, the flow rate ratio of the high-temperature heat medium passing through the high-temperature-side radiator 303 and the high-temperature heat medium passing through the heater core 304 is regulated.

The operation of the high-temperature-side switching valve 310 is controlled by a control pulse output from the control device 600. The control device 600 also has a function as the valve controller 17 described in the first embodiment.

Returning to FIG. 23, the high-temperature-side radiator 303 is an exterior heat exchanger that exchanges heat between the high-temperature heat medium heated by the heat radiator 202 and the like and the air outside the cabin (i.e., outside air OA) blown from an outside air fan (not illustrated).

The high-temperature-side radiator 303 is disposed on the front side of the drive system housing chamber. During the traveling of the vehicle, traveling air (i.e., outside air OA) flowing into the drive system housing chamber via a grill can be blown against the high-temperature-side radiator 303. One inflow port side of a high-temperature-side junction 307 is connected to the fluid outlet side of the high-temperature-side radiator 303.

The heater core 304 is an interior heat exchanger that heats the ventilation air W by exchanging heat between the high-temperature heat medium heated by the heat radiator 202 and the like and the ventilation air W blown into the room. The heater core 304 is disposed in the casing 501 of the interior air conditioning unit 500. In the heater core 304, the ventilation air W is heated using the heat absorbed by the refrigerant in the chiller 206 as a heating source. The other inflow port side of the high-temperature-side junction 307 is connected to the fluid outlet side of the heater core 304.

The high-temperature-side junction 307 joins the flow of the refrigerant flowing out of the high-temperature-side radiator 303 and the flow of the refrigerant flowing out of the heater core 304. The high-temperature-side junction 307 is a three-way joint similar to refrigerant junction 209. The fluid suction side of the high-temperature-side pump 301 is connected to the fluid outlet side of the high-temperature-side junction 307 via a high-temperature-side reserve tank 308.

The high-temperature-side reserve tank 308 is a storage part for a high-temperature heat medium that stores the high-temperature heat medium that is surplus in the first fluid circulation circuit 300. In the first fluid circulation circuit 300, by disposing the high-temperature-side reserve tank 308, a decrease in the liquid amount of the high-temperature heat medium circulating in the first fluid circulation circuit 300 is prevented. The high-temperature-side reserve tank 308 has a heat medium supply port for supplying the high-temperature heat medium when the liquid amount of the high-temperature heat medium circulating in the first fluid circulation circuit 300 is insufficient.

Next, the second fluid circulation circuit 400 will be described. The second fluid circulation circuit 400 is a fluid circulation circuit in which a low-temperature heating medium, which is a fluid, circulates. In the second fluid circulation circuit 400, the same type of heat medium as the high-temperature heat medium is employed as the low-temperature heat medium.

In the second fluid circulation circuit 400, a low-temperature-side pump 401, a heat medium passage 402 of the chiller 206, a low-temperature-side radiator 403, to flow path switching valve 70, a cooling water passage 405 of the battery BT, a cooling water passage 406 of an in-vehicle device CE, and the like are disposed.

The inlet side of the low-temperature heat medium passage 402 of the chiller 206 is connected to the fluid outlet side of the low-temperature-side pump 401. The low-temperature-side pump 401 is a pumping part that pumps the low-temperature heat medium to the heat medium passage 402 of the chiller 206. The basic configuration of the low-temperature-side pump 401 is the same as that of the high-temperature-side pump 301.

A first inlet 700A side of the flow path switching valve 70 is connected to the fluid outlet side of the heat medium passage 402 of the chiller 206. The flow path switching valve 70 is a circuit switching part that switches the circuit configuration of the second fluid circulation circuit 400. The flow path switching valve 70 is provided with a plurality of inlets and a plurality of outlets. The cooling water passage 405, the low-temperature-side radiator 403, and the like of the battery BT are connected to these inlets and outlets. The detailed configuration of the flow path switching valve 70 will be described later.

The battery BT supplies power to the electric in-vehicle device CE such as an electric motor. The battery BT is an assembled battery formed by electrically connecting a plurality of battery cells in series or in parallel. The battery cell is formed of a secondary battery that can be charged and discharged (e.g., lithium ion battery). The battery BT is a battery in which a plurality of battery cells are stacked and arranged in a substantially rectangular parallelepiped shape and housed in a dedicated case.

In this type of battery BT, a chemical reaction is less likely to proceed, and the output is likely to decrease at a low temperature. The battery BT generates heat during charging and discharging. Further, the battery BT is likely to deteriorate at a high temperature. Therefore, the temperature of the battery BT is desirably held within an appropriate temperature range (e.g., 15° C. or higher and 55° C. or lower) in which the charge-discharge capacity of the battery BT can be utilized sufficiently.

The cooling water passage 405 of the battery BT is formed in the dedicated case of the battery BT. The cooling water passage 405 is a heat medium passage for exchanging heat between the low-temperature heat medium and the battery BT. More specifically, the cooling water passage 405 is a heat medium passage for absorbing heat that causes the low-temperature heat medium to absorb the heat of the battery BT. Therefore, the battery BT also functions as a heating device that heats the low-temperature heating medium in the second fluid circulation circuit 400.

The passage configuration of the cooling water passage 405 of the battery BT is a passage configuration in which a plurality of passages are connected in parallel inside the dedicated case. As a result, the cooling water passage 405 of the battery BT is formed to be capable of uniformly absorbing heat from the entire region of the battery BT. In other words, the cooling water passage 405 is formed so as to uniformly absorb the heat of all the battery cells and uniformly cool all the battery cells.

The low-temperature-side radiator 403 is an exterior heat exchanger that exchanges heat between the low-temperature heat medium flowing out of a second outlet 700D of the flow path switching valve 70 and the outside air OA blown from the outside air fan. The low-temperature-side radiator 403 is disposed on the front side of the drive system housing chamber and on the outside airflow downstream side of the high-temperature-side radiator 303. Therefore, the low-temperature-side radiator 403 exchanges heat between the outside air OA after passing through the high-temperature-side radiator 303 and the low-temperature heat medium. The low-temperature-side radiator 403 may be formed integrally with the high-temperature-side radiator 303.

The heat medium outlet of the low-temperature-side radiator 403 is connected to one inflow port side of a low-temperature-side junction 407 via a low-temperature-side reserve tank 408.

The low-temperature-side reserve tank 408 is a storage part for a low-temperature heating medium that stores the low-temperature heating medium that is surplus in the second fluid circulation circuit 400. The basic configuration of the low-temperature-side reserve tank 408 is the same as that of the high-temperature-side reserve tank 308. The low-temperature-side junction 407 is a three-way joint similar to the high-temperature-side junction 307 and the like.

The fluid suction side of the low-temperature-side pump 401 is connected to the fluid outlet side of the low-temperature-side junction 407. In other words, the low-temperature-side pump 401 is disposed in the flow path from the outflow port of the low-temperature-side junction 407 to the fluid inlet side of the heat medium passage 402 of the chiller 206 in the second fluid circulation circuit 400.

A device cooling passage 410 in which the cooling water passage 406 of the in-vehicle device CE is disposed is connected to the second fluid circulation circuit 400. The device cooling passage 410 is connected to return the low-temperature heat medium on the downstream side of the low-temperature-side reserve tank 408 and on the upstream side of the low-temperature-side junction 407 to the inlet side of the low-temperature-side radiator 403 again.

A device pump 411 is disposed in the device cooling passage 410. The device pump 411 pumps the low-temperature heating medium to the cooling water passage 406 of the in-vehicle device CE. The basic configuration of the device pump 411 is the same as that of the low-temperature-side pump 401.

The in-vehicle device CE is a heat generator that generates heat during operation. Specifically, the in-vehicle device CE is an electric motor, an inverter, a control device for an advanced operation system, or the like. The electric motor is an in-vehicle device that outputs a driving force for traveling. The inverter is an in-vehicle device that supplies electric power to the electric motor. An advanced driving system control device is a control device for a so-called ADAS. ADAS is an abbreviation for advanced driver assistance system.

In order to appropriately operate the in-vehicle device CE, similarly to the battery BT, it is desirable that the in-vehicle device CE is held within an appropriate temperature range. However, an appropriate temperature range of the battery BT and an appropriate temperature range of the in-vehicle device CE are different. In the present embodiment, the upper limit value of the appropriate temperature range of the in-vehicle device CE is higher than the upper limit value of the appropriate temperature range of the battery BT.

The cooling water passage 406 through which the low-temperature heating medium is allowed to flow is formed inside a housing part or a case forming an outer shell of the in-vehicle device CE. The cooling water passage 406 is a heat medium passage for absorbing heat that causes the low-temperature heat medium to absorb heat (i.e., waste heat of the in-vehicle device CE) of the in-vehicle device CE. The cooling water passage 406 constitutes a temperature regulating part that regulates the temperature of the in-vehicle device CE which is a heat generator.

Further, a device bypass passage 420 is connected to the second fluid circulation circuit 400. The device bypass passage 420 is a heat medium passage that returns the low-temperature heat medium flowing out of the cooling water passage 406 of the in-vehicle device CE to the fluid inlet side of the device pump 411 again while bypassing the low-temperature-side radiator 403 and the like. The device bypass passage 420 constitutes a bypass part that causes the low-temperature heat medium to flow while bypassing the low-temperature-side radiator 403 that is the exterior heat exchanger.

In the device cooling passage 410, a device flow rate regulating valve 412 is disposed on the upstream side of the connection part with the device bypass passage 420. The device flow rate regulating valve 412 is an electric flow rate regulating valve including a valve body that changes a passage cross-sectional area of the device cooling passage 410 and an electric actuator (e.g., stepping motor) that shifts the valve body. The operation of the device flow rate regulating valve 412 is controlled by a control pulse output from the control device 600.

A low-temperature-side switching valve 430 is disposed at a connection part between the device cooling passage 410 and the device bypass passage 420. The low-temperature-side switching valve 430 regulates a flow rate ratio between the low-temperature heat medium flowing into the low-temperature-side radiator 403 and the low-temperature heat medium flowing into the device bypass passage 420. The low-temperature-side switching valve 430 constitutes the valve device of the present disclosure similarly to the high-temperature-side switching valve 310. The low-temperature-side switching valve 430 is configured as in the valve device 10 described in the first embodiment.

Figure 25:
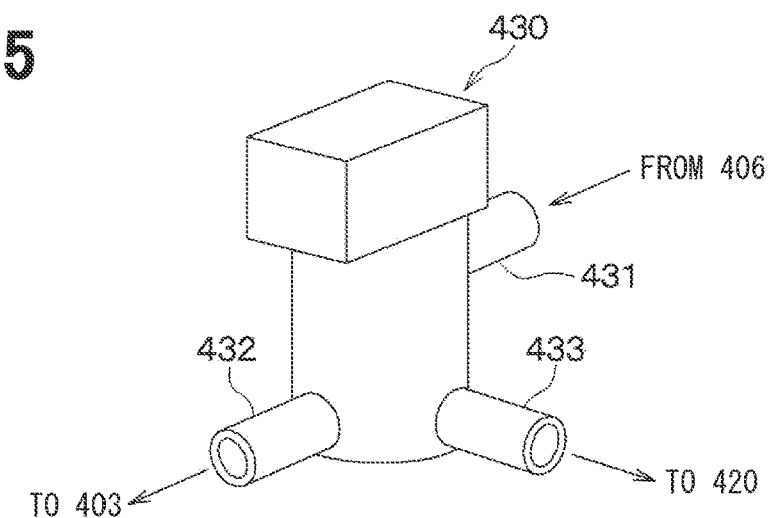
FIG. 25 is a schematic perspective view of a low-temperature-side switching valve according to the eighth embodiment.

As illustrated in FIG. 25, the low-temperature-side switching valve 430 includes an inlet 431 into which the low-temperature heat medium flows, a first outlet 432 from which the low-temperature heat medium is allowed to flow out to the low-temperature-side radiator 403, and a second outlet 433 from which the low-temperature heat medium is allowed to flow out to the device bypass passage 420.

The first outlet 432 is connected to the fluid inlet side of the low-temperature-side radiator 403 and allows the low-temperature heat medium to flow out to the low-temperature-side radiator 403. The first outlet 432 corresponds to the first outlet 122 in the valve device 10 of the first embodiment.

The second outlet 433 is connected to the fluid inlet side of the device bypass passage 420 and allows the low-temperature heating medium to flow out to the device bypass passage 420. The second outlet 433 corresponds to the second outlet 123 in the valve device 10 of the first embodiment.

The inlet 431 is connected to the fluid outlet side of the cooling water passage 406 of the in-vehicle device CE which is the temperature regulating part, and the fluid passing through the cooling water passage 406 flows into the inlet 431. The inlet 431 corresponds to the inlet 121 in the valve device 10 of the first embodiment.

The low-temperature-side switching valve 430 is configured such that a flow rate ratio between the low-temperature heat medium passing through the low-temperature-side radiator 403 and the low-temperature heat medium passing through the device bypass passage 420 is regulated by rotationally shifting the rotor 22. Specifically, by increasing or decreasing the opening degree of the first flow path hole 141 and the opening degree of the second flow path hole 142 by the rotor 22, in the low-temperature-side switching valve 430 regulates the flow rate ratio of the low-temperature heat medium passing through the low-temperature-side radiator 403 and the low-temperature heat medium passing through the device bypass passage 420.

The operation of the low-temperature-side switching valve 430 is controlled by a control pulse output from the control device 600. The control device 600 also has a function as the valve controller 17 described in the first embodiment.

Returning to FIG. 23, the second fluid circulation circuit 400 is connected with a short-circuiting heat medium passage 440 that guides the low-temperature heat medium flowing out of the third outlet 700E of the flow path switching valve 70 to the other inflow port of the low-temperature-side junction 407.

Figure 26:
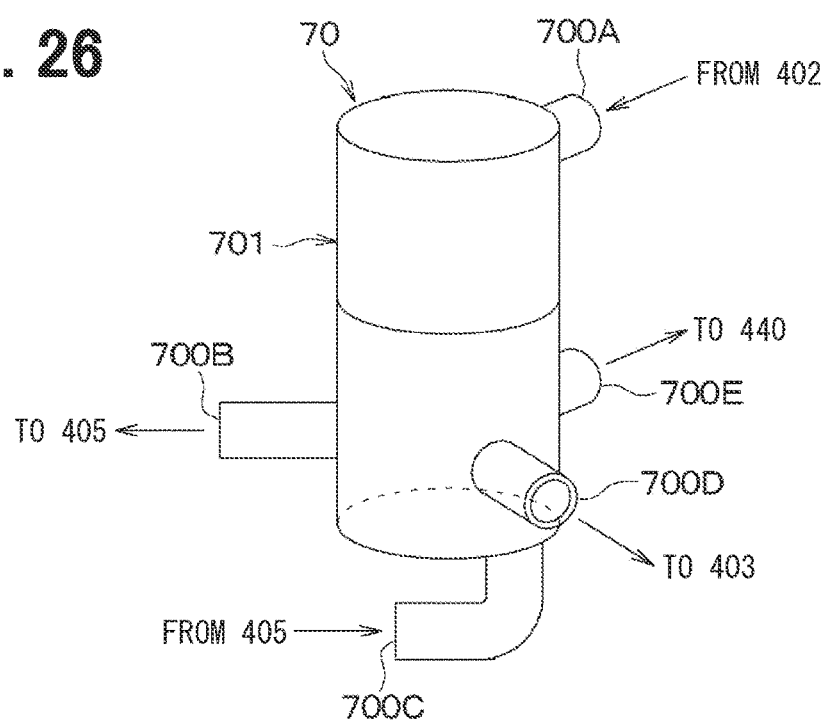
FIG. 26 is a schematic perspective view of a flow path switching valve according to the eighth embodiment.
Figure 27:
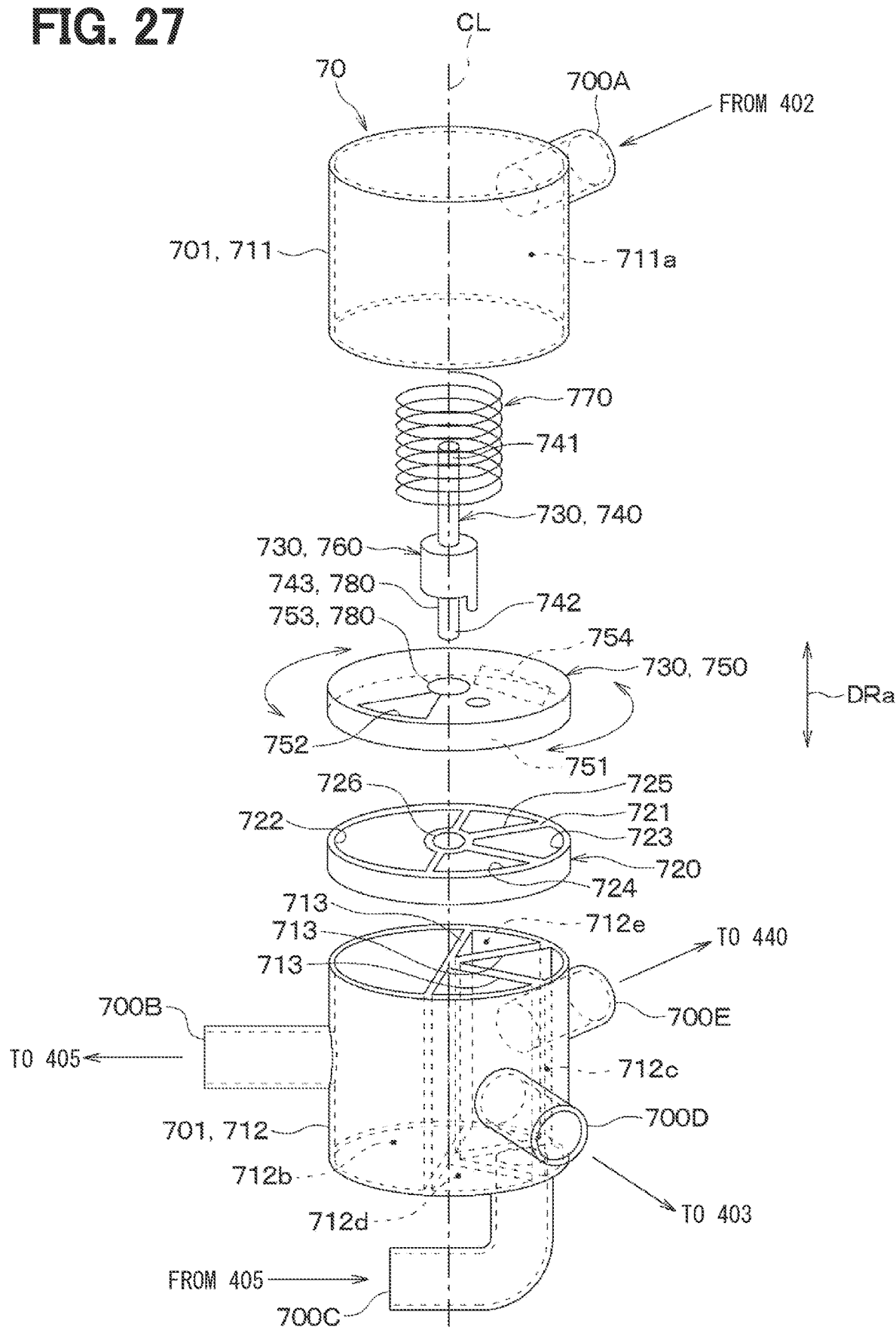
FIG. 27 is a schematic exploded perspective view of the flow path switching valve.

Next, a detailed configuration of the flow path switching valve 70 will be described with reference to FIGS. 26 and 27. As illustrated in the external perspective view of FIG. 26, the flow path switching valve 70 has a body 701 made of resin and formed in a bottomed cylindrical shape. The body 701 is a housing having a plurality of inlets into which the low-temperature heating medium is allowed to flow and a plurality of outlets from which the low-temperature heating medium is allowed to flow out of the inside. Specifically, the body 701 of the present embodiment has two inlets and three outlets. Hence the flow path switching valve 70 is a five-way valve having five ports.

Specifically, the flow path switching valve 70 is provided with the first inlet 700A and a second inlet 700C. The first inlet 700A is an inlet into which the low-temperature heat medium, which is pumped from the low-temperature-side pump 401 and has passed through the heat medium passage 402 of the chiller 206, is allowed to flow. The second inlet 700C is an inlet into which the low-temperature heat medium flowing out of the cooling water passage 405 of the battery BT is allowed to flow.

The flow path switching valve 70 is provided with a first outlet 700B, the second outlet 700D, and a third outlet 700E. The first outlet 700B is an outlet from which the low-temperature heating medium is allowed to flow out to the fluid inlet side of the cooling water passage 405 of the battery BT. The second outlet 700D is an outlet from which the low-temperature heat medium is allowed to flow out to the fluid inlet side of the low-temperature-side radiator 403. The third outlet 700E is an outlet from which the low-temperature heat medium is allowed to flow out to the fluid inlet side of the heat medium passage 402 of the chiller 206 (i.e., to the short-circuiting heat medium passage 440).

Here, the cooling water passage 405 of the battery BT is disposed in the heat medium passage from the first outlet 700B to the second inlet 700C. In other words, the cooling water passage 405 of the battery BT is disposed in the heat medium passage from the first outlet 700B to the second inlet 700C. The second inlet 700C serves as an inlet through which the low-temperature heating medium flowing out of the body 701 from the first outlet 700B is allowed to flow into the inside again.

The body 701 of the flow path switching valve 70 is divided into a first body 711 and a second body 712. The first body 711 and the second body 712 are both formed in a cylindrical shape and disposed coaxially. One end side of the first body 711 in the axial direction DRa is closed by the lid part, and the other end side is opened. The other end side in the axial direction DRa of the second body 712 is closed by the bottom part, and one end side is opened.

A stator 720 is disposed inside the body 701. The stator 720 is disposed near a connection part between the first body 711 and the second body 712. A plurality of spaces are formed inside the body 701 by the stator 720.

Specifically, a first inlet space 711a is formed inside the first body 711. The first inlet space 711a is a substantially columnar space communicating with the first inlet 700A. A first outlet space 712b, a second inlet space 712c, a second outlet space 712d, and a third outlet space 712e are formed inside the second body 712. More specifically, a plurality of partition plates 713 radially extending from an axis CL of a shaft 740 is disposed inside the second body 712. The partition plate 713 partitions the internal space of the second body 712 into a plurality of spaces in the circumferential direction DRc.

The first outlet space 712b is a space communicating with the first outlet 700B. The second inlet space 712c is a space communicating with the second inlet 700C. The second outlet space 712d is a space communicating with the second outlet 700D. The third outlet space 712e is a space communicating with the third outlet 700E.

Each of the first outlet space 712b, the second inlet space 712c, the second outlet space 712d, and the third outlet space 712e is a columnar space formed in a sector shape (i.e., a fan shape) in cross section and extending in the axial direction DRa. The first outlet space 712b, the third outlet space 712e, the second inlet space 712c, and the second outlet space 712d are arranged in this order in the clockwise direction when viewed from the first body 711 side in the axial direction DRa. That is, the second inlet space 712c is disposed so as to be adjacent to both the second outlet space 712d and the third outlet space 712e in the circumferential direction DRc.

The stator 720 is a member corresponding to the stator 14 of the valve device 10 of the first embodiment. The constituent material and the like of the stator 720 are configured in the same manner as those of the stator 14 of the first embodiment.

The stator 720 is formed of a disc-shaped member a thickness direction of which is the axial direction DRa. The stator 720 has an opening surface 721 as a surface on which a rotor 750 to be described later slides. The opening surface 721 is a sealing surface corresponding to a sliding surface 751 of the rotor 750 to be described later.

The stator 720 constitutes a flow path formation member provided with a flow path hole through which a fluid passes. In the stator 720, a first flow path hole 722, a second flow path hole 723, a third flow path hole 724, and a fourth flow path hole 725 through which a fluid passes are formed.

Specifically, the first flow path hole 722 is provided in a portion of the stator 720 corresponding to the first outlet space 712b so as to communicate with the first outlet space 712b. The second flow path hole 723 is provided in a portion of the stator 720 corresponding to the second inlet space 712c so as to communicate with the second inlet space 712c. The third flow path hole 724 is provided in a portion of the stator 720 corresponding to the second outlet space 712d so as to communicate with the second outlet space 712d. The fourth flow path hole 725 is provided in a portion of the stator 720 corresponding to the third outlet space 712e so as to communicate with the third outlet space 712e.

A holding hole 726 for holding the other end portion 742 of the shaft 740 is formed in a substantially central portion of the stator 720. The other end portion 742 of the shaft 740 is a portion of the shaft 740 opposite to a one end portion 741 to which a rotational force is transmitted from the drive part (not illustrated) in the axial direction DRa.

Although not illustrated, the holding hole 726 is provided with an other end bearing part that rotatably supports the other end portion 742 of the shaft 740. In the flow path switching valve 70, a holding part of the shaft 740 is formed of the holding hole 726 and the other end bearing part (not illustrated).

The drive part is a device for outputting rotational force. The drive part is a device corresponding to the drive part 16 of the valve device 10 of the first embodiment. The drive part of the present embodiment is configured in the same manner as the drive part 16 of the first embodiment.

A rotation part 730, which rotates by a rotational force output from the drive part, and an energization member 770 are disposed inside the body 701. The rotation part 730 corresponds to the rotation part 18 of the valve device 10 of the first embodiment. The rotation part 730 includes the shaft 740, the rotor 750 as a valve body, and an intermediate element 760 that couples the rotor 750 to the shaft 740.

The shaft 740 is a rotation shaft that rotates about a predetermined axis CL by the rotational force output from the drive part. The shaft 740 extends along the axial direction DRa. The shaft 740 has the one end portion 741 to which the rotational force is transmitted from the drive part to one side in the axial direction DRa and the other end portion 742 opposite to the one end portion 741 in the axial direction DRa. The other end portion 742 is coupled to the rotor 750 via the intermediate element 760 so as to be relatively non-rotatable.

The shaft 740 is tiltably coupled to the rotor 750 such that a contact state between the opening surface 721 of the stator 720 and the sliding surface 751 of the rotor 750 is held regardless of the posture of the shaft 740. The coupling member between the shaft 740 and the rotor 750 is configured similarly to the coupling member between the shaft 20 and the rotor 22 of the valve device 10 of the first embodiment. That is, the coupling member between the shaft 740 and the rotor 750 is formed of a fitting structure 780 in which a fitting part 743 of the shaft 740 is fitted into a fitting hole 753 provided in the rotor 750. The fitting structure 780 is similar to the fitting structure 28 of the first embodiment, and hence the description thereof will be omitted in the present embodiment.

The rotor 750 is a valve body that increases or decreases the opening degree of each of the flow path holes 722 to 725 formed in the stator 720 with the rotation of the shaft 740. The rotor 750 is a member corresponding to the rotor 22 of the valve device 10 of the first embodiment. The constituent material and the like of the rotor 750 are configured similarly to those of the rotor 22 of the first embodiment.

The rotor 750 is disposed in the first inlet space 711a so as to face the stator 14 in the axial direction DRa. The rotor 750 has a sliding surface 751 that slides while facing the opening surface 721 of the stator 720. The sliding surface 751 is a sealing surface that seals the opening surface 721 of the stator 720.

A rotor hole 752 is formed in the rotor 750 at a position eccentric to the axis CL of the shaft 740. The rotor hole 752 is a through hole penetrating in the axial direction DRa. The rotor hole 752 is formed in a portion of the rotor 750 overlapping each of the flow path holes 722 to 725 in the axial direction DRa when the rotor 750 is rotated.

A fitting hole 753 is formed in a substantially central portion of the rotor 750. The fitting hole 753 is a through hole for fitting the fitting part 743 of the shaft 740. The diameter of the fitting hole 753 is larger than the diameter of the fitting part 743.

The intermediate element 760 is a member that couples the rotor 750 to the shaft 740, and forms a part of a coupling member that couples the rotor 750 to the shaft 740. The intermediate element 760 is configured in the same manner as the intermediate element 24 of the valve device 10 of the first embodiment.

The energization member 770 is a member that energizes the rotor 22 toward the stator 14 corresponding to the flow path formation member. The energization member 770 is configured in the same manner as the energization member 26 of the valve device 10 of the first embodiment.

The flow path switching valve 70 of the present embodiment can cause the first inlet space 711a to communicate with any one of the outlet spaces 712b, 712d, 712e via the rotor hole 752 and one of the flow path holes 723, 724, 725 by rotationally shifting the rotor 750. That is, the flow path switching valve 70 can allow the low-temperature heat medium flowing in from the first inlet 700A to flow out of any one of the plurality of outlets 700B, 700D, 700E by rotationally shifting the rotor 750.

Specifically, the flow path switching valve 70 can cause the first inlet space 711a to communicate with any one of the first outlet space 712b, the second outlet space 712d, and the third outlet space 712e by rotationally shifting the rotor 750. Accordingly, the low-temperature heat medium flowing in from the first inlet 700A can be switched to any one of a passage configuration for allowing the low-temperature heat medium to flow out of the first outlet 700B, a passage configuration for allowing the low-temperature heat medium to flow out of the second outlet 700D, and a passage configuration for allowing the low-temperature heat medium to flow out of the third outlet 700E.

In the passage configuration for allowing the low-temperature heat medium flowing in from the first inlet 700A to flow out of the first outlet 700B, the low-temperature heat medium flowing in the first inlet space 711a is allowed to flow from one side to the other side in the axial direction DRa of the body 701. This also applies to the passage configuration for allowing the low-temperature heat medium flowing in from the first inlet 700A to flow out of the second outlet 700D and the passage configuration for allowing the low-temperature heat medium flowing in from the first inlet 700A to flow out of the third outlet 700E.

Figure 28:
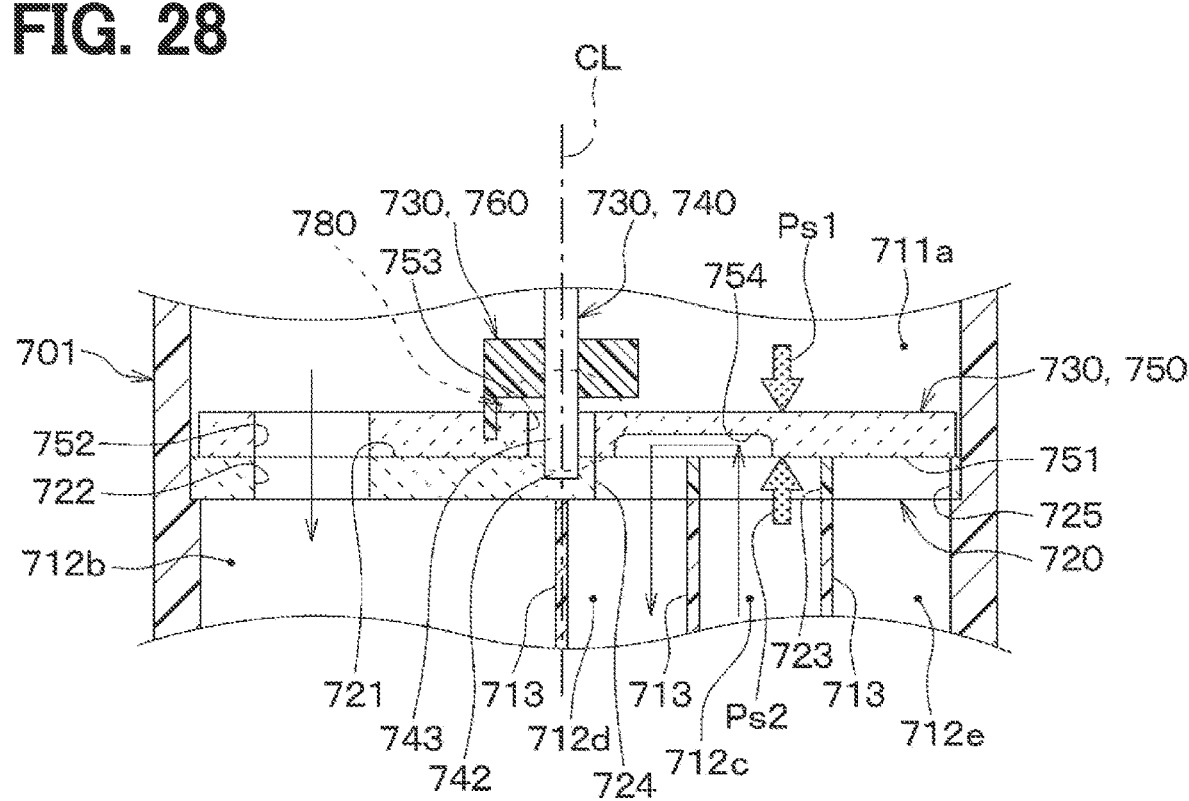
FIG. 28 is an explanatory view for explaining a passage configuration of the flow path switching valve.

Here, as illustrated in FIG. 28, the sliding surface 751 of the rotor 750 is provided with a communication groove 754 that causes adjacent spaces among the second inlet space 712c, the second outlet space 712d, the first outlet space 712b, and the third outlet space 712e to communicate with each other. The rotor hole 752 and the communication groove 754 are disposed substantially symmetrically with respect to the axis CL of the shaft 740. That is, the rotor hole 752 and the communication groove 754 are arranged at an angle of about 180° around the axis CL of the shaft 740.

Thus, the second inlet space 712c can be caused to communicate with any one of the plurality of outlet spaces via the communication groove 754 by rotationally shifting the rotor 750. In the present embodiment, by previously making an appropriate setting of the positional relationship between the rotor hole 752 and the communication groove 754, the outlet space communicating with the first inlet space 711a and the outlet space communicating with the second inlet space 712c have become different spaces In other words, by rotationally shifting the rotor 750, it is possible to switch to the passage configuration for allowing the low-temperature heat medium flowing in from the second inlet 700C to flow out of any one of the plurality of outlets. The outlet from which the low-temperature heat medium flowing in from the second inlet 700C is allowed to flow out and the outlet from which the low-temperature heat medium flowing in from the first inlet 700A is allowed to flow out are different outlets.

In the present embodiment, specifically, the second inlet space 712c can be caused to communicate with any one of the second outlet space 712d and the third outlet space 712e by rotationally shifting the rotor 750. Accordingly, the low-temperature heat medium flowing in from the second inlet 700C can be switched to either the passage configuration for allowing the low-temperature heat medium to flow out of the second outlet 700D or the passage configuration for allowing the low-temperature heat medium to flow out of the third outlet 700E.

In the passage configuration for allowing the low-temperature heat medium flowing in from the second inlet 700C to flow out of the second outlet 700D, the flow of the low-temperature heat medium flowing in the second inlet space 712c from the other side to the one side in the axial direction DRa of the shaft 740 is diverted in the opposite direction in the communication groove 754. As a result, in the second outlet space 712d, the low-temperature heat medium flows from one side to the other side in the axial direction DRa of the shaft 740. This also applies to the passage configuration for allowing the low-temperature heat medium flowing in from the second inlet 700C to flow out of the third outlet 700E.

Here, the first inlet space 711a and the second inlet space 712c are formed on opposite sides of the rotor 750. Therefore, the rotor 750 is disposed inside the body 701 as a housing such that the pressure Ps1 of the first inlet space 711a and the pressure Ps2 of the second inlet space 712c act in opposite directions to each other.

Figure 29:
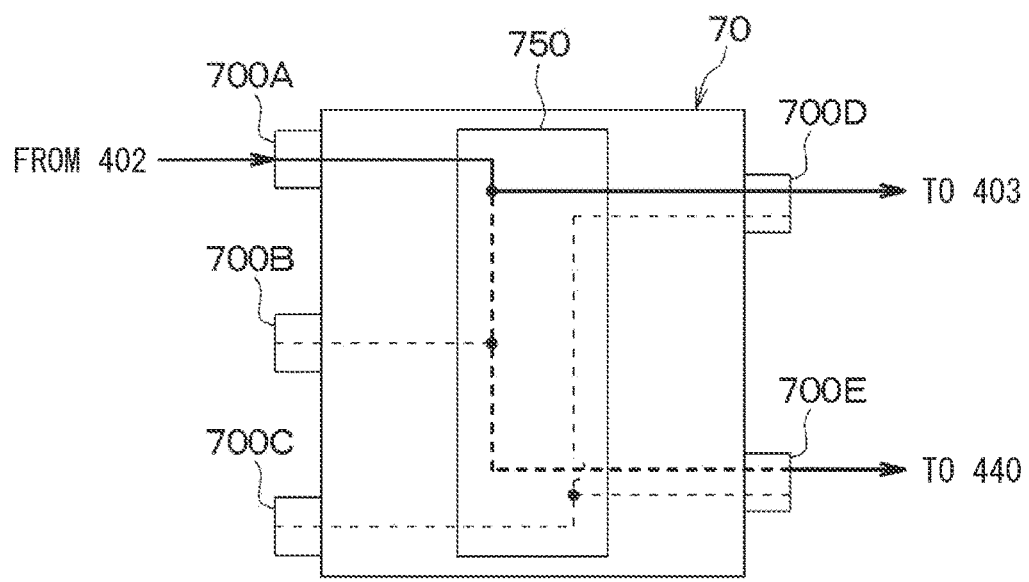
FIG. 29 is an explanatory diagram illustrating an example of a switching mode of the passage configuration of the flow path switching valve.

As indicated by a thick line and a thick broken line in FIG. 29, the flow path switching valve 70 configured as described above can switch between the passage configuration for allowing the low-temperature heat medium flowing into the inside from the first inlet 700A to flow out of the second outlet 700D and the passage configuration for allowing the low-temperature heat medium to flow out of the third outlet 700E.

Figure 30:
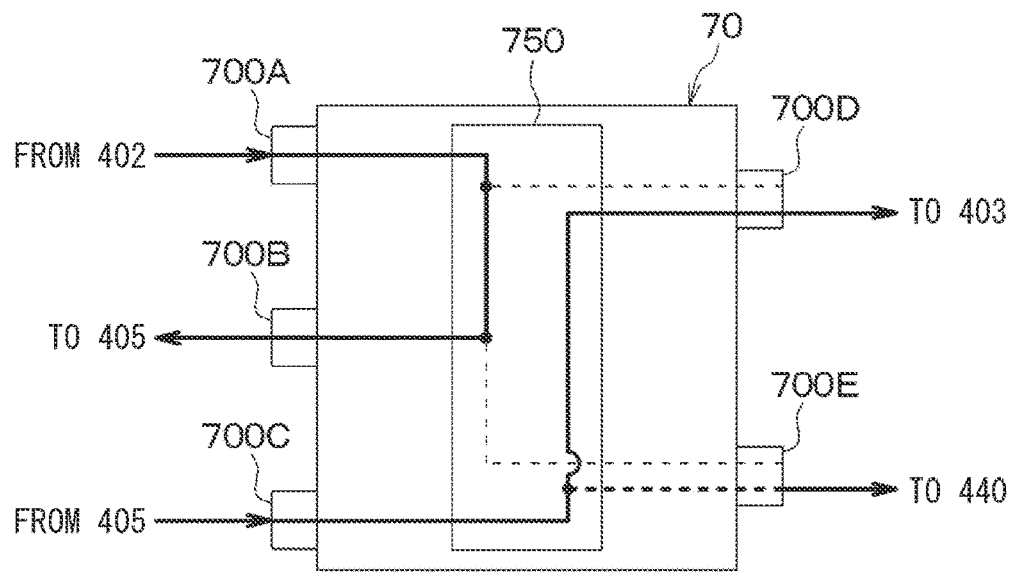
FIG. 30 is an explanatory diagram illustrating another example of the switching mode of the passage configuration of the flow path switching valve.

Further, as indicated by a thick solid line in FIG. 30, the flow path switching valve 70 can allow the low-temperature heat medium flowing into the inside from the first inlet 700A to flow out of the first outlet 700B. In this state, as indicated by a thick line and a thick broken line in FIG. 30, it is possible to switch between the passage configuration for allowing the low-temperature heat medium flowing into the inside from the second inlet 700C to flow out of the second outlet 700D and the passage configuration for allowing the low-temperature heat medium to flow out of the third outlet 700E.

Figure 31:
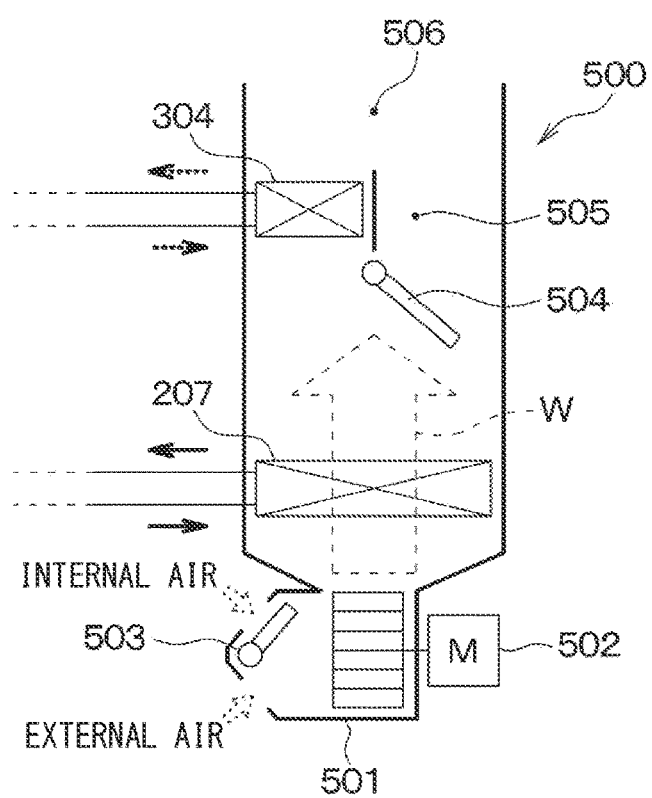
FIG. 31 is a schematic configuration diagram of an air conditioning unit according to the eighth embodiment.

Next, the interior air conditioning unit 500 will be described with reference to FIG. 31. The interior air conditioning unit 500 is a unit for blowing the ventilation air W with its temperature appropriately regulated to an appropriate position in the cabin in the temperature regulating apparatus 1. The interior air conditioning unit 500 is disposed inside an instrument panel at the foremost part in the cabin.

The interior air conditioning unit 500 includes the casing 501 that forms an air passage for the ventilation air W. An interior blower 502, the interior evaporator 207, the heater core 304, and the like are disposed in an air passage formed in the casing 501. The casing 501 is made of resin (e.g., polypropylene) having a certain degree of elasticity and excellent strength.

An inside and outside air switching device 503 is disposed on the most upstream side in the ventilation airflow of the casing 501. The inside and outside air switching device 503 make switching to introduce air inside the cabin (i.e., inside air) and air outside the cabin (i.e., outside air) into the casing 501. The operation of the electric actuator for driving the inside and outside air switching device 503 is controlled by a control signal output from the control device 600.

The interior blower 502 is disposed on the ventilation airflow downstream side of the inside and outside air switching device 503. The interior blower 502 blows air sucked through the inside and outside air switching device 503 toward the cabin. The interior blower 502 is an electric blower that drives a fan with an electric motor. The rotation speed (i.e., air blowing capacity) of the interior blower 502 is controlled by a control voltage output from the control device 600.

On the ventilation airflow downstream side of the interior blower 502, the interior evaporator 207 and the heater core 304 are disposed in this order with respect to the ventilation airflow. That is, the interior evaporator 207 is disposed on the ventilation airflow upstream side of the heater core 304. A cold air bypass passage 505 is formed in the casing 501 to cause the ventilation air W having passed through the interior evaporator 207 to flow downstream while bypassing the heater core 304.

An air mix door 504 is disposed on the ventilation airflow downstream side of the interior evaporator 207 and on the ventilation airflow upstream side of the heater core 304. The air mix door 504 regulates an air volume ratio between the volume of air caused to pass through the heater core 304 and the volume of air caused to pass through the cold air bypass passage 505 in the ventilation air W after passing through the interior evaporator 207. The operation of the electric actuator for driving the air mix door is controlled by a control signal output from the control device 600.

A mixing space 506 for mixing the ventilation air W heated by the heater core 304 and the ventilation air W passing through the cold air bypass passage 505 and not heated by the heater core 304 is provided on the ventilation airflow downstream side of the heater core 304. Further, an opening hole (not illustrated) through which the conditioned air mixed in the mixing space 506 is blown into the cabin is disposed on the most downstream side in the ventilation airflow of the casing 501.

Therefore, the temperature of the conditioned air mixed in the mixing space 506 is regulated by the air mix door 504 regulating the air volume ratio between the volume of air caused to pass through the heater core 304 and the volume of air caused to pass through the cold air bypass passage 505. Then, the temperature of the ventilation air W blown into the cabin from each opening hole can be regulated.

As the opening hole, a face opening hole, a foot opening hole, and a defroster opening hole (none is illustrated) are provided. The face opening hole is an opening hole for blowing out the conditioned air toward the upper body of an occupant in the cabin. The foot opening hole is an opening hole for blowing the conditioned air toward the feet of the occupant. The defroster opening hole is an opening hole through which the conditioned air is blown toward the inside surface of the front window glass of the vehicle.

A blowing mode switching door (not illustrated) is disposed on the upstream side of these opening holes. The blowing mode switching door opens and closes each opening hole to switch the opening hole through which the conditioned air is blown. The operation of the electric actuator for driving the blowing mode switching door is controlled by a control signal output from the control device 600.

Next, an outline of an electric controller of the temperature regulating apparatus 1 will be described. The control device 600 is made up of a microcomputer including a processor, a memory, and the like, and peripheral circuits thereof. The control device 600 performs various calculations and processing based on an air conditioning control program stored in the memory and controls operations of various devices and the like connected to the output side. The memory is a non-transitory tangible storage medium.

As illustrated in FIG. 23, a control sensor group 610 is connected to the input side of the control device 600. The control sensor group 610 includes an inside air temperature detector that detects a cabin temperature (inside air temperature) Tr, a battery temperature detector that detects a temperature of the battery BT, an in-vehicle device temperature detector that detects a temperature of the in-vehicle device CE, and the like.

An operation panel 620 is connected to the input side of the control device 600. The operation panel 620 is provided with, for example, a temperature setting part that sets the cabin temperature, and the like. A detection signal of the sensor group 610 and an operation signal of the operation panel 620 are input to the control device 600.

The control device 600 is integrally formed with a controller that controls various devices connected to the output side of the control device 600. That is, a configuration (i.e., hardware and software) for controlling the operation of each control target device constitutes a controller that controls the operation of each control target device. For example, in the control device 600, a configuration that controls the operations of the high-temperature-side switching valve 310, the low-temperature-side switching valve 430, and the flow path switching valve 70 constitutes a valve controller 600a. In FIG. 23, for clarity, the illustration of signal lines and power lines connecting the control device 600 and various control target devices, signal lines connecting the control device 600 and various sensors, and the like is omitted.

Next, the operation of the temperature regulating apparatus 1 having the above configuration will be described. The temperature regulating apparatus 1 of the present embodiment can switch various operation modes for air conditioning in the cabin and temperature regulation of the battery BT. Specifically, the temperature regulating apparatus 1 can be switched to a device cooling mode, an outside-air cooling mode, and an outside-air heat absorption mode. Hereinafter, each operation mode will be described.

(A) Device Cooling Mode

The device cooling mode is an operation mode in which the refrigeration cycle device 200 is operated to perform air conditioning in the cabin and the battery BT is cooled by the low-temperature heat medium cooled by the refrigeration cycle device 200.

In the device cooling mode, the control device 600 controls the operation of the flow path switching valve 70 such that the low-temperature heat medium flowing in from the first inlet 700A flows out of the first outlet 700B and the low-temperature heat medium flowing in from the second inlet 700C flows out of the third outlet 700E.

Figure 32:
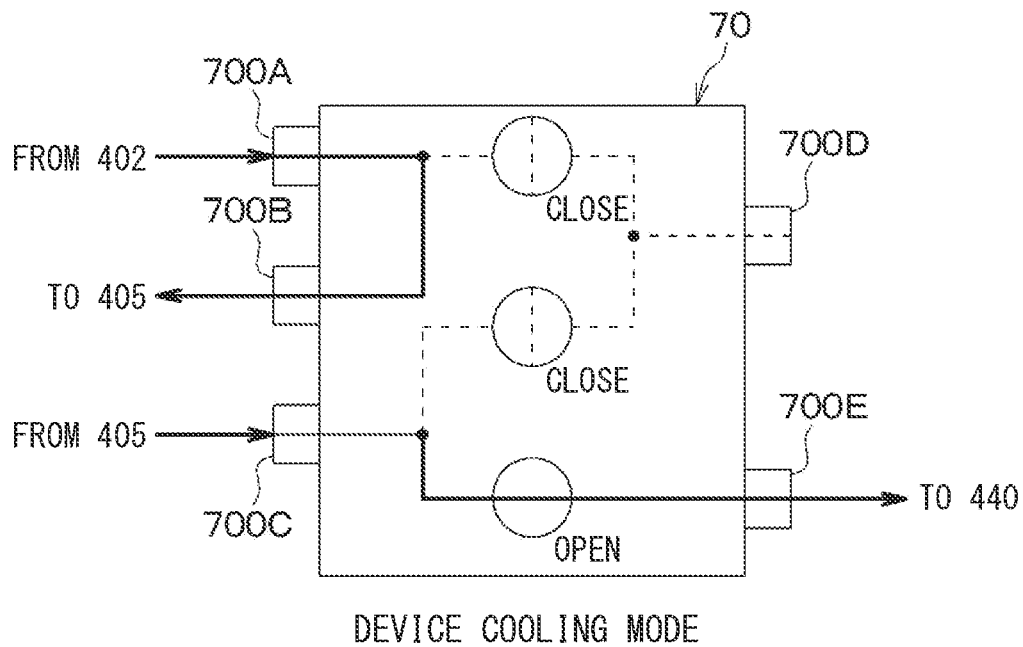
FIG. 32 is an explanatory diagram illustrating a passage configuration of the flow path switching valve in a device cooling mode.

Therefore, in the second fluid circulation circuit 400 in the device cooling mode, as illustrated in FIG. 32, the low-temperature heat medium discharged from the low-temperature-side pump 401 flows into the first inlet 700A of the flow path switching valve 70 via the heat medium passage of the chiller 206. Then, the low-temperature heat medium flowing into the first inlet 700A flows out of the first outlet 700B of the flow path switching valve 70 and then flows into the second inlet 700C of the flow path switching valve 70 via the cooling water passage 405 of the battery BT. The low-temperature heat medium flowing into the second inlet 700C flows out of the third outlet 700E of the flow path switching valve 70 and is then sucked again into the low-temperature-side pump 401 via the short-circuiting heat medium passage 440.

In the refrigeration cycle device 200 in the device cooling mode, when the control device 600 operates the compressor 201, the high-pressure refrigerant discharged from the compressor 201 flows into the heat radiator 202. The control device 600 regulates the refrigerant discharge capacity of the compressor 201 such that the temperature of the ventilation air W cooled by the interior evaporator 207 becomes a target evaporator temperature TEO.

The target evaporator temperature TEO is determined based on a detection signal of the sensor group 610 connected to the control device 600 with reference to a control map stored in advance in the control device 600. The control map is configured such that the target evaporator temperature TEO is equal to or higher than a frosting prevention temperature (e.g., 1° C.) in order to prevent frosting on the interior evaporator 207.

The refrigerant flowing into the heat radiator 202 is pumped from the high-temperature-side pump 301 and dissipates heat to the high-temperature heat medium flowing through the heat medium passage 302 to become a subcooled liquid-phase refrigerant. As a result, the high-temperature heat medium flowing through the heat medium passage 302 is heated.

The flow of the refrigerant flowing out of the heat radiator 202 is branched at the refrigerant branch 203. One refrigerant branched at the refrigerant branch 203 is decompressed by the first expansion valve 204 and flows into the chiller 206. The control device 600 regulates the throttle opening of the first expansion valve 204 such that the temperature of the low-temperature heat medium flowing out of the heat medium passage 402 of the chiller 206 approaches the target cooling temperature TBO.

The target cooling temperature TBO is determined based on a detection signal of the sensor group 610 connected to the control device 600 with reference to a control map stored in advance in the control device 600. In this control map, the target cooling temperature TBO is determined such that the temperature of the battery BT is held within an appropriate temperature range.

The refrigerant flowing into the chiller 206 absorbs heat from the low-temperature heat medium flowing through the heat medium passage 402 and evaporates. As a result, the low-temperature heating medium flowing through the heat medium passage 402 is cooled. The refrigerant flowing out of the chiller 206 flows into the refrigerant junction 209.

The other refrigerant branched at the refrigerant branch 203 is decompressed by the second expansion valve 205 and flows into the interior evaporator 207. The control device 600 regulates the throttle opening of the second expansion valve 205 such that the refrigerant sucked into the compressor 201 approaches a predetermined reference superheating degree KSH (e.g., 5° C.). Thus, in the device cooling mode, the refrigerant evaporation temperature at the interior evaporator 207 may be equivalent to the refrigerant evaporation temperature in the chiller 206.

The refrigerant flowing into the interior evaporator 207 absorbs heat from the ventilation air W blown from the interior blower 502 and evaporates. Thereby, the ventilation air W is cooled. The refrigerant flowing out of the interior evaporator 207 flows into the refrigerant junction 209 via the evaporating pressure regulating valve 208. The refrigerant junction 209 joins the flow of the refrigerant flowing out of the interior evaporator 207 and the flow of the refrigerant flowing out of the chiller 206 and allows the joined refrigerant to flow out to the suction side of the compressor 201.

In the first fluid circulation circuit 300, when the control device 600 operates the high-temperature-side pump 301, the high-temperature heat medium pumped from the high-temperature-side pump 301 flows into the heat medium passage 302 of the heat radiator 202. The high-temperature heat medium flowing into the heat medium passage 302 exchanges heat with the high-pressure refrigerant to be heated.

The high-temperature heat medium flowing out of the heat radiator 202 flows into the high-temperature-side switching valve 310 and is divided into a flow flowing into the high-temperature-side radiator 303 and a flow flowing into the heater core 304 from the high-temperature-side switching valve 310.

The control device 600 controls the operation of the high-temperature-side switching valve 310 such that an outlet-side heat medium temperature THC, which is the temperature of the high-temperature heat medium flowing out of the heater core 304, approaches a predetermined reference outlet-side heat medium temperature KTHC. That is, the control device 600 regulates the high-temperature-side flow rate ratio such that the outlet-side heat medium temperature THC approaches the reference outlet-side heat medium temperature KTHC.

Further, in a case where the outlet-side heat medium temperature THC does not reach the reference outlet-side heat medium temperature KTHC even when the control device 600 controls the high-temperature-side switching valve 310 such that the entire amount of the high-temperature heat medium from the heat radiator 202 flows to the heater core 304, the high-temperature heat medium is heated by the electric heater 306. The heating capacity of the electric heater 306 is regulated such that the outlet-side heat medium temperature THC approaches the reference outlet-side heat medium temperature KTHC.

The high-temperature heat medium flowing into the high-temperature-side radiator 303 exchanges heat with the outside air OA blown from the outside air fan to dissipate heat. Thereby, the high-temperature heat medium flowing through the high-temperature-side radiator 303 is cooled. The high-temperature heat medium flowing out of the high-temperature-side radiator 303 flows into the high-temperature-side junction 307.

On the other hand, the high-temperature heat medium flowing into the heater core 304 exchanges heat with the ventilation air W passing through the interior evaporator 207 to dissipate heat. Accordingly, the ventilation air W cooled by the interior evaporator 207 is reheated. Further, the control device 600 regulates the opening degree of the air mix door 504 such that the ventilation air temperature of the ventilation air W blown into the cabin approaches a target ventilation air temperature TAO.

The high-temperature heat medium flowing out of the heater core 304 flows into the high-temperature-side junction 307. The high-temperature-side junction 307 joins the high-temperature heat medium flowing out of the heater core 304 and the high-temperature heat medium flowing out of the high-temperature-side radiator 303 and allows the joined medium to flow out to the fluid suction side of the high-temperature-side pump 301.

In the second fluid circulation circuit 400, when the control device 600 operates the low-temperature-side pump 401, the low-temperature heat medium pumped from the low-temperature-side pump 401 flows into the heat medium passage 402 of the chiller 206. The low-temperature heat medium flowing into the chiller 206 exchanges heat with the low-pressure refrigerant to be cooled.

The low-temperature heat medium flowing out of the chiller 206 flows into the inside from the first inlet 700A of the flow path switching valve 70 and flows out of the first outlet 700B. The low-temperature heat medium flowing out of the first outlet 700B flows into the cooling water passage 405 of the battery BT. The heat medium flowing into the cooling water passage 405 of the battery BT absorbs the waste heat of the battery BT when flowing through the cooling water passage 405. Thereby, the battery BT is cooled.

The low-temperature heat medium flowing out of the cooling water passage 405 of the battery BT flows into the inside from the second inlet 700C of the flow path switching valve 70 and flows out of the third outlet 700E. The low-temperature heat medium flowing out of the third outlet 700E is guided to the suction side of the low-temperature-side pump 401 via the short-circuiting heat medium passage 440 and the low-temperature-side junction 407.

In the device cooling mode, the operation as described above enables the ventilation air W cooled by the interior evaporator 207 to be reheated by the heater core 304 and blown into the cabin. At this time, excessive heat for reheating the ventilation air W can be dissipated to the outside air by the high-temperature-side radiator 303. Therefore, the ventilation air W regulated to an appropriate temperature can be blown into the cabin to achieve comfortable air conditioning. Further, in the device cooling mode, the low-temperature heat medium cooled by the chiller 206 is allowed to flow into the cooling water passage 405 of the battery BT, whereby the battery BT can be cooled.

(B) Outside-Air Cooling Mode

The outside-air cooling mode is an operation mode in which the refrigeration cycle device 200 is operated to perform air conditioning in the cabin, and the battery BT is cooled by the low-temperature heating medium cooled by the outside air.

In the outside-air cooling mode, the control device 600 controls the operation of the flow path switching valve 70 such that the low-temperature heat medium flowing in from the first inlet 700A flows out of the first outlet 700B and the low-temperature heat medium flowing in from the second inlet 700C flows out of the second outlet 700D. The control device 600 brings the first expansion valve 204 into a fully closed state.

Figure 33:
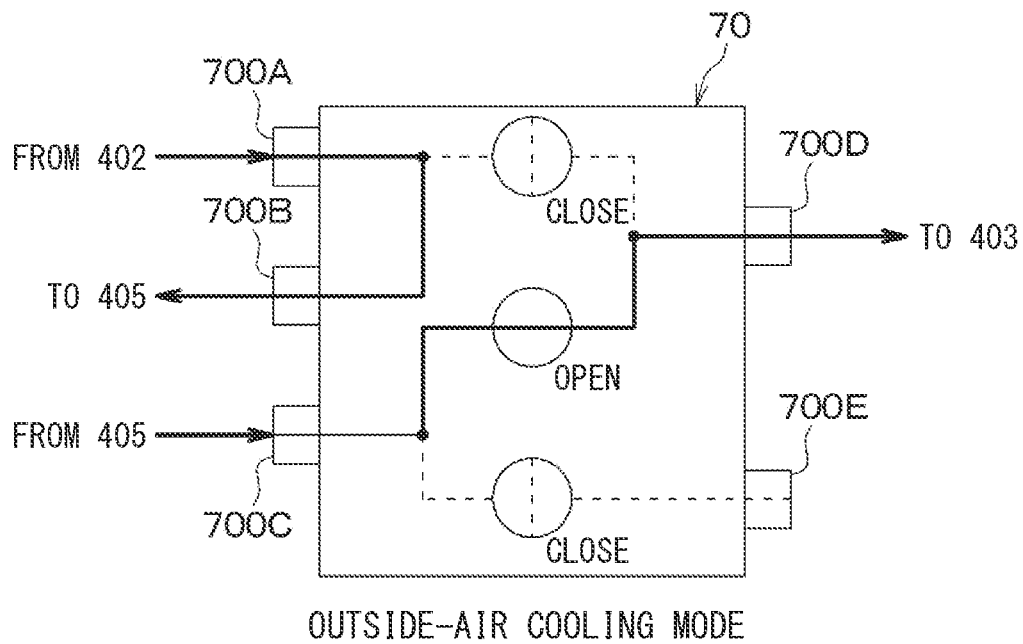
FIG. 33 is an explanatory diagram illustrating a passage configuration of the flow path switching valve in an outside-air cooling mode.

Therefore, in the second fluid circulation circuit 400 in the outside-air cooling mode, as illustrated in FIG. 33, the low-temperature heat medium discharged from the low-temperature-side pump 401 flows into the first inlet 700A of the flow path switching valve 70 via the heat medium passage 402 of the chiller 206. The low-temperature heat medium flowing into the first inlet 700A of the flow path switching valve 70 flows out of the first outlet 700B of the flow path switching valve 70 and then flows into the second inlet 700C of the flow path switching valve 70 via the cooling water passage 405 of the battery BT. The low-temperature heat medium flowing into the second inlet 700C flows out of the second outlet 700D of the flow path switching valve 70 and is then sucked again into the low-temperature-side pump 401 via the low-temperature-side radiator 403.

In the refrigeration cycle device 200 in the outside-air cooling mode, as in the device cooling mode, the high-pressure refrigerant discharged from the compressor 201 is cooled until the high-pressure refrigerant becomes the sub-cooled liquid-phase refrigerant in the heat radiator 202. Further, the high-temperature heat medium flowing through the heat medium passage 302 of the heat radiator 202 is heated.

The refrigerant flowing out of the heat radiator 202 flows into the refrigerant branch 203. In the outside-air cooling mode, with the first expansion valve 204 in the fully closed state, the refrigerant flowing into the refrigerant branch 203 is decompressed by the second expansion valve 205 and flows into the interior evaporator 207. As in the device cooling mode, the control device 600 regulates the throttle opening of the second expansion valve 205.

The low-pressure refrigerant having flowed into the interior evaporator 207 absorbs heat from the ventilation air W and evaporates as in the device cooling mode. Thereby, the ventilation air W is cooled. The refrigerant flowing out of the interior evaporator 207 is sucked into the compressor 201 via the evaporating pressure regulating valve 208 and the refrigerant junction 209.

In the first fluid circulation circuit 300, the control device 600 controls the operation of the components as in the device cooling mode. As a result, the outlet-side heat medium temperature THC of the high-temperature heat medium approaches the reference outlet-side heat medium temperature KTHC.

In the second fluid circulation circuit 400, when the control device 600 operates the low-temperature-side pump 401, the low-temperature heat medium pumped from the low-temperature-side pump 401 flows into the heat medium passage 402 of the chiller 206. In the outside-air cooling mode, with the first expansion valve 204 in the fully closed state, the low-temperature heat medium flowing into the heat medium passage 402 of the chiller 206 flows out without exchanging heat with the low-pressure refrigerant.

The low-temperature heat medium flowing out of the chiller 206 flows into the inside from the first inlet 700A of the flow path switching valve 70 and flows out of the first outlet 700B. The low-temperature heat medium flowing out of the first outlet 700B flows into the cooling water passage 405 of the battery BT. The heat medium flowing into the cooling water passage 405 of the battery BT absorbs the waste heat of the battery BT when flowing through the cooling water passage 405. Thereby, the battery BT is cooled.

The low-temperature heat medium flowing out of the cooling water passage 405 of the battery BT flows into the inside from the second inlet 700C of the flow path switching valve 70 and flows out of the second outlet 700D. The low-temperature heat medium flowing out of the second outlet 700D flows into the low-temperature-side radiator 403.

The low-temperature heat medium flowing into the low-temperature-side radiator 403 is blown from the outside air fan, exchanges heat with the outside air OA after passing through the high-temperature-side radiator 303, and dissipates heat. As a result, the low-temperature heat medium flowing through the low-temperature-side radiator 403 is cooled. The low-temperature heat medium flowing out of the low-temperature-side radiator 403 is guided to the suction side of the low-temperature-side pump 401 via the low-temperature-side junction 407.

In the outside-air cooling mode, the operation as described above enables the ventilation air W cooled by the interior evaporator 207 to be reheated by the heater core 304 and blown into the cabin. Therefore, as in the device cooling mode, the ventilation air W regulated to an appropriate temperature can be blown into the cabin to achieve comfortable air conditioning. Further, in the outside-air cooling mode, the low-temperature heat medium cooled by heat exchange with the outside air in the low-temperature-side radiator 403 is allowed to flow into the cooling water passage 405 of the battery BT, whereby the battery BT can be cooled.

Here, when the cooling of the battery BT is no longer required in the outside-air cooling mode, the control device 600 may allow the low-temperature heat medium flowing in from the first inlet 700A to flow out of the third outlet 700E. Accordingly, the low-temperature heat medium flowing out of the heat medium passage 402 of the chiller 206 can be returned to the suction side of the low-temperature-side pump 401 via the short-circuiting heat medium passage 440 and the low-temperature-side junction 407.

(C) Outside-Air Heat Absorption Mode

The outside-air heat absorption mode is an operation mode for heating the inside of the cabin by operating the refrigeration cycle device 200 without cooling the battery BT. The outside-air heat absorption mode is an operation mode executed at a low outside air temperature (e.g., when the temperature is 10° C. or lower).

In the outside-air heat absorption mode, the control device 600 controls the operation of the flow path switching valve 70 so that the low-temperature heat medium flowing in from the first inlet 700A flows out of the second outlet 700D. The control device 600 brings the second expansion valve 205 into the fully closed state. Further, the control device 600 regulates the opening degree of the air mix door 504 so as to fully close the cold air bypass passage 505.

Figure 34:
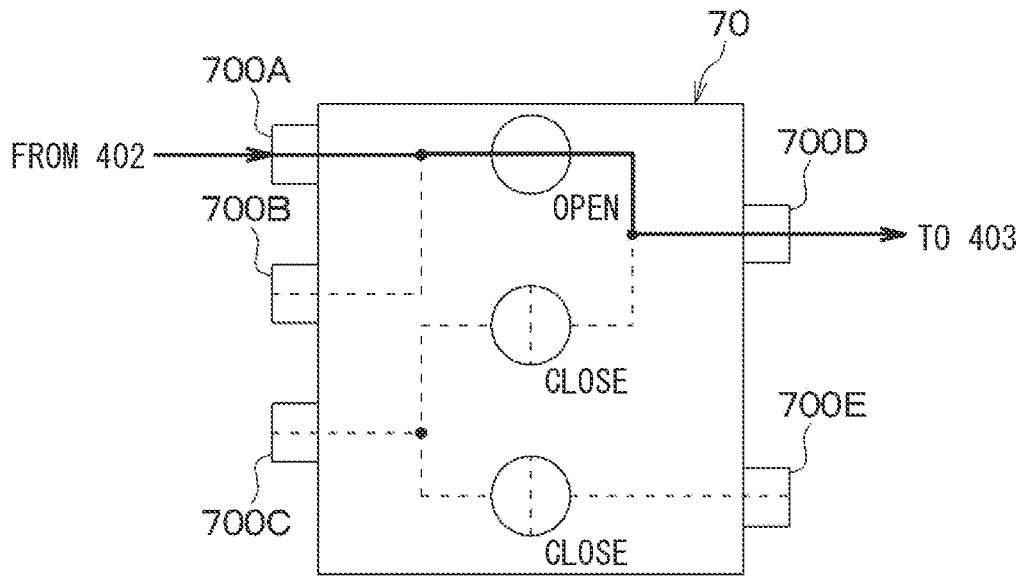
FIG. 34 is an explanatory diagram illustrating a passage configuration of the flow path switching valve in an outside-air heat absorption mode.
Figure 35:
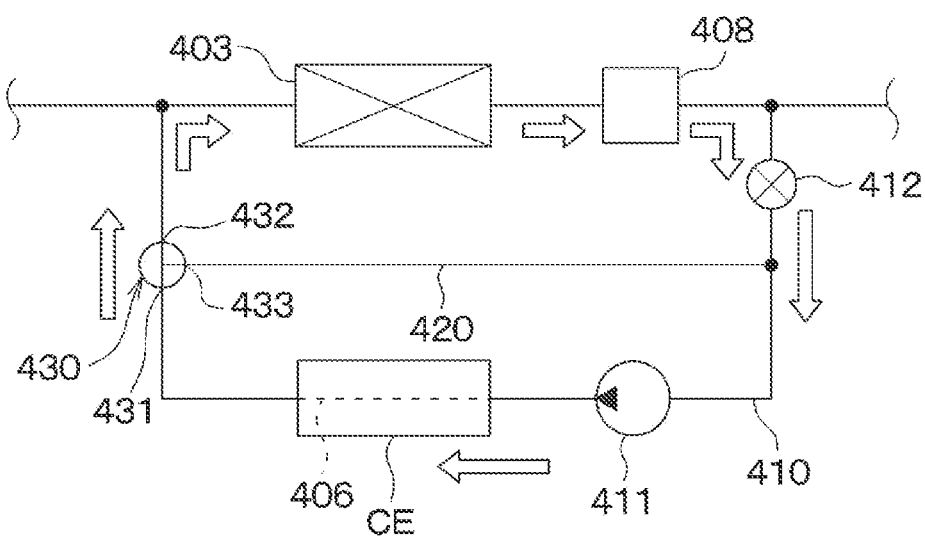
FIG. 35 is an explanatory diagram illustrating an example of a circuit configuration in a defrosting mode.

Therefore, in the second fluid circulation circuit 400 in the outside-air cooling mode, as illustrated in FIG. 34, the low-temperature heat medium discharged from the low-temperature-side pump 401 flows into the first inlet 700A of the flow path switching valve 70 via the heat medium passage 402 of the chiller 206. The low-temperature heat medium flowing into the first inlet 700A of the flow path switching valve 70 flows out of the second outlet 700D of the flow path switching valve 70 and is then sucked again into the low-temperature-side pump 401 via the low-temperature-side radiator 403.

In the refrigeration cycle device 200 in the outside-air cooling mode, as in the device cooling mode, the high-pressure refrigerant discharged from the compressor 201 is cooled until the high-pressure refrigerant becomes the subcooled liquid-phase refrigerant in the heat radiator 202. Further, the high-temperature heat medium flowing through the heat medium passage 302 of the heat radiator 202 is heated.

The refrigerant flowing out of the heat radiator 202 flows into the refrigerant branch 203. In the outside-air cooling mode, with the second expansion valve 205 in the fully closed state, the refrigerant flowing into the refrigerant branch 203 is decompressed by the first expansion valve 204 and flows into the chiller 206. The control device 600 regulates the throttle opening of the first expansion valve 204 so that the refrigerant evaporation temperature in the chiller 206 becomes lower than the outside air temperature.

As in the device cooling mode, the low-pressure refrigerant flowing into the chiller 206 absorbs heat from the low-temperature heat medium flowing through the heat medium passage 402 and evaporates. Accordingly, the low-temperature heating medium is cooled. The refrigerant flowing out of the chiller 206 is sucked into the compressor 201 via the refrigerant junction 209.

In the first fluid circulation circuit 300, the control device 600 controls the operation of the components as in the device cooling mode. As a result, the outlet-side heat medium temperature THC of the high-temperature heat medium approaches the reference outlet-side heat medium temperature KTHC.

In the second fluid circulation circuit 400, when the control device 600 operates the low-temperature-side pump 401, the low-temperature heat medium pumped from the low-temperature-side pump 401 flows into the heat medium passage 402 of the chiller 206. The low-temperature heat medium flowing into the chiller 206 exchanges heat with the low-pressure refrigerant to be cooled to a temperature lower than the outside air temperature.

The low-temperature heat medium flowing out of the chiller 206 flows into the inside from the first inlet 700A of the flow path switching valve 70 and flows out of the second outlet 700D. The low-temperature heat medium flowing out of the second outlet 700D flows into the low-temperature-side radiator 403.

The low-temperature heat medium flowing into the low-temperature-side radiator 403 is blown from the outside air fan, exchanges heat with the outside air OA after passing through the high-temperature-side radiator 303, and absorbs heat. As a result, the temperature of the low-temperature heat medium flowing through the low-temperature-side radiator 403 rises so as to approach the outside air temperature. The low-temperature heat medium flowing out of the low-temperature-side radiator 403 is guided to the suction side of the low-temperature-side pump 401 via the low-temperature-side junction 407.

In the outside-air heat absorption mode, the operation as described above enables the ventilation air W heated by the heater core 304 to be blown into the cabin. Therefore, in the outside-air heat absorption mode, it is possible to achieve the heating of the inside of the cabin without cooling the battery BT.

(D) Temperature Control, Etc., of In-Vehicle Device CE

Here, in the temperature regulating apparatus 1, the control device 600 controls the operations of the various control target devices such that the temperature of the in-vehicle device CE is held within an appropriate temperature range regardless of the various operation modes described above. Specifically, the control device 600 operates the device pump 411 so as to exhibit predetermined pumping capacity regardless of the various operation modes described above.

When the temperature of the in-vehicle device CE becomes equal to or higher than the reference upper limit value, the device flow rate regulating valve 412 is set to an appropriate opening degree, and the low-temperature-side switching valve 430 is switched to a setting in which the low-temperature heat medium of the device cooling passage 410 flows to the low-temperature-side radiator 403. For example, the low-temperature-side switching valve 430 shifts the rotor 22 to a position that opens the first flow path hole 141 and closes the second flow path hole 142. Hence the low-temperature heat medium cooled by the low-temperature-side radiator 403 can flow into the cooling water passage 406 of the in-vehicle device CE. As a result, the in-vehicle device CE can be cooled by the low-temperature heating medium cooled by the outside air.

On the other hand, when the temperature of the in-vehicle device CE becomes equal to or lower than the reference lower limit value, the device flow rate regulating valve 412 is brought into the fully closed state, and the low-temperature-side switching valve 430 is switched to a setting in which the low-temperature heat medium of the device cooling passage 410 flows to the device bypass passage 420. For example, the low-temperature-side switching valve 430 shifts the rotor 22 to a position for closing the first flow path hole 141 and opens the second flow path hole 142. Thereby, the low-temperature heat medium flowing out of the cooling water passage 406 of the in-vehicle device CE can be returned to the inlet side of the cooling water passage 406 again via the device bypass passage 420. As a result, the in-vehicle device CE can be warmed up by self-heating of the in-vehicle device CE.

When the outside air temperature is extremely low (e.g., 0° C. or lower), frost may be formed on the outer surface of the low-temperature-side radiator 403. When the frost is formed on the low-temperature-side radiator 403, the amount of heat absorbed from the outside air decreases, and hence the temperature regulating apparatus 1 cannot be appropriately operated.

Therefore, when a frosting condition for frost formation on the low-temperature-side radiator 403 is satisfied, the temperature regulating apparatus 1 switches the operation mode to the defrosting mode. The defrosting mode is a mode for removing frost formed on the low-temperature-side radiator 403. The frosting condition is, for example, a condition that is satisfied when a difference in the temperature of the low-temperature heat medium between the front and rear of the low-temperature-side radiator 403 becomes equal to or lower than a predetermined temperature. The condition is an example, and the frosting condition may be another condition.

In the defrosting mode, the temperature regulating apparatus 1 operates the device pump 411 so as to exhibit a predetermined pumping capacity. Then, the temperature regulating apparatus 1 sets the device flow rate regulating valve 412 to an appropriate opening degree and switches the low-temperature-side switching valve 430 to a setting in which the low-temperature heat medium of the device cooling passage 410 flows to the low-temperature-side radiator 403. For example, the low-temperature-side switching valve 430 shifts the rotor 22 to a position that opens the first flow path hole 141 and closes the second flow path hole 142. Accordingly, by allowing the low-temperature heat medium, the temperature of which has risen during the passage through the cooling water passage 406 of the in-vehicle device CE, to flow into the low-temperature-side radiator 403, it is possible to remove frost formed on the low-temperature-side radiator 403.

The temperature regulating apparatus 1 described above can achieve comfortable air conditioning in the cabin and regulate the battery BT and the in-vehicle device CE to appropriate temperatures by switching various operation modes.

The high-temperature-side switching valve 310 and the low-temperature-side switching valve 430 of the present embodiment are configured as in the valve device 10 described in the first embodiment. Therefore, the high-temperature-side switching valve 310 and the low-temperature-side switching valve 430 can obtain the effects exhibited by the valve device 10 described in the first embodiment as in the valve device 10.

Specifically, the high-temperature-side switching valve 310 can appropriately regulate the flow rate ratio of the high-temperature heat medium passing through the high-temperature-side radiator 303 and the high-temperature heat medium passing through the heater core 304 by increasing or decreasing the opening degree of the first flow path hole 141 and the opening degree of the second flow path hole 142 by the rotor 22.

Here, when the resolution of the opening-degree control of the high-temperature-side switching valve 310 is large, the flow rate ratio of the high-temperature heat medium passing through the high-temperature-side radiator 303 and the high-temperature heat medium passing through the heater core 304 cannot be appropriately regulated, and the temperature variation of the ventilation air blown into the cabin increases. In this case, an increase in the operation of the air mix door 504 or the like increases power consumption and deteriorates a power consumption rate in the vehicle.

In contrast, the high-temperature-side switching valve 310 of the present embodiment can prevent fluid leakage due to changes in the postures of the shaft 20 and the rotor, thus enabling fine regulation of the flow rate of the high-temperature heat medium passing through the heater core 304. That is, according to the high-temperature-side switching valve 310 of the present embodiment described above, the problem can be solved.

The low-temperature-side switching valve 430 can appropriately regulate the flow rate ratio between the low-temperature heat medium passing through the low-temperature-side radiator 403 and the low-temperature heat medium passing through the device bypass passage 420 by increasing or decreasing the opening degree of the first flow path hole 141 and the opening degree of the second flow path hole 142 by the rotor 22.

For example, during the defrosting operation, the entire amount of the fluid heated by the in-vehicle device CE can be appropriately guided to the low-temperature-side radiator 403. Thereby, the defrosting of the low-temperature-side radiator 403 can be performed in a short time, so that the influence of the defrosting operation on the air conditioning in the cabin and the device temperature control can be prevented sufficiently.

In addition, since the flow path switching valve 70 is not formed by combining a plurality of on-off valves, three-way valves, or the like, it is difficult to cause an increase in size. It is thus possible to prevent an increase in the size of the second fluid circulation circuit 400 to which the flow path switching valve 70 is applied.

In particular, the flow path switching valve 70 has a configuration similar to the valve device 10 of the first embodiment, and the coupling member between the shaft 740 and the rotor 750 is configured similarly to the coupling member between the shaft 20 and the rotor 22 of the valve device 10. Therefore, the flow path switching valve 70 can obtain the effects exhibited by the valve device 10 described in the first embodiment as in the valve device 10. That is, the flow path switching valve 70 can achieve the optimum distribution of the low-temperature heat medium by increasing or decreasing the opening degree of each flow path hole 722 to 725 by the rotor 22.

Here, in the second fluid circulation circuit 400, when the distribution of the low-temperature heating medium by the flow path switching valve 70 cannot be appropriately performed, the temperature variation of each battery constituting the battery BT increases. In this case, the degradation of the battery BT is promoted, so that the cruising distance of the vehicle decreases. It is conceivable that the battery is excessively mounted in consideration of the deterioration in the battery BT, but in this case, the initial cost increases greatly.

In contrast, since the flow path switching valve 70 of the present embodiment can achieve the optimum distribution of the low-temperature heat medium, the problem described above can be solved.

In the flow path switching valve 70, the pressure in the first inlet space 711$a$ and the pressure in the second inlet space 712c of the rotor 750 act in opposite directions to each other. Thus, in the flow path switching valve 70, when the pressure of one of the low-temperature heat medium flowing in from the first inlet 700A and the low-temperature heat medium flowing in from the second inlet 700C changes, the pressure balance acting on the front and rear of the rotor 750 changes. Such a change in the pressure balance may be a factor that hinders the close contact between the rotor 750 and the stator 720.

In contrast, the flow path switching valve 70 of the present embodiment is configured such that the rotor 750 is pressed against the stator 720 by the energization member 770. Therefore, even when the pressure of the fluid flowing in from each of the inlets 700A, 700C changes, the posture of the rotor 750 can be held in a posture in contact with the stator 720.

Modification of Eighth Embodiment

In the eighth embodiment described above, it has been described that the high-temperature-side switching valve 310, the low-temperature-side switching valve 430, and the flow path switching valve 70 have configurations similar to those of the valve device 10 of the present disclosure, but the temperature regulating apparatus 1 is not limited thereto. In temperature regulating apparatus 1, at least one of the high-temperature-side switching valve 310, the low-temperature-side switching valve 430, and the flow path switching valve 70 may have a configuration similar to that of the valve device 10 of the present disclosure. The valve device 10 of the present disclosure is also applicable to a fluid circulation circuit (e.g., the refrigeration cycle device 200) different from the first fluid circulation circuit 300 and the second fluid circulation circuit 400.

For example, the first fluid circulation circuit 300 may have a circuit configuration in which the high-temperature-side radiator 303, the heater core 304, and the cooling water passage 405 of the battery BT are connected in parallel to the downstream side of the high-temperature-side pump 301 such that the battery BT can be warmed up. In this case, the valve device 10 of the present disclosure can be applied as a flow path switching valve that switches the circuit configuration of the first fluid circulation circuit 300.

Such a flow path switching valve can be achieved by a four-way valve having one inlet and three outlets. That is, the flow path switching valve includes an inlet into which the high-temperature heat medium flows, a first outlet from which the high-temperature heat medium is allowed to flow out to the high-temperature-side radiator 303, a second outlet from which the high-temperature heat medium is allowed to flow out to the heater core 304, and a third outlet from which the high-temperature heat medium is allowed to flow out to the cooling water passage 405 of the battery BT. The flow path switching valve is configured such that a flow rate ratio of the high-temperature heat medium passing through the high-temperature-side radiator 303, the high-temperature heat medium passing through the heater core 304, and the high-temperature heat medium passing through the cooling water passage 405 of the battery BT is regulated by rotationally shifting the rotor 22.

Specifically, in the flow path switching valve, the flow rate ratio of the high-temperature heat medium passing through each of the high-temperature-side radiator 303, the heater core 304, and the cooling water passage 405 of the battery BT is regulated by increasing or decreasing the opening degree of the first flow path hole, the opening degree of the second flow path hole, and the opening degree of the third flow path hole by the rotor 22. The first flow path hole, the second flow path hole, and the third flow path hole are flow path holes formed in the stator 14. Specifically, the first flow path hole is a flow path hole through which the high-temperature heat medium flowing into the high-temperature-side radiator 303 passes. The second flow path hole is a flow path hole through which the high-temperature heat medium flowing into the heater core 304 passes. The third flow path hole is a flow path hole through which the high-temperature heat medium flowing into the cooling water passage 405 of the battery BT passes.

In the eighth embodiment described above, an example in which the temperature regulating apparatus 1 is applied to an electric vehicle has been described, but an application target of the temperature regulating apparatus 1 is not limited to the electric vehicle. The temperature regulating apparatus 1 can be widely applied to, for example, a moving body in addition to an electric vehicle, a stationary device, and the like. These also apply to the valve devices 10 of the first to seventh embodiments.

Other Embodiments

Although the representative embodiments of the present disclosure have been described above, the present disclosure is not limited to the embodiments but can be variously modified as follows, for example. The following modification of the valve device 10 can also be applied to the high-temperature-side switching valve 310, the low-temperature-side switching valve 430, the flow path switching valve 70, and the like described in the eighth embodiment.

As in the embodiments described above, in the valve device 10, it is desirable that the one end portion 20a of the shaft 20 be supported by the one end bearing part 126 and the other end portion 20b of the shaft 20 be supported by the other end bearing part 144, but the present invention is not limited thereto. For example, the valve device 10 may have a structure in which at least one of the one end portion 20a and the other end portion 20b of the shaft 20 is not supported by the bearing.

As in the embodiments described above, in the valve device 10, it is desirable that the gap G between the fitting hole 223 of the rotor 22 and the fitting part 20c of the shaft 20 be larger than the gap between the other end bearing part 144 as the holding part and the fitting part 20c, but the present invention is not limited thereto. In the valve device 10, for example, the gap G between the fitting hole 223 of the rotor 22 and the fitting part 20c of the shaft 20 may be equivalent in size to the gap between the other end bearing part 144 as the holding part and the fitting part 20c.

As in the embodiments described above, it is desirable that the stator 14 and the rotor 22 be made of ceramic, but the present invention is not limited thereto. The stator 14 and the rotor 22 may be made of a material except for ceramic.

In the embodiments described above, the device formed of a three-way valve having one fluid inlet and two fluid outlets has been illustrated as the valve device 10, but the valve device 10 is not limited thereto. The valve device 10 of the present disclosure may be formed of a three-way valve having two fluid inlets and one fluid outlet.

In the embodiments described above, the device formed of a three-way valve has been illustrated as the valve device 10, but the valve device 10 is not limited to the three-way valve. The valve device 10 of the present disclosure may be configured as a five-way valve like the flow path switching valve 70. The valve device 10 of the present disclosure may be configured as, for example, a flow rate regulating valve or an on-off valve having one fluid inlet and one fluid outlet. In this case, one flow path hole is formed in the stator 14.

The valve device 10 of the present disclosure may be formed of, for example, a multi-way valve having one fluid inlet and three or more fluid outlets, a multi-way valve having three or more fluid inlets and one fluid outlet, a multi-way valve having a plurality of fluid inlets and a plurality of fluid outlets, or the like.

In the valve device 10 described in the embodiments described above, the housing 12 and the stator 14 are configured separately, but the present invention is not limited thereto. In the valve device 10, for example, a portion corresponding to the stator 14 may be integrally formed with the housing 12.

In the embodiments described above, the elastic member is illustrated as the energization member 26, but the energization member 26 is not limited thereto. The energization member 26 may be formed of a member except for the elastic member so long as the member can press the rotor 22 against the stator 14. The compression spring 261 is desirably disposed so as to surround the outer side of the shaft 20, but is not limited thereto. The compression spring 261 may be disposed around the shaft 20, for example.

In the embodiments described above, the example has been illustrated where the valve device 10 is provided with the flow path hole in the stator 14 configured separately from the housing 12, but the valve device 10 is not limited thereto. In the valve device 10, for example, a flow path hole may be formed directly in the housing 12. In this case, the sliding portion of the housing 12 where the rotor 22 slides is desirably formed of a material, such as ceramic, having a small linear expansion coefficient and excellent wear resistance as compared to the constituent material of the portion except for the sliding part.

It goes without saying that in the embodiments described above, the elements constituting the embodiments are not necessarily essential except for a case where it is explicitly stated that the elements are particularly essential and a case where the elements are considered to be obviously essential in principle.

In the embodiments described above, when a numerical value such as the number, a numerical value, an amount, or a range of the constituent elements of the embodiment is mentioned, the numerical value is not limited to a specific number unless otherwise specified as being essential or obviously limited to the specific number in principle.

In the embodiments described above, when the shapes, positional relationships, and the like of the components and the like are referred to, the shapes, positional relationships, and the like are not limited thereto unless otherwise specified or limited to specific shapes, positional relationships, and the like in principle.

(Summary)

According to a first aspect illustrated in some or all of the embodiments described above, a valve device includes a flow path formation member, a drive part, a shaft, a rotor, an energization member, and a coupling member that tiltably couples the shaft to the rotor.

According to a second aspect, the coupling member includes a fitting structure in which a fitting part of the shaft is fitted into a fitting hole provided in the rotor. The fitting hole has a size in which a gap is formed between the fitting hole and the shaft such that the shaft is tiltable in a state where the fitting part is fitted.

With the fitting structure in which the gap is formed between the fitting hole and the fitting part, contact between the fitting hole and the fitting part is prevented, so that a sliding loss in the coupling member can be reduced, and wear resistance can be ensured.

According to a third aspect, the shaft includes a one end portion to which a rotational force is transmitted from the drive part and an other end portion opposite to the one end portion in an axial direction of the shaft. The flow path formation member is provided with a holding part that holds the other end portion. A gap between the fitting hole and the fitting part is larger than a gap between the holding part and the fitting part. As a result, the shaft can be tiltably coupled to the rotor by the coupling member while the shaft is appropriately held by the holding part.

According to a fourth aspect, the valve device includes a housing in which the rotor and the flow path formation member are housed. The flow path formation member includes a disc-shaped stator provided with the flow path hole and disposed in the housing so as to be non-rotatable, and a sealing member disposed between the stator and the housing.

Thereby, sealing performance between the stator and the housing can be ensured by the sealing member. For example, when the pressure acting on the rotor varies in the circumferential direction, the rotor may be in an inclined posture. However, even in this case, the stator can be inclined following the rotor due to the deformation of the sealing member. As described above, with the configuration in which the sealing member is interposed between the stator and the housing, it is possible to ensure the close contact between the stator and the rotor and sufficiently prevent fluid leakage in the valve device.

According to a fifth aspect, the coupling member includes a universal joint that couples the shaft and the rotor such that an angle formed by the sliding surface and the axis of the shaft is changeable. With the universal joint, the shaft can be tiltably coupled to the rotor.

According to a sixth aspect, the energization member is formed of an elastic member that is elastically deformed in the axial direction of the shaft. Thus, a load for pressing the sliding surface of the rotor against the opening surface of the flow path formation member can be sufficiently ensured, thereby facilitating the contact state between the sliding surface and the opening surface to be held.

According to a seventh aspect, the elastic member is formed of a coil-shaped compression spring that applies a compressive load to the rotor. In this manner, the elastic member can be formed of a compression spring.

According to an eighth aspect, the shaft is disposed inside the compression spring. Hence the load of the compression spring on the rotor is prevented from being biased in the circumferential direction of the shaft, thereby facilitating the contact state between the sliding surface and the opening surface to be held.

According to a ninth aspect, the valve device includes a coil-shaped torsion spring that energizes the rotor to one side in a circumferential direction around the axis of the shaft. The compression spring is disposed inside the torsion spring and has a larger winding number than a winding number of the torsion spring.

As described above, in a case where the rotor and the shaft are configured separately, a relative positional deviation may occur between the rotor and the shaft in the circumferential direction of the shaft. Such positional deviation is not preferred since causing fluid leakage.

In contrast, when the rotor is energized to one side in the circumferential direction of the shaft by the torsion spring, it is possible to prevent the occurrence of relative positional deviation between the rotor and the shaft in the circumferential direction.

In addition, by increasing the winding number of the compression spring with the coil diameter smaller than that of the torsion spring, it is possible to prevent the spring constant of the compression spring from becoming excessively large. Thereby, the load can be stabilized against the deflection of the compression spring.

According to a tenth aspect, the shaft is provided with a flange part protruding in a radial direction of the shaft. The compression spring is disposed in a compressed state between the rotor and the flange part so as to rotate together with the rotor.

This makes it possible to reduce sliding loss in the compression spring and ensure wear resistance. Since the compression spring does not function as a torsion spring, it is possible to prevent an unnecessary force from acting on the rotor in the circumferential direction around the axis of the shaft.

According to an eleventh aspect, the energization member is formed of an elastic member coupled to the rotor so as to energize the rotor not only to the flow path formation member but also to one side in a circumferential direction around the axis of the shaft.

The elastic member has a function as a torsion spring in addition to a function as the compression spring. Therefore, it is possible to prevent positional deviation between the rotor and the shaft in the circumferential direction of the shaft while holding the posture of the rotor in a posture or position in contact with the flow path formation member without increasing the number of components of the valve device.

According to a twelfth aspect, the valve device is applied to a fluid circulation circuit including an exterior heat exchanger that exchanges heat between the fluid and air outside a cabin, and an interior heat exchanger that exchanges heat between air flowing into the cabin and the fluid. The valve device includes a first outlet that is connected to a fluid inlet side of the exterior heat exchanger and from which the fluid is allowed to flow out to the exterior heat exchanger, and a second outlet that is connected to a fluid inlet side of the interior heat exchanger and from which the fluid is allowed to flow out to the interior heat exchanger. The valve device includes an inlet that is connected to a fluid outlet side of the exterior heat exchanger and a fluid outlet side of the interior heat exchanger and into which the fluid flows from the exterior heat exchanger and the interior heat exchanger. In the valve device, a flow rate ratio between the fluid passing in the exterior heat exchanger and the fluid passing in the interior heat exchanger is regulated by rotationally shifting the rotor.

Thereby, the valve device can regulate the flow rate ratio between the fluid passing through the exterior heat exchanger and the fluid passing through the interior heat exchanger. In particular, since the valve device of the present disclosure can prevent fluid leakage due to a change in the posture of the shaft, it is possible to accurately regulate the flow rate ratio in each heat exchanger.

For example, in a case where the temperature of the air flowing into the cabin is regulated by the interior heat exchanger, the temperature of the air flowing into the cabin can be finely regulated by regulating the flow rate ratios in the interior heat exchanger and the exterior heat exchanger.

According to a thirteenth aspect, the valve device is applied to a fluid circulation circuit including an exterior heat exchanger that exchanges heat between the fluid and air outside a cabin, a temperature regulating part that regulates a temperature of a heat generator by the fluid, and a bypass part that bypasses the exterior heat exchanger and allows the fluid to flow. The valve device includes a first outlet that is connected to a fluid inlet side of the exterior heat exchanger and from which the fluid is allowed to flow out to the exterior heat exchanger, and a second outlet that is connected to a fluid inlet side of the bypass part and from which the fluid is allowed to flow out to the bypass part. The valve device includes an inlet that is connected to a fluid outlet side of the temperature regulating part and into which the fluid flows from the temperature regulating part, and a flow rate ratio between the fluid passing through the bypass part and the fluid passing through the exterior heat exchanger is regulated by rotationally shifting the rotor.

Thereby, the valve device can regulate the flow rate ratio between the fluid passing through the exterior heat exchanger and the fluid passing through the bypass part. In particular, since the valve device of the present disclosure can prevent fluid leakage due to a change in the posture of the shaft, it is possible to accurately regulate the flow rate ratios in the exterior heat exchanger and the bypass part.

For example, during the defrosting operation, the entire amount of the fluid heated by the temperature regulating part can be appropriately guided to the exterior heat exchanger. Thereby, the defrosting of the exterior heat exchanger can be performed in a short time, so that the influence of the defrosting operation on the air conditioning in the cabin and the device temperature control can be prevented sufficiently.

According to a fourteenth aspect, the valve device includes a first inlet into which the fluid flows, a second inlet into which the fluid flows, and at least one outlet from which the fluid is allowed to flow out to the outside. The valve device includes a housing on the inside of which a first inlet space communicating with the first inlet and a second inlet space communicating with the second inlet are formed. The rotor is disposed inside the housing such that pressure in the first inlet space and pressure in the second inlet space act in opposite directions to each other.

In the valve device configured as described above, when the pressure of one of the fluid flowing in from the first inlet and the fluid flowing in from the second inlet changes, the pressure balance acting on the front and rear of the rotor changes.

Since the valve device of the present disclosure is configured such that the rotor is pressed against the flow path formation member by the energization member, the rotor can be held in the position in contact with the flow path formation member even when the pressure of the fluid flowing in from each inlet changes.

According to a fifteenth aspect, a fluid circulation circuit includes a plurality of devices through which a fluid passes, and a valve device that regulates a flow rate of the fluid passing through the plurality of devices. The valve device includes a flow path formation member provided with at least one flow path hole through which the fluid passes, a drive part that outputs a rotational force, and a shaft that rotates about a predetermined axis by the rotational force output from the drive part. The valve device includes a rotor having a sliding surface that slides while facing an opening surface of the flow path formation member where the flow path hole is opened, the rotor increasing or decreasing an opening degree of the flow path hole with rotation of the shaft, and an energization member that energizes and biases the rotor toward the flow path formation member. The valve device includes a coupling structure that tiltably couples the shaft to the rotor such that a contact state between the sliding surface and the opening surface is held regardless of the posture of the shaft.

What is claimed is:

1. A valve device comprising:
a housing including a flow path in which a fluid flows;
a flow path formation member provided with at least one flow path hole through which the fluid in the flow path passes;
a drive part configured to output a rotational force;
a shaft configured to be rotatable about a predetermined axis by the rotational force output from the drive part;
a rotor having a sliding surface that slides while facing an opening surface of the flow path formation member where the flow path hole is opened, the rotor being configured to increase or decrease an opening degree of the flow path hole with rotation of the shaft;
a spring configured to energize the rotor toward the flow path formation member; and
a coupling member configured to tiltably couple the shaft to the rotor, and to hold a contact state between the sliding surface and the opening surface regardless of a position of the shaft,
the rotor, the flow path formation member, the shaft and the spring are located in the flow path of the houseing,
the shaft has a first end portion to which the rotational force is transmitted from the drive part, and a second end portion opposite to the first end portion in an axial direction, and
the spring extends in the axial direction from the coupling member to the first end portion of the shaft.

2. The valve device according to claim 1, wherein
the coupling member includes a fitting structure in which a fitting part of the shaft is fitted into a fitting hole provided in the rotor, and
the fitting hole has a size in which a gap is formed between the fitting hole and the shaft and the shaft is tiltable in a state where the fitting part is fitted.

3. The valve device according to claim 2, wherein
the flow path formation member is provided with a holding part that holds the second end portion, and
a gap between the fitting hole and the fitting part is larger than a gap between the holding part and the fitting part.

4. The valve device according to claim 2,
wherein
the housing houses the rotor and the flow path formation member,
wherein the flow path formation member includes
a disc-shaped stator provided with the flow path hole and disposed in the housing to be non-rotatable, and
a sealing member disposed between the stator and the housing.

5. The valve device according to claim 1, wherein the coupling member includes a universal joint configured to couple the shaft and the rotor, and to cause an angle defined by the sliding surface and the axis of the shaft to be changeable.

6. The valve device according to claim 1, wherein the spring is made of an elastic member that is elastically deformed in the axial direction of the shaft.

7. The valve device according to claim 6, wherein the elastic member is made of a coil-shaped compression spring that applies a compressive load to the rotor.

8. The valve device according to claim 7, wherein the shaft is disposed inside the compression spring.

9. The valve device according to claim 7, further comprising
a coil-shaped torsion spring that energizes the rotor to one side in a circumferential direction around the axis of the shaft,
wherein the compression spring is disposed inside the torsion spring and has a larger winding number than a winding number of the torsion spring.

10. The valve device according to claim 7, wherein
the shaft is provided with a flange part protruding in a radial direction of the shaft, and
the compression spring is disposed in a compressed state between the rotor and the flange part, to rotate together with the rotor.

11. The valve device according to claim 1, wherein the spring is made of an elastic member coupled to the rotor to energize the rotor not only to the flow path formation member but also to one side in a circumferential direction around the axis of the shaft.

12. The valve device according to claim 1, which is applied to a fluid circulation circuit including
an exterior heat exchanger that exchanges heat between the fluid and air outside a cabin, and
an interior heat exchanger that exchanges heat between air flowing into the cabin and the fluid,
the valve device further comprising:
a first outlet, connected to a fluid inlet side of the exterior heat exchanger, from which the fluid flows out to the exterior heat exchanger;
a second outlet, connected to a fluid inlet side of the interior heat exchanger, from which the fluid flows out to the interior heat exchanger; and
an inlet, connected to a fluid outlet side of the exterior heat exchanger and a fluid outlet side of the interior heat exchanger, into which the fluid flows from the exterior heat exchanger and the interior heat exchanger,
wherein the rotor is configured to be rotationally shifted and to regulate a flow rate ratio between the fluid passing through the exterior heat exchanger and the fluid passing through the interior heat exchanger.

13. The valve device according to claim 1, which is applied to a fluid circulation circuit including
an exterior heat exchanger that exchanges heat between the fluid and air outside a cabin,
a temperature regulating part that regulates a temperature of a heat generator by the fluid, and
a bypass part through which the fluid flows while bypassing the exterior heat exchanger,
the valve device further comprising:
a first outlet, connected to a fluid inlet side of the exterior heat exchanger, from which the fluid flows out to the exterior heat exchanger;
a second outlet, connected to a fluid inlet side of the bypass part, from which the fluid flows out to the bypass part; and
an inlet, connected to a fluid outlet side of the temperature regulating part, into which the fluid flows from the temperature regulating part,
wherein the rotor is configured to be rotationally shifted and to regulate a flow rate ratio between the fluid passing through the bypass part and the fluid passing through the exterior heat exchanger.

14. The valve device according to claim 1, further comprising:
a first inlet into which the fluid flows;
a second inlet into which the fluid flows;
at least one outlet from which the fluid flows out to the outside; and
a body provided with a first inlet space communicating with the first inlet and a second inlet space communicating with the second inlet, inside of the body, wherein the rotor is disposed inside of the body such that pressure in the first inlet space and pressure in the second inlet space act in opposite directions to each other.

15. The valve device according to claim 1, wherein a portion of the shaft between the first end portion and the second end portion is exposed to the fluid path in the housing.

16. The valve device according to claim 1, wherein the coupling member is arranged in the axial direction between the rotor and the first end portion of the shaft.

17. A valve device comprising:
a housing including a flow path in which a fluid flows;
a flow path formation member defining a flow path hole through which the fluid in the flow path passes, the flow path formation member having an opening surface in which the flow path hole is opened;
a drive part configured to output a rotational force;
a shaft configured to be rotatable about a predetermined axis by the rotational force output from the drive part;
a rotor having a sliding surface that is slidable while facing the opening surface of the flow path formation member, the rotor being configured to increase or decrease an opening degree of the flow path hole with rotation of the shaft; and
a spring configured to energize the rotor toward the flow path formation member, wherein
the shaft is tiltably coupled to the rotor, to hold a contact state between the sliding surface of the rotor and the opening surface of the flow path formation member regardless of a position of the shaft,
the shaft has a fitting part fitted into a fitting hole provided in the rotor, and
the fitting hole of the rotor has a size in which a gap is formed between the fitting hole and the shaft, and the shaft is tiltable in a state where the fitting part is fitted,
the rotor, the flow path formation member, the shaft and the spring are located in the flow path of the housing,
the shaft has a first end portion to which the rotational force is transmitted from the drive part, and a second end portion opposite to the first end portion in an axial direction, and
the spring extends in the axial direction from the coupling member to the first end portion of the shaft.

18. The valve device according to claim 17, wherein a portion of the shaft between the first end portion and the second end portion is exposed to the fluid path in the housing.

19. A fluid circulation circuit comprising:
a housing including a flow path in which a fluid flows;
a plurality of devices through which the fluid path passes; and
a valve device configured to regulate a flow rate of the fluid passing through the plurality of devices, wherein
the valve device includes
a flow path formation member provided with at least one flow path hole through which the fluid passes,
a drive part configured to output a rotational force,
a shaft configured to be rotatable about a predetermined axis by the rotational force output from the drive part,
a rotor having a sliding surface that slides while facing an opening surface of the flow path formation member where the flow path hole is opened, the rotor being configured to increase or decrease an opening degree of the flow path hole with rotation of the shaft,
a spring configured to energize and bias the rotor toward the flow path formation member, and
a coupling structure configured to tiltably couple the shaft to the rotor, and to hold a contact state between the sliding surface and the opening surface regardless of a position of the shaft,
the rotor, the flow path formation member, the shaft and the spring are located in the flow path of the housing,
the shaft has a first end portion to which the rotational force is transmitted from the drive part, and a second end portion opposite to the first end portion in an axial direction, and
the spring extends in the axial direction from the coupling member to the first end portion of the shaft.

20. The fluid circulation circuit according to claim 19, wherein
a portion of the shaft between the first end portion and the second end portion is exposed to the fluid path in the housing.

* * * * *